United States Patent
Rodriguez

(10) Patent No.: US 12,277,238 B2
(45) Date of Patent: Apr. 15, 2025

(54) SYSTEM AND METHOD FOR CONTROLLING DATA USING CONTAINERS

(71) Applicant: Alan Rodriguez, Dallas, TX (US)

(72) Inventor: Alan Rodriguez, Dallas, TX (US)

(73) Assignee: Alan Rodriguez, Dallas, TX (US)

( * ) Notice: Subject to any disclaimer, the term of this patent is extended or adjusted under 35 U.S.C. 154(b) by 0 days.

(21) Appl. No.: 17/844,292

(22) Filed: Jun. 20, 2022

(65) Prior Publication Data

US 2023/0147698 A1     May 11, 2023

Related U.S. Application Data

(63) Continuation of application No. 17/326,592, filed on May 21, 2021, now Pat. No. 11,372,987.

(60) Provisional application No. 63/126,580, filed on Dec. 17, 2020.

(51) Int. Cl.
| | | |
|---|---|---|
| H04L 29/06 | (2006.01) | |
| G06F 21/62 | (2013.01) | |
| G06F 21/78 | (2013.01) | |
| H04L 9/30 | (2006.01) | |

(52) U.S. Cl.
CPC .............. *G06F 21/62* (2013.01); *G06F 21/78* (2013.01); *H04L 9/30* (2013.01); *G06F 2221/2101* (2013.01); *H04L 2209/16* (2013.01); *H04L 2209/30* (2013.01)

(58) Field of Classification Search
CPC .................................. G06F 21/60; G06F 21/62
See application file for complete search history.

(56) References Cited

U.S. PATENT DOCUMENTS

| | | |
|---|---|---|
| 6,778,826 B2 | 8/2004 | Rankin |
| 6,826,574 B1 | 11/2004 | Colbath |
| 7,630,986 B1 | 12/2009 | Herz et al. |

(Continued)

FOREIGN PATENT DOCUMENTS

| | | |
|---|---|---|
| JP | 2001101274 A | 4/2001 |
| WO | 9802835 A1 | 1/1998 |
| WO | 2010027517 A3 | 5/2010 |

OTHER PUBLICATIONS

Blake et al., The Next Generation of Data-Sharing in Financial Services: Using Privacy Enhancing Techniques to Unlock New Value, World Economic Forum, Sep. 2019, retrieved from http://www3.weforum.org/docs/WEF_Next_Gen_Data_Sharinging_Financial_Services.pdf.

(Continued)

*Primary Examiner* — Jason K Gee

(57) ABSTRACT

An electronic device for managing secured data containers, the electronic device comprising at least one network interface, at least one memory storing executable instructions, and at least one processor coupled to the at least one network interface and the at least one memory. Execution of the executable instructions by the at least one processor causes the electronic device to receive a request for data container creation, retrieve data related to the request for data container creation, retrieve one or more parameters constraining use of the data, encrypt the data using a public encryption key, encode the encrypted data into a data storage area of a data container, encode the one or more parameters constraining use of the data into a machine readable parameter storage area of the data container, and assign a UUID to the data container.

20 Claims, 35 Drawing Sheets

(56) References Cited

U.S. PATENT DOCUMENTS

| | | | |
|---|---|---|---|
| 7,899,706 B1 | 3/2011 | Stone et al. | |
| 7,966,369 B1 | 6/2011 | Briere et al. | |
| 8,005,722 B2 | 8/2011 | Hutchison et al. | |
| 8,200,527 B1 | 6/2012 | Thompson et al. | |
| 8,880,100 B2 | 11/2014 | Dobyns | |
| 9,032,544 B2 | 5/2015 | Shelton | |
| 9,191,509 B2 | 11/2015 | Jones et al. | |
| 9,400,985 B2 | 7/2016 | Dobyns | |
| 9,411,967 B2 | 8/2016 | Parecki et al. | |
| 9,600,834 B2 | 3/2017 | Kilroy et al. | |
| 9,811,806 B1* | 11/2017 | Kuang | G06F 16/128 |
| 10,187,443 B2 | 1/2019 | Gong et al. | |
| 10,521,605 B1* | 12/2019 | Scuderi | G06F 21/6245 |
| 2002/0013850 A1 | 1/2002 | Mitchell et al. | |
| 2002/0026394 A1 | 2/2002 | Savage et al. | |
| 2003/0130893 A1 | 7/2003 | Farmer | |
| 2004/0098285 A1 | 5/2004 | Breslin et al. | |
| 2004/0153908 A1 | 8/2004 | Schiavone et al. | |
| 2005/0164704 A1 | 7/2005 | Winsor | |
| 2006/0074727 A1 | 4/2006 | Briere | |
| 2006/0195441 A1 | 8/2006 | Julia et al. | |
| 2006/0195595 A1 | 8/2006 | Mendez et al. | |
| 2007/0192121 A1 | 8/2007 | Routson | |
| 2007/0204329 A1 | 8/2007 | Peckover | |
| 2007/0276759 A1 | 11/2007 | Ginter et al. | |
| 2009/0049469 A1 | 2/2009 | Small et al. | |
| 2009/0083032 A1 | 3/2009 | Jablokov et al. | |
| 2009/0113319 A1 | 4/2009 | Dawson et al. | |
| 2009/0132395 A1 | 5/2009 | Lam et al. | |
| 2009/0248680 A1 | 10/2009 | Kalavade | |
| 2009/0254511 A1 | 10/2009 | Yeap et al. | |
| 2010/0010916 A1 | 1/2010 | Hutchison et al. | |
| 2010/0199042 A1 | 8/2010 | Bates et al. | |
| 2011/0276494 A1 | 11/2011 | Hutchison et al. | |
| 2011/0289566 A1 | 11/2011 | Resch et al. | |
| 2013/0332362 A1 | 12/2013 | Ciurea | |
| 2014/0047556 A1* | 2/2014 | Davis | G06F 21/6209 726/28 |
| 2014/0090021 A1 | 3/2014 | Berkovitz et al. | |
| 2014/0208154 A1 | 7/2014 | Gladwin et al. | |
| 2014/0310788 A1 | 10/2014 | Ricci | |
| 2014/0344015 A1 | 11/2014 | Puértolas-Montañés et al. | |
| 2015/0143129 A1 | 5/2015 | Duffy | |
| 2017/0041296 A1 | 2/2017 | Ford et al. | |
| 2017/0255912 A1 | 9/2017 | Casebolt | |
| 2018/0137292 A1* | 5/2018 | Sanso | G06F 21/6209 |
| 2019/0158558 A1 | 5/2019 | Gong et al. | |
| 2019/0347701 A1 | 11/2019 | Viljoen et al. | |
| 2020/0125744 A1 | 4/2020 | Smith et al. | |
| 2020/0134207 A1* | 4/2020 | Doshi | H04L 41/0894 |
| 2020/0351323 A1 | 11/2020 | Gong et al. | |
| 2022/0004649 A1 | 1/2022 | Smith et al. | |

OTHER PUBLICATIONS

Department of Homeland Security Management Directive System, MD No. 11042.1, Safeguarding Sensitive but Unclassified (For Official Use Only) Information, Jan. 6, 2005. https://www.dhs.gov/xlibrary/assets/foia/mgmt_directive_110421_safeguarding_sensitive_but_unclassified_information.pdf (2005).

Patent Cooperation Treaty: International Search Report and Written Opinion of Related Application PCT/US21/63938; Kari Rodriguez; Mar. 16, 2022; 9 pages.

Shinseki et al., Department of the Army Information Security Program, Army Regulation 380-5, Washington, DC, Sep. 29, 2000, 311 pages, retrieved online Nov. 9, 2019 from https://fas.org/irp/doddir/army/ar380-5.pdf (2000).

SQLite, SQLite As An Application File Format, Retrieved Mar. 1, 2021 from https://www.sqlite.org/appfileformat.html.

Patent Cooperation Treat: International Preliminary Report on Patentability for PCT/US2021/063938; Miki Kobayashi; Jun. 29, 2023; 8 pages.

* cited by examiner

SYSTEM AND METHOD FOR CONTROLLING DATA USING CONTAINERS

CROSS-REFERENCE TO RELATED APPLICATIONS

This application is a continuation of U.S. patent pplication Ser. No. 17/326,592, filed May 21, 2021, entitled SYSTEM AND METHOD FOR CONTROLLING DATA USING CONTAINERS, issuing as U.S. Pat. No. 11,372,987 on Jun. 28, 2022, the entire contents of which are herein incorporated by reference. U.S application Ser. No. 17/326,592 claims priority to and the benefit of U.S. Provisional Patent Application No. 63/126,580, filed Dec. 17, 2020, entitled SYSTEM AND METHOD FOR CONTROLLING DATA USING CONTAINERS, the entire contents of which are herein incorporated by reference.

TECHNICAL FIELD

This disclosure relates generally to data security methods. More specifically, this disclosure relates to systems and methods for controlling data using containers.

BACKGROUND

The principles of "notice and choice" have been the key principles of information privacy protection for several decades. These principles of privacy that involve the notion of individual control require sufficient mechanisms for individuals to understand where, when and under what conditions their personal information may be used and transferred and to exercise control over data usage and transference. Therefore, the various sets of fair information practice principles and privacy laws based on these practices include requirements for providing notice about data practices and allowing individuals to exercise control over those practices. Privacy policies, terms of use, and preference center based opt-out mechanisms have become the predominant tools for notice and choice. However, these tools are increasingly insufficient. Serious threats follow from the ease of information storage, transfer, aggregation, analysis and inference. We face the real risk that the technological laws spelled out by Gordon Moore (growth in processing power) and Robert Metcalfe (network effects) will permanently overwhelm existing privacy principles of notice and choice. Privacy policies are long, complicated, inconsistently structured and subject to frequent and unannounced change. Digital services often involve interactions and data exchanges that include third parties unknown to the end user. Each digital service requires specific and tailored advertising preferences selections and can change these choices and associated user selections at any time. In this environment, it is nearly impossible for individuals to control their information usage or related third-party data flows via existing privacy policies and preference center based opt-out mechanism tools for notice and choice.

The inherently decentralized nature of the internet, being comprised of a multitude of digital services each with its own—advertising preference choices and privacy policies, does not permit acceptable transparency for individuals to understand where, when and under what conditions their personal information may be used and transferred or to exercise control over data usage and transference or to hold digital services and their third party partners accountable for unanticipated and unapproved data usage.

SUMMARY

This disclosure is directed to systems and methods for controlling data using containers.

In one aspect, the disclosure is directed to a computing apparatus having at least one microprocessor and memory storing instructions configured to instruct the at least one microprocessor to perform operations. The operations comprise a central user preference center that is configured to store at least one privacy and marketing preference dataset of a user in association with account information identifying an account of the user. The central user preference center is configured to publish at least one privacy and marketing preference dataset of a user to the at least one entity preference center, and the at least one entity preference center is configured to communicate the user's entity preference center privacy and marketing preference dataset to the central preference center.

In another aspect, the disclosure is also directed to a computer-implemented method. The method comprises storing, in a computing apparatus, data representing a privacy and marketing preferences dataset of a user. It further comprises the step of communicating, by the computing apparatus, the privacy and marketing preferences dataset of the user to an entity in response to an interaction between the user and the computing apparatus or the entity, where the entity stores data about the user and the privacy and marketing preferences dataset controls storage and usage of the data about the user. The method further comprises the step of providing, by the computing apparatus, a communication channel between the user and the entity to customize the privacy and marketing preferences dataset of the user for the data about the user stored by the entity.

In another aspect, a system for controlling data using containers includes at least one memory, and at least one processor. The system further includes a master data fabric executed by the at least one processor. The master data fabric is configured to manage data container creation and encryption, and store, in the at least one memory, data relating to user data, including data containers, at least one container registry, and data traceability and versioning information. The system further includes a master data controller executed by the at least one processor to manage a master data preference center. The master data controller, using the master data fabric, manages data access requests from container controllers stored on client devices to decrypt and access containers stored in the at least one memory, and sharing of the data containers. The master data controller further determines, using the master data fabric and preferences stored in the data containers, whether to grant or deny access requests based on at least one of requester identity, data or time restrictions, and sharing permissions defining how data in the data container can be shared.

In another aspect, an electronic device for managing secured data containers includes at least one network interface, at least one memory storing executable instructions, and at least one processor coupled to the at least one network interface and the at least one memory. The at least one processor is configured to and/or execution of the executable instructions by the at least one processor causes the electronic device to receive, via the network interface, a request for data container creation from another electronic device, retrieve data related to the request for data container creation, retrieve one or more parameters constraining use of the data, encrypt the data using a public encryption key, encode the encrypted data into a data storage area of a data container, encode the one or more parameters constraining use of the data into a machine readable parameter storage area of the data container, assign a Universal Unique Identifier (UUID) to the data container, and register the data container in a data container registry based on the UUID of the data container, wherein the data container registry provides for linking and versioning of the data container.

In another embodiment, execution of the executable instructions by the at least one processor further causes the electronic device to transmit, using the network interface, the data container to a remote device for caching.

In another embodiment, execution of the executable instructions by the at least one processor further causes the electronic device to receive updated data associated with data stored in a first data container, retrieve at least one parameter constraining use of the updated data, encode the updated data into a second data container, encode the at least one parameter constraining use of the updated data into the second data container, assign a UUID to the second data container, encrypt the second data container, register the second data container in the data container registry based on the UUID of the second data container, and disable a UUID of the first data container in the data container registry, wherein disabling the UUID of the first data container restricts access to the first data container.

In another embodiment, execution of the executable instructions by the at least one processor further causes the electronic device to transmit a deletion request to the edge node device to delete a cached version of the first data container and store a cached version of the second data container.

In another embodiment, execution of the executable instructions by the at least one processor further causes the electronic device to receive a deletion request from the other electronic device to delete the data container, delete the data container in response to the request to delete the data container, log the deletion of the data container in an audit log, and disable the UUID of the data container in the data container registry, wherein disabling the UUID of the data container restricts access to the data container by any other devices which still storing the data container.

In another embodiment, execution of the executable instructions by the at least one processor further causes the electronic device to receive an access request related to data in the data container, determine whether to grant or deny the access request based on the one or more parameters constraining use of the data stored in the data container and based on at least one of a requester identity, temporal parameters, location parameters, functional parameters, proxy parameters, tracking parameters, aggregation parameters, and duration parameters, and log a result of the access request in an audit log.

In another embodiment, execution of the executable instructions by the at least one processor further causes the electronic device to, when the access request is granted, transmit a communication to allowing decryption of the data container, wherein a private decryption key used for the decryption of the data container is provided by the electronic device, or wherein the private decryption key used for the decryption of the data container is not accessible by the electronic device.

In another embodiment, execution of the executable instructions by the at least one processor further causes the electronic device to provide, in response to allowing the access request, one or more obfuscated results without providing any of the data from the data container.

In another embodiment, execution of the executable instructions by the at least one processor further causes the electronic device to create a record associated with the data container in a graph database accessible by the electronic device, wherein the graph database defines relationships between the data container and one or more other data containers and defines access permissions to the data container in accordance with the one or more parameters constraining use of the data.

In another aspect, a method for managing secured data containers includes receiving a request for data container creation from another electronic device, retrieving data related to the request for data container creation, retrieving one or more parameters constraining use of the data, encrypting the data using a public encryption key, encoding the encrypted data into a data storage area of a data container, encoding the one or more parameters constraining use of the data into a machine readable parameter storage area of the data container, assigning a Universal Unique Identifier (UUID) to the data container, and registering the data container in a data container registry based on the UUID of the data container, wherein the data container registry provides for linking and versioning of the data container.

In another embodiment, the method further comprises transmitting the data container to a remote device for caching.

In another embodiment, the method further comprises receiving updated data associated with data stored in a first data container, retrieving at least one parameter constraining use of the updated data, encoding the updated data into a second data container, encoding the at least one parameter constraining use of the updated data into the second data container, assigning a UUID to the second data container, encrypting the second data container, registering the second data container in the data container registry based on the UUID of the second data container, and disabling a UUID of the first data container in the data container registry, wherein disabling the UUID of the first data container restricts access to the first data container.

In another embodiment, the method further comprises transmitting a deletion request to the edge node device to delete a cached version of the first data container and store a cached version of the second data container.

In another embodiment, the method further comprises receiving a deletion request from the other electronic device to delete the data container, deleting the data container in response to the request to delete the data container, logging the deletion of the data container in an audit log, and disabling the UUID of the data container in the data container registry, wherein disabling the UUID of the data container restricts access to the data container by any other devices which still storing the data container.

In another embodiment, the method further comprises receiving an access request related to data in the data container, determining whether to grant or deny the access request based on the one or more parameters constraining use of the data stored in the data container and based on at least one of a requester identity, temporal parameters, location parameters, functional parameters, proxy parameters, tracking parameters, aggregation parameters, and duration parameters, and logging a result of the access request in an audit log.

In another embodiment, the method further comprises, when the access request is granted, transmitting a communication to allowing decryption of the data container, wherein a private decryption key used for the decryption of the data container is provided by the electronic device, or wherein the private decryption key used for the decryption of the data container is not accessible by the electronic device.

In another embodiment, the method further comprises providing, in response to allowing the access request, one or more obfuscated results without providing any of the data from the data container.

In another embodiment, the method further comprises creating a record associated with the data container in a graph database accessible by the electronic device, wherein the graph database defines relationships between the data container and one or more other data containers and defines access permissions to the data container in accordance with the one or more parameters constraining use of the data.

In another aspect, an electronic device for managing access to secured data containers includes at least one network interface, at least one memory storing executable instructions, and at least one processor coupled to the at least one network interface and the at least one memory, wherein the electronic device is disposed in an edge node at a network edge, and wherein the at least one processor is configured to and/or execution of the executable instructions by the at least one processor causes the electronic device to receive, via the network interface, a request for data container creation from another electronic device, receive, via the at least one network interface, data related to the request for data container creation, generate a command including the request for container creation and the received data, transmit, via the at least one network interface, the command to a master node, receive a transmission from the master node including a data container and a Universal Unique Identifier (UUID) associated with the data container, wherein data in the data container is encrypted, and wherein the data container includes the received data encoded into a data storage area of the data container and one or more parameters constraining use of the data encoded into a machine readable parameter storage area of the data container, cache the data container in association with the UUID in a container cache disposed at the edge node, receive, from a requesting electronic device, an access request related to data in the cached data container, determine whether to grant or deny the access request based on the one or more parameters constraining use of the data stored in the data container and based on at least one of a requester identity, temporal parameters, location parameters, functional parameters, proxy parameters, tracking parameters, aggregation parameters, and duration parameters, log a result of the access request in an audit log, retrieve, based on granting the access request, the data container from the container cache by referencing the UUID of the data container, transmit the data container to the requesting electronic device, receive a deletion request from the other electronic device to delete the data container, delete the data container in response to the request to delete the data container, log the deletion of the data container in an audit log, and transmit, to the master node, a command to disable the UUID of the data container in a data container registry, wherein disabling the UUID of the data container restricts access to the data container by any other devices still storing the data container.

In one embodiment, the deletion request includes updated data, and wherein execution of the executable instructions by the at least one processor further causes the electronic device to receive the updated data, wherein the updated data is associated with data stored in the data container, retrieve at least one parameter constraining use of the updated data, transmit the updated data and the at least one parameter to the master node, receive, from the master node, a transmission including an updated data container and an associated UUID, wherein the updated data container includes the updated data and the at least one parameter constraining use of the updated data encoded into the second data container, and wherein data in the updated data container is encrypted, and cache the updated data container in the container cache.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HIVID), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding, reference is now made to the following description taken in conjunction with the accompanying Drawings in which.

DETAILED DESCRIPTION

Figure 1:
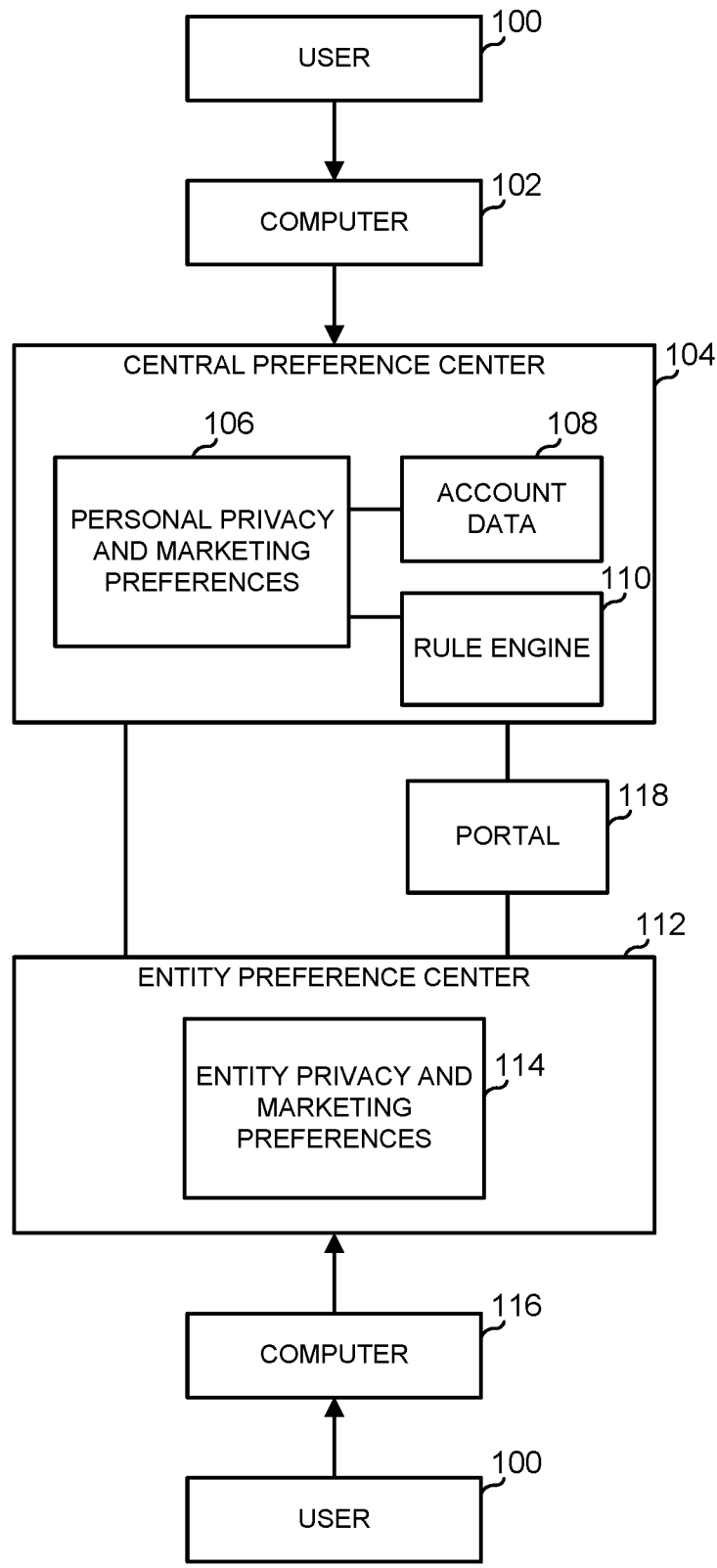
FIG. 1 illustrates a system to communicating privacy preferences in accordance with various embodiments of this disclosure.

In view of the challenges associated with decentralized control of privacy preferences, there exists a need to enable online consumers to manage their privacy and marketing preferences across multiple platforms and entity preference centers.

Accordingly, the present disclosure provides systems and methods of communicating privacy and marketing preferences. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Due to the rise of social media, the ease with which data can be aggregated and used for psychographic profiling to mass manipulate individuals and groups, causes this privacy problem to only grow much worse over time, as data volumes increased exponentially and as people became more comfortable sharing greater amounts of data, more personally identifiable and sensitive data, more frequently with more people and organizations. Individuals are typically expected and required by current privacy regulations to manage marketing and privacy preferences, policies, and terms of use in hundreds of different places, applications, platforms and sites. The creates problems for a variety of reasons, such as location and usage awareness—cannot know all the locations and uses of all data, inconsistent control options and language—each application or website provides different types of settings while language inconsistencies make setting selections difficult to fully understand, profound inconvenience — even if all the locations and understood all the settings options are known, users are still required to access and login to hundreds of locations to define marketing and privacy preferences. Data therefore flows like water lawlessly and untraceably around the world. The systems and method disclosed herein allow for controlling data, and solving data privacy problems. Various embodiments of this disclosure provide that data and user preferences are secured in data containers. Sensitive data should be secured inside a trustable container before being shared or transferred. Data containers are mobile, cacheable, copyable and move freely in any way people or organizations want to move, share, or copy their data. The systems and method disclosed herein manage and control creation and access to these containers.

Some portions of the detailed description which follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

FIG. 1 shows a system for communicating personal privacy and marketing preferences according to one embodiment. In FIG. 1, the system includes a computer 102 for a user 100 to enter personal privacy and marketing preferences and additional user associated information into a central preference center 104. The central preference center (CPC) is configured to store a user's privacy and marketing preferences or dataset 106. As used herein, "central preference center" or "CPC" refers to a database, server, network, application, etc., that is configured to store, manage, and communicate a user's privacy and/or marketing preferences. The CPC 104 also stores the user's account data or information 108 that may be associated with the user's privacy and marketing preferences 106.

In some embodiments, the CPC 104 is coupled to a rule engine 110 configured to compare the user's CPC preference dataset to the user's entity privacy and marketing preferences 114 or other information such as policies or terms of use. The user's entity preferences dataset 114 may be received from entity preference center 112, which the user 100 may optionally have managed separately via computer 116. As used herein, "entity preference center" refers to a preference center other than the central preference center and includes, but is not limited to, preference centers under the control of, or affiliated with, commercial or non-commercial entities.

In some embodiments, a portal 118 is configured to receive, transmit, process, manage and/or store the user's CPC preferences and the user's entity preference center preferences. The portal may be implemented as a web portal, a telephone gateway, a file/data server, etc. The portal may be operated by a trusted entity or by the user. In some embodiments the portal is not implemented via a web browser.

Figure 2:
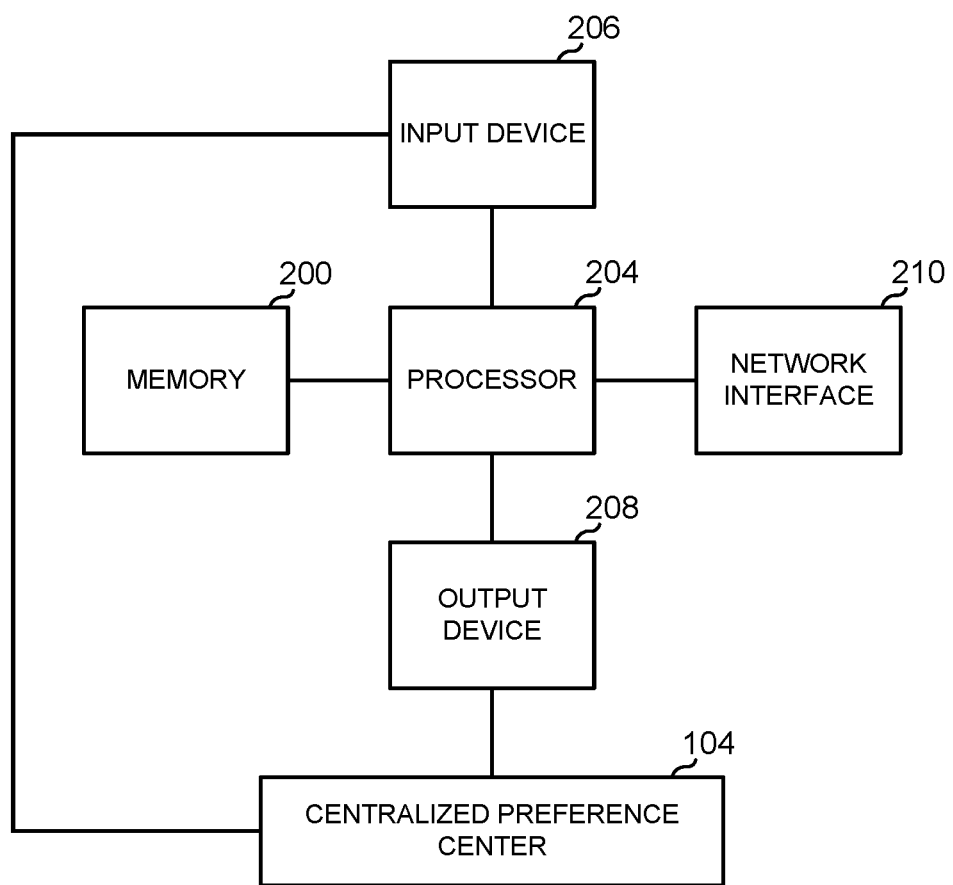
FIG. 2 illustrates a block diagram of an illustrative electronic device for user management of personal privacy and marketing data in accordance with various embodiments of this disclosure.

FIG. 2 shows a block diagram of an illustrative electronic device 102 or 116 for user management of personal privacy and marketing data 106 or 114 according to one embodiment. In FIG. 2, the device or computer 102 or 116 includes a memory 200 coupled to a processor 204, which controls the operations of an input device 206, an output device 208 and a network interface 210 such as wired or wireless modem with the internet and specifically with one or more remote servers, for example, the CPC 104 servers having server processors accessing a server storage medium on which is stored the user's personal privacy and marketing preferences and logic in accordance with present principles. The memory 200 may store instructions for the processor and/or data.

In one embodiment, the input device 206 includes key buttons that can be used to enter preferences and account information.

In one embodiment, the output device 208 may include a display, a speaker, and/or a printer.

In one embodiment, the network interface 210 is configured to communicate with the CPC 104 via a telephone connection, an Internet connection, or other data communication channel.

In one embodiment, the computer or device 102 or 116 may be a non-portable computing device or a portable computing device. The computing device permits the user to input, manage and receive data from the CPC.

Examples of non-portable consumer devices include a computer terminal, a television set, a personal computer, medical devices, robotic devices, data sensors, a set-top box, a thermostat, or the like. Examples of portable consumer devices include a portable computer, a cellular phone, a personal digital assistant (PDA), a tablet, a Google glasses, wearable computing devices, an automobile computer, wearable medical devices, or the like, for example, as illustrated in FIG. 3.

Figure 3:
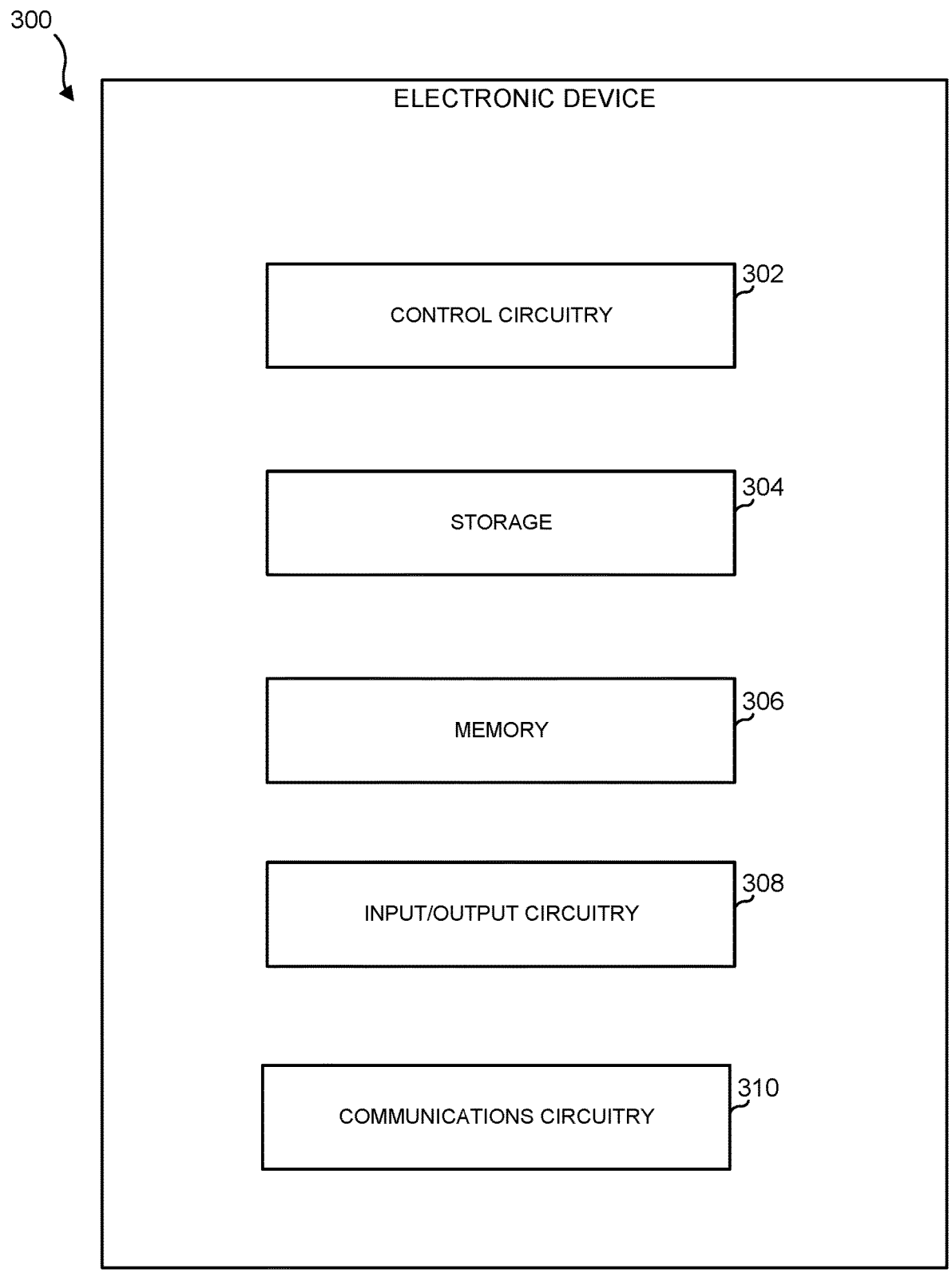
FIG. 3 illustrates a block diagram of an illustrative but not limiting electronic device for communicating personal privacy and marketing preferences in accordance with various embodiments of this disclosure.

FIG. 3 is a block diagram of an illustrative but not limiting electronic device for communicating personal privacy and marketing preferences in accordance with some embodiments of this disclosure. Electronic device 300 can include control circuitry 302, storage 304, memory 306, input/output ("I/O") circuitry 308, and communications circuitry 310. In some embodiments, one or more of the components of electronic device 300 can be combined or omitted (e.g., storage 304 and memory 306 may be combined). In some embodiments, electronic device 300 can include other components not combined or included in those shown in FIG. 3 (e.g., motion detection components, a power supply such as a battery or kinetics, a display, bus, a positioning system, a camera, an input mechanism, etc.), or several instances of the components shown in FIG. 3. For the sake of simplicity, only one of each of the components is shown in FIG. 3.

Electronic device 300 can include any suitable type of electronic device. For example, electronic device 300 can include a portable electronic device that the user may hold in his or her hand, such as a smartphone (e.g., an iPhone made available by Apple Inc. of Cupertino, Calif. or an Android device such as those produced and sold by Samsung). As another example, electronic device 300 can include a larger portable electronic device, such as a tablet or laptop computer. As yet another example, electronic device 300 can include a substantially fixed electronic device, such as a desktop computer.

Control circuitry 302 can include any processing circuitry or processor operative to control the operations and performance of electronic device 300. For example, control circuitry 302 can be used to run operating system applications, firmware applications, media playback applications, media editing applications, or any other application. In some embodiments, control circuitry 302 can drive a display and process inputs received from a user interface.

Storage 304 can include, for example, one or more storage mediums including a hard-drive, solid state drive, flash memory, permanent memory such as ROM, any other suitable type of storage component, or any combination thereof. Storage 304 can store, for example, media data (e.g., music and video files), application data (e.g., for implementing functions on electronic device 300), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 300 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 306 can include cache memory, semi-permanent memory such as RAM, and/or one or more different types of memory used for temporarily storing data. In some embodiments, memory 306 can also be used for storing data used to operate electronic device applications, or any other type of data that can be stored in storage 304. In some embodiments, memory 306 and storage 304 can be combined as a single storage medium.

I/O circuitry 308 can be operative to convert (and encode/decode, if necessary) analog signals and other signals into digital data. In some embodiments, I/O circuitry 308 can also convert digital data into any other type of signal, and vice-versa. For example, I/O circuitry 308 can receive and convert physical contact inputs (e.g., from a multi-touch screen), physical movements (e.g., from a mouse or sensor), analog audio signals (e.g., from a microphone), or any other input. The digital data can be provided to and received from control circuitry 302, storage 304, memory 306, or any other component of electronic device 300. Although I/O circuitry 308 is illustrated in FIG. 3 as a single component of electronic device 300, several instances of I/O circuitry 308 can be included in electronic device 300.

Electronic device 300 can include any suitable interface or component for allowing a user to provide inputs to I/O circuitry 308. For example, electronic device 300 can include any suitable input mechanism, such as for example, a button, keypad, dial, a click wheel, or a touch screen. In some embodiments, electronic device 300 can include a capacitive sensing mechanism, or a multi-touch capacitive sensing mechanism.

In some embodiments, electronic device 300 can include specialized output circuitry associated with output devices such as, for example, one or more audio outputs. The audio output can include one or more speakers (e.g., mono or stereo speakers) built into electronic device 300, or an audio component that is remotely coupled to electronic device 300 (e.g., a headset, headphones or earbuds that can be coupled to communications device with a wire or wirelessly).

In some embodiments, I/O circuitry 308 can include display circuitry (e.g., a screen or projection system) for providing a display visible to the user. For example, the display circuitry can include a screen (e.g., an LCD screen) that is incorporated in electronics device 300. As another example, the display circuitry can include a movable display or a projecting system for providing a display of content on a surface (e.g., optical displays, including head mounted displays such as digital contact lenses and eye glasses) remote from electronic device 300 (e.g., a video projector). In some embodiments, the display circuitry can include a coder/decoder (CODEC) to convert digital media data into analog signals. For example, the display circuitry (or other appropriate circuitry within electronic device 300) can include video CODECs, audio CODECs, or any other suitable type of CODEC.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 302. Alternatively, the display circuitry can be operative to provide instructions to a remote display.

Communications circuitry 310 can include any suitable communications circuitry operative to connect to a communications network and to transmit communications (e.g., voice or data) from electronic device 300 to other devices within the communications network. Communications circuitry 310 can be operative to interface with the communications network using any suitable communications protocol such as, for example, Wi-Fi (e.g., a 802.11 protocol), Bluetooth, radio frequency systems (e.g., 900 MHz, 1.4 GHz, and 5.6 GHz communication systems), infrared, GSM, GSM plus EDGE, CDMA, LTE and other cellular protocols, VOIP, TCP/IP, Ethernet, and the like.

In some embodiments, communications circuitry 310 can be operative to create a communications network using any suitable communications protocol. For example, communications circuitry 310 can create a short-range communications network using a short-range communications protocol to connect to other devices. For example, communications circuitry 310 can be operative to create a local communications network using the Bluetooth protocol to couple electronic device 300 with a Bluetooth headset.

Electronic device 300 can include one more instances of communications circuitry 310 for simultaneously performing several communications operations using different communications networks, although only one is shown in FIG. 3 to avoid overcomplicating the drawing. For example, electronic device 300 can include a first instance of communications circuitry 310 for communicating over a cellular network, and a second instance of communications circuitry 310 for communicating over Wi-Fi or using Bluetooth. In some embodiments, the same instance of communications circuitry 310 can be operative to provide for communications over several communications networks.

In some embodiments, electronic device 300 can be coupled to a host device for data transfers, synching the communications device, software or firmware updates, providing performance information to a remote source (e.g., providing riding characteristics to a remote server) or performing any other suitable operation that can require electronic device 300 to be coupled to a host device. Several electronic devices 300 can be coupled to a single host device using the host device as a server. Alternatively or additionally, electronic device 300 can be coupled to several host devices (e.g., for each of the plurality of the host devices to serve as a backup for data stored in electronic device 300).

Figure 4:
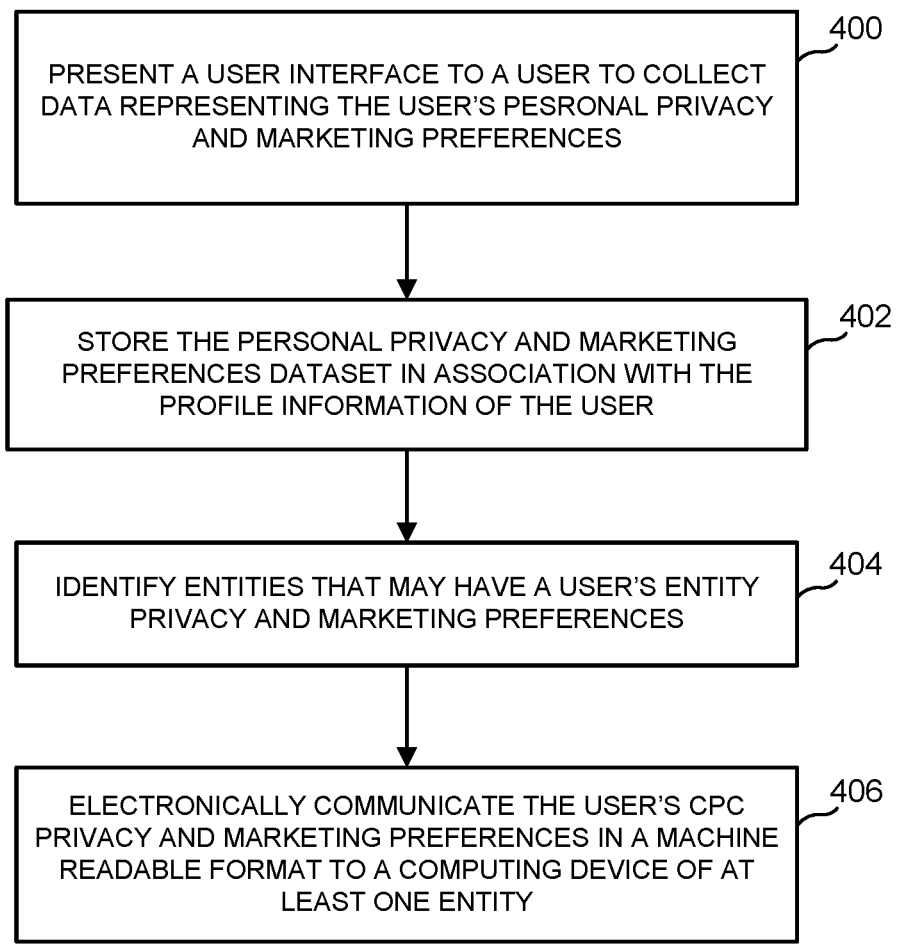
FIG. 4 illustrates a method of managing personal privacy and marketing data in accordance with various embodiments of this disclosure.

At step 400 in FIG. 4, the user accesses the CPC and accesses the user's account data 108. In one embodiment, a user interface is provided to serve as a "personal privacy and marketing control panel," where individual users record their preferences with instructions on how the users would like their data to be used. In one embodiment, the user may specify which preferences may be shared with which preference centers or entities, for instance, by identifying categories of entities. For example, the control panel can include broad categories of entities that the user may be similar privacy and marketing preferences, such as social networking (e.g., Instagram, Pinterest, Facebook, Tumblr, Twitter); business networking (e.g., Linkedin); money management entities (e.g., Fidelity, American Funds, Schwab, Scottrade, TD Ameritrade, T. Rowe Price, Vanguard, etc.); banking entities (e.g., American Express, Bank of America, Barclays, Capital One, Chase, Wells Fargo, USAA, etc.); stores and commerce entities (e.g., Apple, Amazon, Ebay, Groupon, PayPal, Target, Walmart, etc.); email providers (Google, Microsoft, Yahoo); media and entertainment entities (Flickr, Hulu, Minecraft, Pandora, Netflix, SoundCloud, YouTube, Match.com, E-Harmony, etc.); government and tax entities (e.g., H & R Block, Intuit, etc.; and miscellaneous entities (Dropbox, GitHub, Wordpress, etc.).

In general, users may manage their privacy preferences that cover the following uses: temporal, spatial, functional, identity, social, tracking and aggregation. An illustrative example of a temporal use is when the entity can collect and use data from the user. An illustrative example of a spatial use is where can the entity collect data about the user. An illustrative example of a functional use concerns how the entity can collect and use information about the user. An illustrative example of an identity use is what persona (including anonymous) is the user when the entity interacts with the user. An illustrative example of a social use is regarding who the entity can share information about the user. An illustrative example of tracking use is where the user can opt-in for online activity tracking. An illustrative example of aggregation use controls with whom the entity can aggregate user data.

Regarding social networking sites, privacy preferences may also include who can see the user's posts, whether the user would like to review posts that the user is tagged in, whether the user would like to limit the audience for the user's posts that have been shared by friends, who can send the user friend requests or messages, whether the user would like to include their email address and/or phone number with their preference dataset, whether the user would like to have their posts linked to a search engine, posting permissions for others regarding the user's timeline, whether to share location information (i.e., location "check-in" by default or not), etc. Privacy settings may also include security settings, and the user may select privacy/security preferences that include login notifications, verification preferences such as by using the user's phone number or text to verify account access, etc. In some embodiments, a user can even provide their own terms of use to be accepted by a service provider, whereas working with or providing services to a user, or providing access to any user information, is contingent upon acceptance of the terms of user. In some cases there can be a back and forth with different parameters of the terms of use being adjusted until both the user and service provider find the terms of use acceptable.

For example regarding business networking sites, privacy preferences may include whether and with whom activity broadcasts may be shared, who can see the user's activity feed, who can view connections, what can be viewed on the user's personal or public profiles, and to select people to block by default, etc.

For example regarding money management or banking preference centers, the user may select whether to permit sharing of information with affiliates and non-affiliates or the money manager or bank, storage of cookies, flash cookies (i.e., LSOs), etc.

In one embodiment, the "personal privacy and marketing control panel" provides pre-labeled or pre-populated fields that may be marked by the user to reflect their privacy and marketing preferences. For example, a set of baseline marketing and privacy preferences for different types of entities may be provided.

In one embodiment, the personal privacy and marketing preferences datasets of a user are stored and shareable in a standardized format.

At step 402, the personal privacy and marketing preferences data is stored in association with the preference dataset of the user.

In one embodiment, the user may store multiple policies, or other information of documents such as terms of use, in association with their account information, with each preference dataset being appropriate for the category which the entity is a member, e.g., social networking, media and entertainment, business networking, etc.

In one embodiment, at least 1, 2, 4, 6, 8, 10, 12, 14, 16, 18, 20 or more preference datasets may be created. In one embodiment, at least one preference dataset is created for each preference center. In one embodiment, the control panel permits the user to duplicate a preference dataset. In one embodiment the duplicated preference dataset may be edited to change the user's privacy and marketing preferences. The preference datasets may be saved separately with unique names or titles that may reflect, for example, the website, preference center, and/or entity for intended use.

At step 404, the user identifies from a list of common entities such those identified above, among others, and can further add the name of an entity preference center or web site with which the user has an account to a searchable field. In one embodiment, the CPC maintains a database of entity preference centers and/or websites with which a user may have an account. The CPC may alternatively perform a search of the internet to identify the entity preference centers and/or web sites and send a query to the entity preference centers and/or web sites asking if a user has a preference dataset matching the account information recorded with the CPC.

In one embodiment, the CPC or perhaps specifically within the control panel, a user may identify settings by which the preference dataset may be communicated to the entity preference center or website.

At step 406, the CPC electronically communicates or publishes the privacy and marketing preferences of the user in a machine readable format to a computing device of at least one entity preference center. In one embodiment, electronic communication of the privacy and marketing preferences of the user is automatic upon saving of the preference dataset or within a set period of time after the preference dataset is saved, continuously, or at set intervals as determined by the user or by the authority controlling the CPC. In one embodiment, electronic communication of the privacy and marketing preferences of the user to the entity preference center or website is via secure internet connection.

Figure 5:
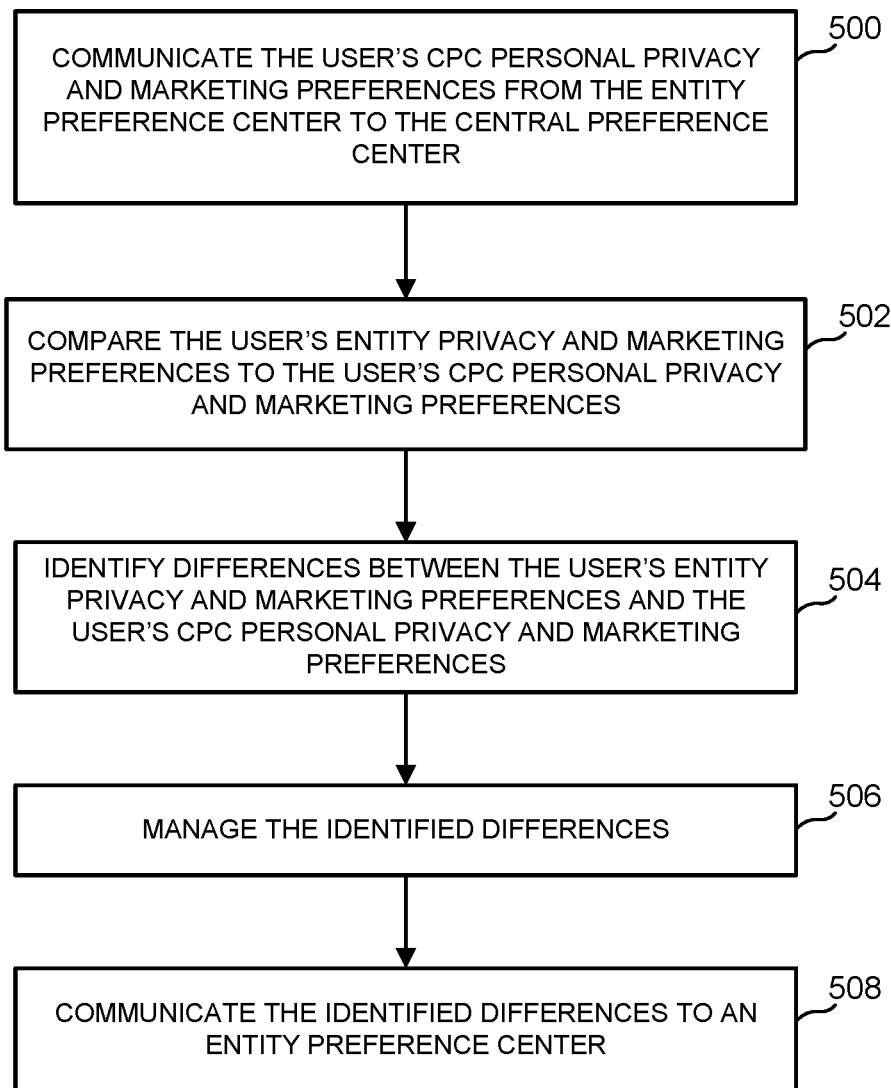
FIG. 5 illustrates a method of managing personal privacy and marketing data in accordance with various embodiments of this disclosure.

FIG. 5 shows a method of managing personal privacy and marketing data. In FIG. 5, as shown in step 500, in one embodiment, a computer apparatus of the CPC is configured to communicate with an application or computing apparatus of an entity preference center or website in order to retrieve the user's privacy and marketing preferences from the entity preference center or website.

In one embodiment, a computing apparatus of an entity preference center or website 112 is configured to communicate with a computer apparatus of the CPC and sends/aggregates the user's existing privacy and marketing preferences to the CPC.

At step 502, the user's entity preference center or website's existing privacy and marketing preferences are received by the CPC. In one embodiment, the user's entity preferences dataset 114 is compared to the user's personal privacy and marketing preferences dataset 106 via a rule engine 110, see FIG. 1.

At step 504, the rule engine 110 is configured to identify differences between the entity preference center preferences dataset 114 and CPC preferences dataset 106.

At step 506, the user may manage or reconciliate differences identified by the rule engine 110, for instance, by permitting the user to accept the changes to the user's corresponding CPC personal privacy and marketing preferences 106. In another embodiment, the user has the option (e.g., through the control panel), to apply and optionally save accepted changes to other preference datasets or globally across all preference datasets associated with the user's account.

At step 508, the updated preference datasets may be re-published to the entity preference center, substantially or identically as described by step 406 above.

Figure 6A:
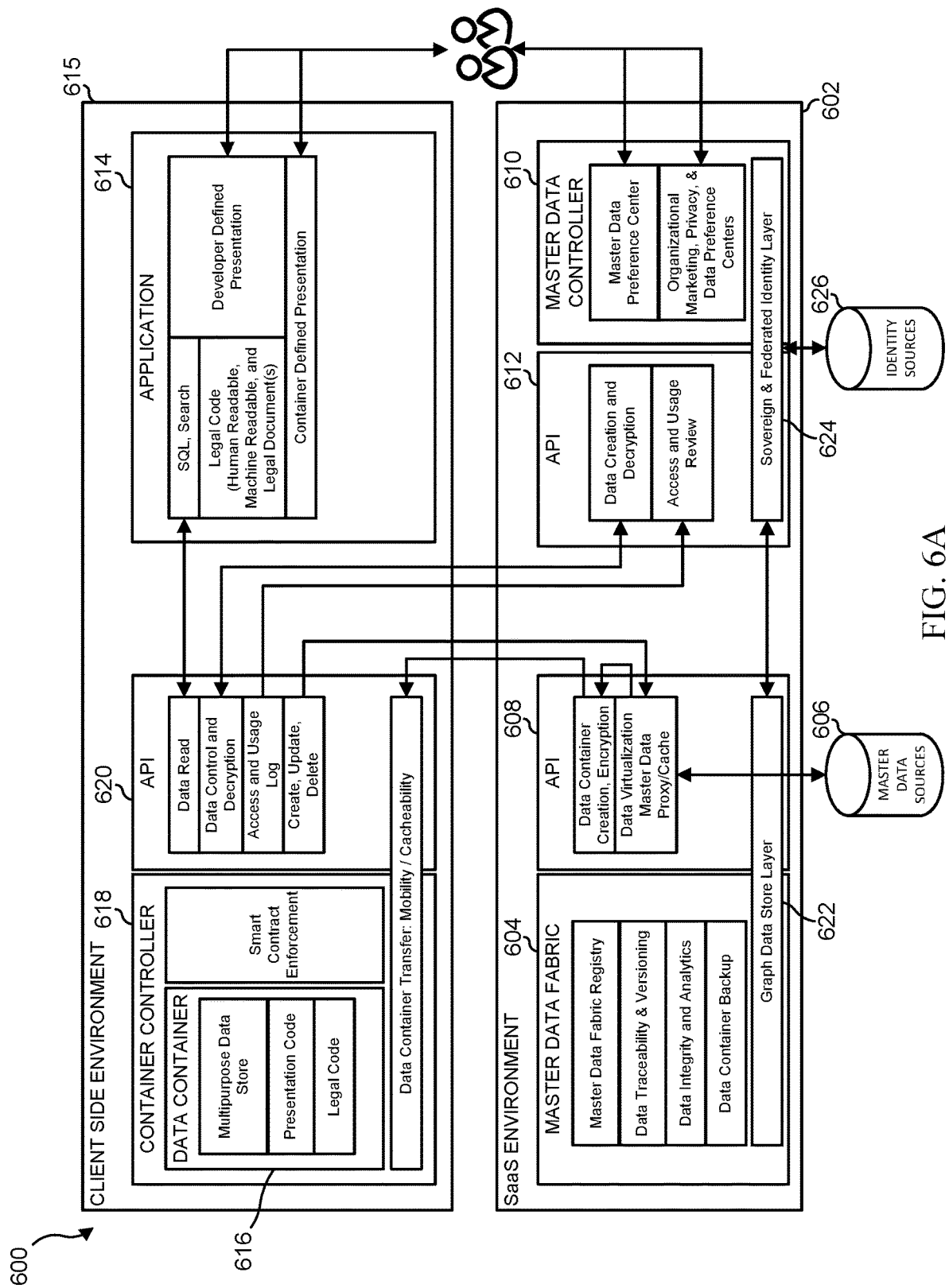
FIG. 6A illustrates a data control architecture in accordance with various embodiments of this disclosure.

FIG. 6A illustrates a data control architecture 600 in accordance with various embodiments of this disclosure. The architecture 600 includes a software as a service ("SaaS") environment 602 that can include one or more electronic devices such as a plurality of interconnected servers. The SaaS environment 602 can include a master data fabric 604 used to store information relating to data or data containers, such as a master data fabric registry, data traceability and versioning information, data integrity and analytics information, and data container backups. The master data fabric 604 tracks the data container lifecycle for all replicas, aggregates, physical locations, data lineage, and contract lineage. Data and smart data contract changes automatically version and update all downstream containers keeping all copies synced to the master data source. A data store of master data sources 606 can be accessed by an API 608 of the master data fabric 604 to access and cache data, such as during data container creation, deletion, or updating, providing an agile data architecture. Typically, applications will duplicate data from many different data sources to create one data store the application depends upon to function properly. Developers and application architects typically try to control all the data for their users. In many enterprises each new application begets a new data store dedicated to that application which creates copies of many data sources. As data duplication grows, data management and governance also grow more complex. Data quality is degraded with each new redundant copy while master data management grows more complex as updates originate from multiple sources. This complicates the reintegration of the data changes back into the original master data stores and as well as the many copies of that master data store.

Most large enterprises struggle to know which data store is their master for each data element, to identify which applications need updates, and to figure out which copy of a piece of data is the correct one. The larger the organization the worse these problems become. This disclosure enables data to flow directly from many master data sources, including updates from those master data sources such that all new applications can avoid creating a redundant dedicated data store. This can save 50% or more of an application's development cost and accelerate development time making agile development more feasible due to a more agile, adaptable, and flexible data architecture. This disclosure improves the outcomes and effectiveness of data management and governance programs by eliminating redundant data stores, by reducing data redundancy and improving data quality, by accelerating the development of new applications, and by eliminating data updates to the master and all data copies.

The architecture 600 and its various other embodiments of this disclosure, provides that individuals and organizations can define, refine, and enforce digital contracts and control the uses of data within exchanges or transactions. Traditionally there has been a lack of data control as the underlying problem shared across data security and data privacy domains. In various embodiments of this disclosure, data containers can be programmable contract-enforcing data building blocks. Using such programmable data containers to secure data and providing control parameters around the data containers enable the ability to secure, contract, encrypt, transfer, audit, program, and monetize data. The data containers protect data privacy and allow for dynamic configuration and personalization. Data ownership rights are preserved while data is secured and exchanged for relevant and personalized digital services. Data containers of this disclosure ensure all current and future data uses are consent-based, meaning the owner controls the data and digital relationships.

The SaaS environment 602 also includes a master data controller 610 including a master data preference center, which, in some embodiments, can be, utilize, or incorporate the centralized preference center 104. The master data controller 610, via the master data preference center and an API 612, can control access to and decryption of containers stored in association with the SaaS environment 602 using preferences defined or set by users and stored in the master data preference center. The master data controller 610 can also manage, contract, control and monetize individual or organizational data. The master data controller 610 provides a single point of control to manage and audit data exchanges between users, organizations, customers, partners, and associates. In some embodiments, as illustrated in FIG. 6A, an application 614 in client-side environment 615, such as on a client device, can include data on various user information, such as user marketing and data sharing preferences, documents such as deeds or contracts, or other data. In some embodiments, this data can be requested from the master data preference center and presented to a user in the application using developer defined presentation parameters and/or user defined presentation parameters. For example, the application can provide for data sharing and presentation of dashboards with partners. Data and dashboards with interpretations of that data, often by telling a visual story, can be shared with business partners while retaining access control, restrict presentation by domain and enforcing contract terms of use. Typically, when a business shares data or dashboards with partners they retain zero control over either the data or the dashboard analytics.

This disclosure enables the sharing of data and analytics to any partners anywhere online while ensuring continued data control while propagating data updates in real-time directly from the master data sources 606. In some embodiments, the container defined presentation and developer defined presentation parameters are stored in a data container 616 as defined in the various embodiments of this disclosure. Upon decryption and decoding of the data container 616, data stored in the data container 616 is presented in the application 614 as defined by the container defined presentation parameters and/or the developer defined presentation parameters.

The architecture 600 allows for data and preferences created or updated by a user to be secured and encrypted inside a container 616. When a user creates or updates data and preferences using the application in the client device, in some embodiments, an API call to an API 620 of a container controller 618 stored on the client device is executed. The API call causes the container controller 618 to read the data provided by the application, create a data container 616, and store the user data and preferences in the data container 616. In some embodiments, the data is encrypted prior to or when encoding the data into the data container. In some embodiments, the data container itself can be encrypted in conjunction with, or instead of, the data, creating a double encrypted object. The data container is then stored in the SaaS environment 602. In some embodiments, the user can also retain a copy of the container on the client device. In some embodiments, the container controller 618 can perform encryption of the data and/or the data container 616. In some embodiments, the data and/or the data container 616 can be transmitted to the master data fabric 604 and encrypted by one or more devices of the SaaS environment 602. In some embodiments, the container controller can perform an API call to the master data fabric 604 in the SaaS environment 602, executing a remote process to create and/or encrypt the data and/or the data container 616. In various embodiments of this disclosure, the edge data controller or container controller 618 gates and controls all access to data containers while enforcing smart contracts. The edge data controller or container controller 618 enforces compliance at the network edge, enabling or disabling data access while providing secure edge compute data intensive functionality.

Data containers 616 can include a multipurpose data store including data such as text or multimedia data, presentation code for how to present the data stored in the multipurpose data store, and legal code defining how the data is to be used, such as defined user preferences or other parameters or constraints on the data usage. In some embodiments, the defined user preferences or other parameters or constraints on the data usage are included in a smart contract. Smart data contracts are self-executing, self-enforcing, and auditable digital agreements. Smart contracts are used to enforce organizational data policies, data licenses, and terms of use restricting all future use cases of data and data containers. Smart contracts can also be used to monetize data and data uses, including pricing digital services higher for high value use cases and lower for low value use cases while prohibiting all other use cases. Pricing variations can also be based on any potential smart-contract term like date/time, location, duration, identity, organizational size, type and selected use cases. In some embodiments, a limited number of containers for a specific source container can be created to create digital scarcity of the container and its data. In various embodiments of this disclosure, smart contracts provide specific constraints or permissions on the usage of data containers. In various embodiments of this disclosure, transactions between two parties use data secured within data containers with smart data contracts that enforce preferences, policies, licenses, terms of use, and other data agreements.

The architecture 600 allow for convenient management of data security and privacy across many relationships using one master data control center. Smart contracts can be created and revised to control all current and future data uses, and data can be secured from criminals using encryption while sharing more data in tailored ways. Use of data in a data container requires consent of the owner of the data, such as express permission granted under the various methods of this disclosure. In various embodiments of this disclosure, users control their data their consent to specific data uses. Users can revoke consent and access with one click or command. Data containers can be created, transferred, versioned, deactivated for noncompliance, reactivated for compliance, have access revoked, and even flagged for deletion. Various embodiments also provide for one-click registration, i.e., establishing data use access, which simplifies and accelerates new digital relationships. Users can control data by revising terms of use even after registration. Users can automatically synchronize privacy settings like email opt-ins, cookie tracking selections, and site privacy choices across many brand relationships from a single location.

The master data sources 606 can store data for users such as biographical data, financial data, master data marketing and privacy preferences, and other data, which can also be stored in containers within the master data sources 606. When a user is presented with a registration or signup opportunity to enter into a relationship with another user or entity, the user can simply select to agree to enter the relationship with one click, and the SaaS environment 602 then retrieves the data used to create the relationship, which may be defined by the other user or entity, and creates one or more sharable containers managed by a smart contract that defines use or access parameters for the other user or entity. In some embodiments, when a user updates information, such as an address, a phone number, or other information, the master data sources 606 can be automatically updated to reflect the change. In some embodiments, all containers that include the information can also be updated automatically so that data remains consistent across all the user's data containers.

Covenants are created, transferred, versioned, activated when compliant, deactivated when not compliant, eventually ended by the owner revoking all data access, and finally flagged for deletion.

The legal code included in the data container and the smart contract can indicate entities, websites, etc. that can access the data, or can indicate how data stored in the data container can be shared. In some embodiments, the legal code or smart contract provided by the application 614 of the client device and stored in the data container 616 can be stored in a three-layer legal code format. This format can include a machine-readable format enabling automation, a human readable "deed" format that provides terms easily understandable to users, and a legal language format for legal entities or to be used in legal disputes. In some embodiments, any user or entity wishing to access a container 616 uses a container controller 618 such as illustrated in FIG. 6A to access a container 616, and the container controller 618 enforces the data usage constraints defined in the contract. In some embodiments, the container controller 618 works in conjunction with the master data controller 610 to manage data containers and enforce access parameters.

Data containers 616 can also store various metadata associated with the content within the container. Data containers are programmable building blocks. The server-side master data controller API 612 provides for the programmatic creation and remote control of data containers regardless of their location. The client-side container controller API 620 provides access to the data container 616 and its contained data as well as enforcement of the container's contract. The master data fabric API 608 maintains data container and data contract lineage allowing data accessed from source containers to be transformed and loaded into destination containers while tracking global data lineage and accumulated contract rights and limitations. The data container 616 can include presentation code and the container controller can enforce that presentation and resultant interpretation of the data. The container controller 618 also provides query and search functions across a large set of containers while enforcing the individual contracts contained in each container.

The architecture 600 provides that the integrity of data containers and their access mechanisms are verifiable and trustable. For example, data containers 616 can have a unique identifier. Upon creation, a container 616 is registered with the master data fabric registry of the master data fabric 604 that performs data control fabric integrity checks. In some embodiments, containers that fail integrity checks can self-destruct, either by deletion or by permanent access revocation. In some embodiments, encryption of data and/or data containers is performed using keys controlled, created, or provided by a user or the container controller, such as by using a bring your own keys (BYOK) scheme, or, in some embodiments, keys can be provided and maintained by the master data controller 610 or another SaaS environment component. Using a BYOK scheme enables individual users or organization to control their own keys, and in some embodiments makes it so the components of the SaaS environment, while in some embodiments can store the container, cannot decrypt the container. Decryption keys would be provided from the owner to those individuals or organizations that are granted access to the container via the various methods of this disclosure. Keeping data in each container encrypted can also provide substantial security benefits. Hackers may be able get to the stored containers, but, because each one is encrypted with a user specific encryption key, the effort to crack any one container's key greatly exceeds the value of any one container. When a hacker sees a company using containers for users and possibly many other kinds of sensitive data they know the effort/return ratio is highly unattractive. Different types of encryption methods or different levels of encryption can be used for different containers 616 or the different types of data in a container 616. In some embodiments, sensitive or personally identifiable data is encrypted by default. In some embodiments, all data and/or all containers 616 are encrypted in all circumstances.

Access to and usage of a data container 616 is requested and informed consent provided to users before another user or entity can be provided access or usage of the data container 616. The data secured within the container 616 is controlled by the terms of the contract via functions provided by the master data controller 610, the master data fabric 604, and the edge container controller 618. In some embodiments, data containers and smart contracts enforce and automate legal rights like the right to consent, to be forgotten, to data portability, and to jurisdictional compliance. Data containers and smart contracts enforce and automate privacy regulations, data policies and licenses. When access is requested, the master data controller 610 and/or the master data fabric 604 can use a graph data store layer 622 that provides information on the container 616, along with a federated identity layer 624 that provides access to a data store of other user or entity identities 626. For example, if a third-party website requests access to a container 616 associated with a user, the master data controller 610 retrieves information on the container 616 from the master data fabric 604, such as the container identifier, and determines from the stored identity sources and user preferences whether the third-party is allowed access to or usage of data in the data container 616. Access and use of data should conform to the terms of the included contract articulating access, usage, retention, copy, derivative works, updates, share terms and monetization limits or conditions. The data owner and data container creator can revoke consent to access the data container via the master data controller 610, the master data fabric 604, and/or the edge container controller 618, permanently revoking access to a third-party.

In some embodiments, the graph data store layer 622 and/or the federated identity layer 624 can be database systems such as a relational database or graph database. In some embodiments, the graph data store layer 622 and the federated identity layer 624 can be combined, such as being a graph database including data on containers and on entity identities, and defining relationships between containers and entities, and/or relationships between different containers and between different entities. In some embodiments, this data store can also store access permissions for containers as pertaining to users or entities.

The master data preference center of the master data controller 610 also allows for the control and management of data containers 616. For example, the master data preference center allows for managing privacy and marketing preferences using multiple identities of a user's choice across many relationships with both people and organizations, logging which provides access and usage transparency, monitoring of data containers and data lineage from one location, and managing requests for data updates and requests for different contract terms from one location. In some embodiments, containers 616 are organized using the master data control fabric 604. In some embodiments, the master data fabric 604 and the master data controller 610 can be integrated. For example, the master data fabric 604 could be removed from FIG. 6A, and all functionality of the master data fabric 604 can be included in the master data controller 610, and the functionality of the API 608 can be included in the API 612.

Containers 616 reference each other and their contracts for data lineage, legal compliance, and forensics. Containers 616 are associated with their master data source and can be updated and versioned. The master data fabric registry maintains a registry of all containers 616, their owner, the current holder, the master data source URL to source data updates, as well as their physical and URL locations for both the original and any copies. In various embodiments of this disclosure, data containers are registered and tracked with a Universal Unique Identifier (UUID) by the master data fabric 604, the master data controller 610, and/or the container controller 618. The UUID makes each data container unique. In various embodiments of this disclosure, UUID of data containers can be mapped to other unique identifiers, such as public keys, blockchain owner IDs, distributes IDs, RFIDs, QR codes, or other identifiers. In some embodiments, the UUID can be stored in association with a source URL and a data container location URL to enable remote control, versioning, and auditing while tracking and enforcing global data and contract lineage. In some embodiments, the SaaS environment 602 possesses only the metadata of the containers, creators, owners, holders, transfers and associated linkages to maintain the integrity of the individual containers and the collective master data fabric 604. In some embodiments, while the SaaS environment 602 secures the data within the containers, enforces the included contract terms, and tracks the global data fabric lineage, only the container creator and owner can access and allow others to access the data secured within each container.

Various embodiments of this disclosure provide that data and user preferences are secured in data containers. Sensitive data should be secured inside a trustable container before being shared or transferred. Data containers are mobile, cacheable, copyable and move freely in any way people or organizations want to move, share, or copy their data. The container controller 618 in concert with the master data controller 610 and/or the master data fabric 604 to prevent unauthorized access and use of the secured data. In various embodiments of this disclosure, there are different types of data containers, such as media data containers that handle mixed modality media like images, audio and video that adapt dynamically to the modality and accessibility preferences of users as they dynamically shift from audio interfaces, graphic interfaces, AR/VR interfaces and hybrid interfaces, centralized cloud containers that handle secure compute functions on cloud platforms, and mobile edge containers that handle secure mobility, compute, caching at the edge of the network within browsers, desktops, edge servers, CDN cache servers, mobile devices and a growing array of IoT devices. In some embodiments, the container controller 618 can be an edge device that is situated at an edge of a data network to provide faster processing and response times for users.

It will be understood that the SaaS environment 602 can include a device such as a server, or a plurality of devices, such as a distributed network of servers. It will also be understood that the master data fabric 604 and the master data controller 610 can be server side software applications stored in memory and executed one or more processors of one or more server devices. Various data can be stored by SaaS environment devices in databases or other data stores such as container registry data, master data sources 606, identity sources 626, graph databases, container access and usage logs, or any other data disclosed herein. Usage logs maintained by the master data controller 610 and/or the container controller 618 provides a data lineage for each data container, including creation date, access attempts, identities of those who have accessed the data container, identification of copies of the data container, and other information on data containers.

Figure 6B:
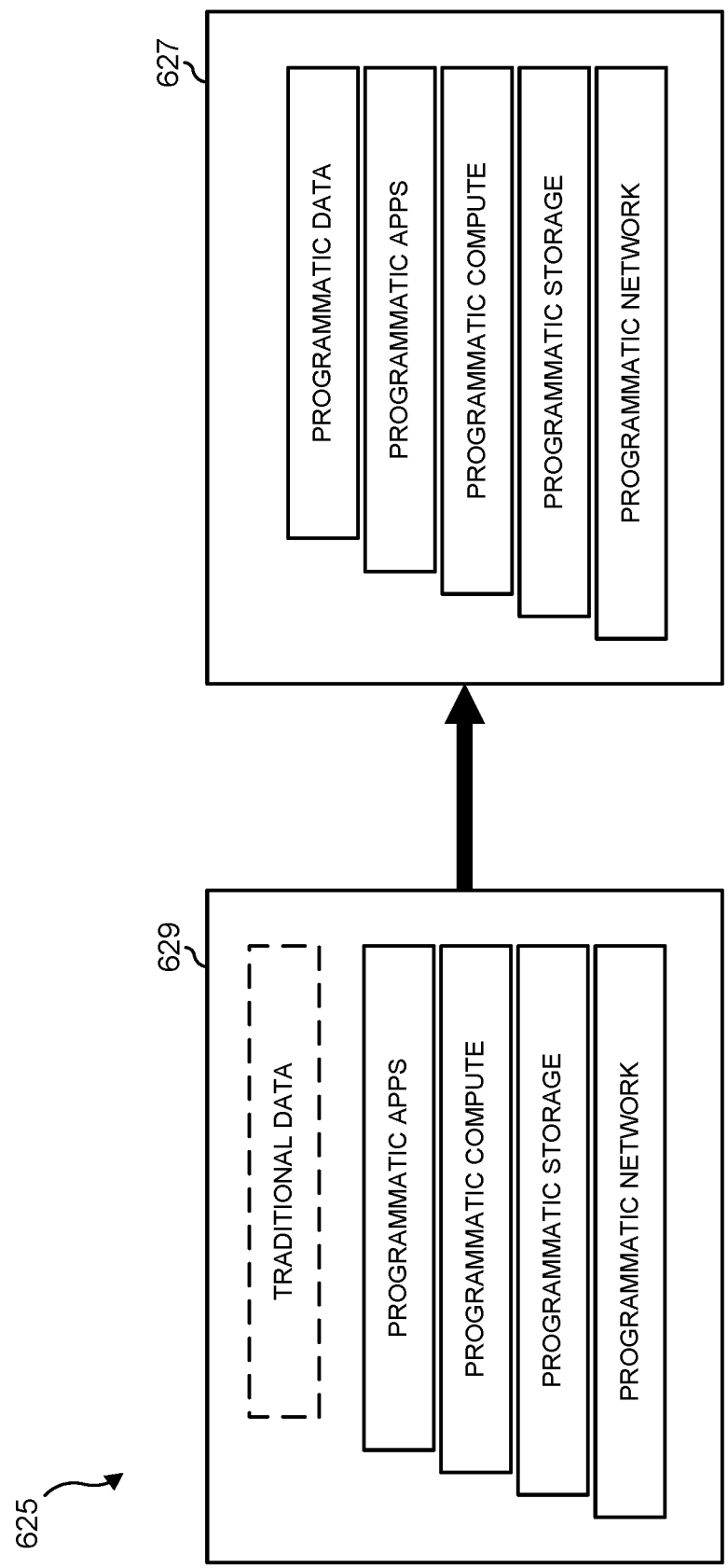
FIG. 6B illustrates a diagram of a stack including programmatic data in accordance with various embodiments of this disclosure.

FIG. 6B illustrates a diagram 625 of a stack 627 including programmatic data in accordance with various embodiments of this disclosure. Computing in previous decades has seen the automation and programmability of various technologies introduced, such as programmatic networks, programmatic storage, programmatic compute or computing, and programmatic applications, increasing the efficiency and adaptability of these technologies.

For example, virtual local area networks (VLANs) provided for virtual networks within core switches resulting in increased network agility and cost efficiency. Programmatic storage emerged such as software defined storage that created shared pools of disks for racks of servers resulted in storage automation, cost efficiency, and agility. Software defined networking connected software defined storage to software defined computing resources, creating converged network automation, cost efficiency, and agility. Software defined compute and server virtualization (VMware) created virtualized software servers within physical servers, resulting in server automation, cost efficiency, and agility of these systems. Software defined data centers created virtualized data centers provisioned on demand, combining software defined storage, networking, and compute resulting in data center cost efficiency and agility. Software defined operating systems created programmatic application containers, such as dockers, i.e., programmatic applications that enable automated management and compliance, resulting in increased application automation, cost efficiency, and agility of applications. Cloud platforms created external platforms as a service provisioned on demand, combining software defined storage, networking, and compute to create on demand data centers with increased cost efficiency and agility or adaptability. All of these technologies can be included in a hybrid cloud to provide for the benefits of each technology.

However, despite such technologies emerging, data is still used in a traditional manner, as illustrated in stack 629, such that the data is stored, accessed, and secured using non-programmatic paradigms. While data can be somewhat protected using encryption, data cannot be ultimately prevented from being disseminated or shared, and accessed. Even more problematic, individuals and organizations have few options for ensuring data shared with others is maintained, discarded, and not shared in accordance with the wishes of those users and organizations. This results in inadequate, or non-existent, data automation and agility with high data management, security, and compliance expenditures. As other computing technologies have emerged with programmatic solutions, it has become apparent that data in the technology stack lacks, and would benefit from, programmatic automation to better control and secure data. Incorporating software defined or programmatic data and data clouds into the stack 627, and as described in the various embodiments of this disclosure, provides for data automation and increased agility, security, and data compliance. Software defined data described in the various embodiments of this disclosure provides for programmatic data that can be controlled to provide increased data agility, and automatic management and compliance.

Figure 7:
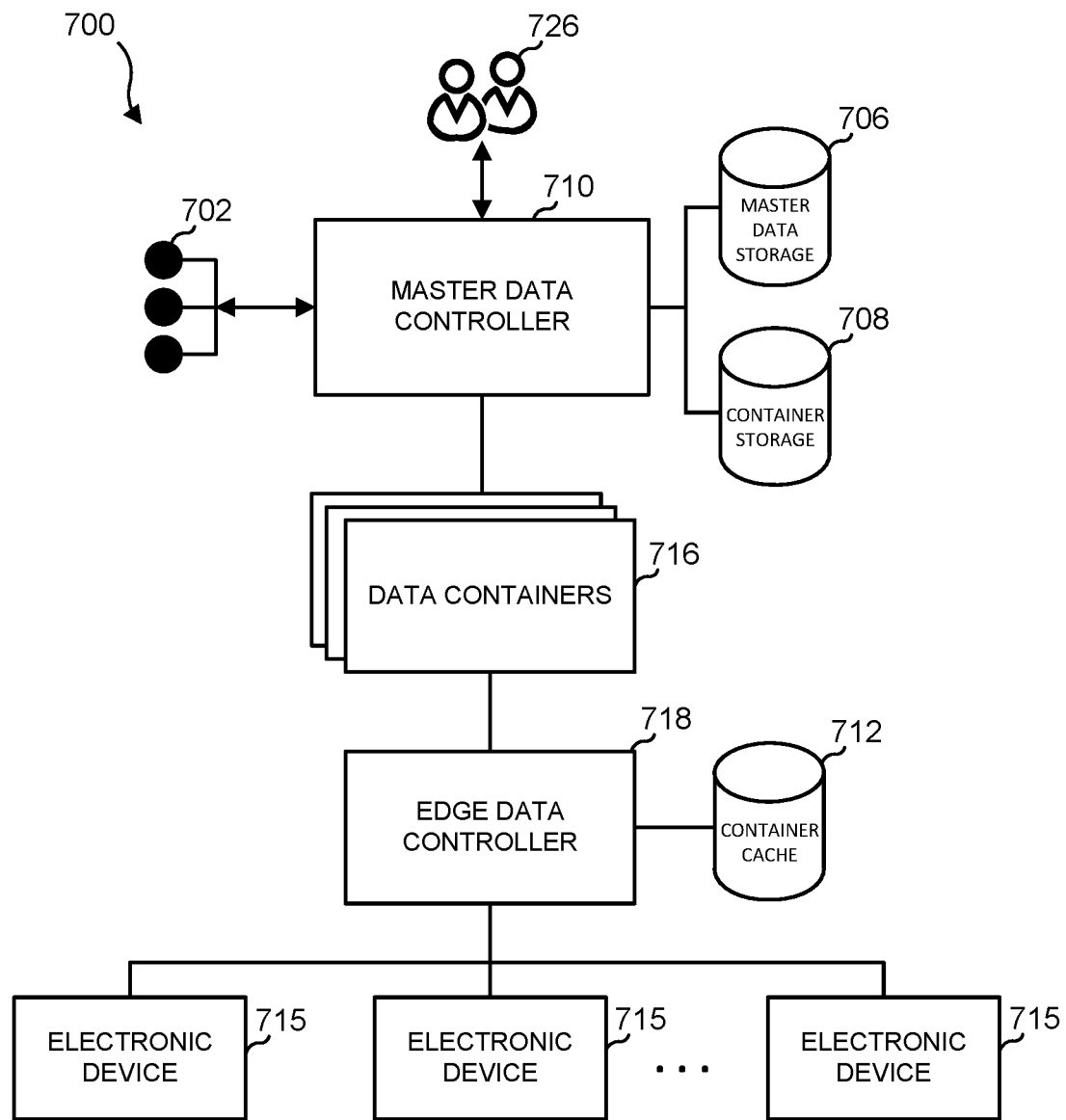
FIG. 7 illustrates a container access and control architecture in accordance with various embodiments of this disclosure.

FIG. 7 illustrates a container access and control architecture 700 in accordance with various embodiments of this disclosure. In some embodiments, the architecture 700 can be, include, or be included within, the architecture 600. The architecture 700 includes a master data controller 710. The master data controller 710 can be the master data controller 610 in various embodiments, as described with respect to FIG. 6A. As described in the various embodiments of this disclosure, it will be understood that the master data controller 710 can be included as a software application or applications included on or executed by a device such as a server, or a plurality of devices, such as a distributed network of servers. Various data can be stored by the server, and accessible by the master data controller, such as in databases or other data stores such as container registry data, master data sources or storage 706, identity sources 726, graph databases, container access and usage logs, or any other data disclosed herein.

In various embodiments of this disclosure, the master data controller 710 is configured to manage containers and smart data contracts, manage marketing and privacy preferences, manage data policies for organizations, and/or manage data monetization. The master data controller 710 connects to one or more users, entities, or organizations 702 to manage each of these data characteristics, access parameters, or relationships. The master data controller 710 also is configured to manage data containers 716. The master data controller 710 can control the storage of, access to, and transmission of data containers, as defined by the smart contract or security parameters established by the owner of the data included in a data container. In some embodiments, the architecture 700 can include a master data fabric as described with respect to FIG. 6A configured to maintain a global data container registry, manage smart data contracts and data lineage metadata, audit, logs, and/or compliance information, and manage data cache and virtualization for containers and data. In some embodiments, the architecture 700 does not include a separate master data fabric application or applications, and incorporates these functions into the master data controller 710. It will be understood that the master data controller 710 can include a plurality of applications or APIs for performing each task related to user security permissions and data container management.

The master data controller 710 connects to one or more datastores of master data storage 706, which can be the master data sources 606 as described with respect to FIG. 6A. The datastores for the master data storage 706 can be stored in memory or hard disks in association with the server or servers and can store the data in encrypted containers to protect user information and other data. A user, entity, or organization can entrust data to the master data controller 710 for containerization and storage into the master data storage 706. When a new container is to be created and parameters set for defining access to the data stored within the new container, the master data controller 710 can receive such data from the user, entity, or organization for storage into the new container and into the master data storage 706, or the master data controller 710 can retrieve data already included within the master data storage 706.

In some embodiments, the master data storage 706 can include or be associated with a database such as a relational or graph database that defines the relationships between a user, entity, or organization with the different data on that user, entity, or organization, and also defining the types of data stored within the containers in the master data storage 706. For example, a container can be stored in association, as defined by the database, with an identity, that is, a user, organization, etc., and the container can be identified by the types of information within the container. The types of information stored in the container can include a large amount of data, such as all of a user's biographical information such as name, address, birthdate, etc., authentication information such as usernames, passwords, security questions, etc., financial information such as credit card information, billing address, digital payment methods, income or salary, etc., and other information used to establish relationships with other users, organizations, or services. In some embodiments, the master data storage 706 can partition sensitive information between multiple containers. For example, portions of a user's biographic information can be stored in one or more containers, portions of a user's financial information can be stored in one or more other containers, and so on. In some embodiments, containers can include metadata that is accessible by the master data controller 710 without revealing the contents of the container. For example, the container may include metadata that specifies a user ID, a container ID, and the type of information included, such as specifying the container includes biographic and/or financial data, without revealing any of the sensitive information. This allows the master data controller 710 to identify which container to retrieve when a new relationship establishment has been requested.

The master data controller 710 also is configured to access a container storage 708. The container storage 708 can be one or more datastores that store containers that have been created in accordance with a data relationship. For instance, a user wishing to grant access of the user's data to an entity such as a social media platform, a car rental company, a streaming service, or any other type of entity, can, whether initiated by the user or the entity, provide permission to the master data controller 710 to allow the entity to access and use the user's data. The master data controller 710 then retrieves the necessary data from the master data storage 706, and creates a new container constrained by a smart contract or parameters defining the nature of the entity's use of the user's data, and stores the new container in the container storage 708.

The container storage 708 can be associated with a database such as a relational database or graph database identifying the container by UUID and recording the relationships between the container and other entities and other containers. Data containers can also be nested within each other to create aggregated data containers that consolidate data from more than one original containers in order to associate the data of the more than one original containers. Multiple containers can be created and stored in the container storage 708 in association with a user to provide access of different types of data to one or more entities. In some embodiments, one container can be created as designated by the data owner for use with a plurality of entities. For example, the user may choose to have the master data controller 710 create a master container that includes a plurality of data and a master smart contract used to create relationships with entities, and use that same container and smart contract to establish those relationships, the master data controller 710 updating the database to associated the master container with the permitted entities. The master data controller 710 also manages versioning of containers. For example, if a user updates information such as the user's address, financial information, etc., the master data controller 710 updates the master data storage 706 with the new data, and can also create new containers in the container storage 708 with new version numbers or UUIDs, so that subsequent container access by allowed parties provides access to the updated information. In some embodiments, the master data controller 710 can discard information related to the original container, or can keep a record of previous container versions, such as what data was contained within the previous containers, their UUIDs, metadata, or other information.

The architecture 700 also includes an edge data controller 718. It will be understood that the edge data controller 718 can be one or more software applications stored in a memory and executed by one or more processors that manages use of data containers for users and other entities. In various embodiments of this disclosure the edge data controller 718 can be the container controller 618 described with respect to FIG. 6A. In various embodiments of this disclosure, the container controller 618 and/or the edge data controller 718 gate access to and use or viewing of data in the data containers 716, providing remote control, decryption, access and audit logging, and smart data contract and compliance enforcement. In various embodiments, the data containers 716 are read only and secured by encryption, such as using a public-private key scheme, and/or a BYOK key scheme with data owner's managing decryption keys. The data containers 716, as described in the various embodiments of this disclosure, are programmable data objects that can be copied and distributed, with their distribution and access logged by the master data controller 710 and/or the edge data controller 718.

In some embodiments, the edge data controller 718 is situated at an edge of a network to shift data processing as close to electronic devices 715 as possible to enhance performance, security and privacy. This enables data intensive workloads at the network edge closest to end users where security and privacy are best enforced and protected. In some embodiments, the edge data controller 718 is situated at an edge node and connects to the electronic devices 715 to manage the creation of or access to data containers for the electronic devices 715 using the established access parameters or smart contracts. The electronic devices 715 can in some embodiments be referred to as edge devices that can desktop or laptop computers, servers, mobile devices, Internet of Things (IoT) devices, sensors, or other devices. In some embodiments, the edge data controller 718 has access to a container cache 712 that stores copies of containers from container storage 708 for more efficient retrieval of containers for use by or viewing of the containers by the electronic devices 715. The container storage 708 and/or the container cache 712 can secure thousands of different tables, with thousands of fields, each with different datatypes and constraints, all automatically indexed for rapid retrieval, and all stored efficiently and compactly in a single disk file, such as a SQLITE file. In some embodiments, providing the edge data controller 718 at the network edge also allows for the interoperability between smart data contracts with blockchain smart contracts enabling hybrid solutions. Blockchains provide global marketplace scale data transactions while data containers provide private and secure multiparty data transactions, allowing entities to build decentralized applications (Dapps) with hybrid capabilities.

In some embodiments, data containers 716 can also be used to enforce non-fungible token (NFT) usage and transactions. An NFT can be considered a unique digital proof of ownership or access to an associated digital object or asset, such as text data, images, drawings, music, or other data. For example, a user or organization creating digital artwork can encrypt and encode the digital artwork into a data container 716, preventing unauthorized users or organizations from accessing and copying or distributing the artwork. Users or organizations that store digital assets in a data container 716 can use the constraining parameters of the data container 716 to provide the digital asset for sale, and allow only authorized purchasers to access the digital asset using an NFT. If any unauthorized user somehow has the data container 716 in their possession, the system and methods of the various embodiments herein would prevent that unauthorized user from breaking into the encrypted data of the container and accessing the digital assets. In some embodiments, NFTs are used as part of a blockchain architecture that holds a reference to the NFT in the blockchain. Digital assets can be stored and constrained by the data containers 716 within that architecture and the use thereof controlled as provided by the various embodiments of this disclosure.

In some embodiments, the edge data controller 718 notifies the master data controller 710 of access attempts or other events related to data containers 716, and the master data controller 710 updates a log accordingly. In some embodiments, the edge data controller 718 can keep a log of access attempts or other events related to data containers 716. In some embodiments, the edge data controller 718 periodically provides its container usage log to the master data controller 710 to keep a log of the master data controller 710 synced with the log of the edge data controller 718. When a container is requested to be accessed by an electronic device 715, one or more processors executing the edge data controller retrieve the container from the container cache 712, if present, for use by the electronic device 715. In some embodiments, the edge data controller 718 transmits the container to the requesting electronic device 715 along with decryption information. In some embodiments, the edge data controller 718 transmits the container to the requesting electronic device 715 and the decryption key is separately provided by the owner of the data container. In some embodiments, the edge data controller 718 is provided the decryption key either at an earlier time or upon request of the data container, decrypts the data in the data container and/or the data container, and then presents the contents of the data container to the requesting electronic device 715, such as in container and developer defined user interface or presentation such as with respect to application 614, without providing the container itself to the requesting electronic device 715.

Figure 8A:
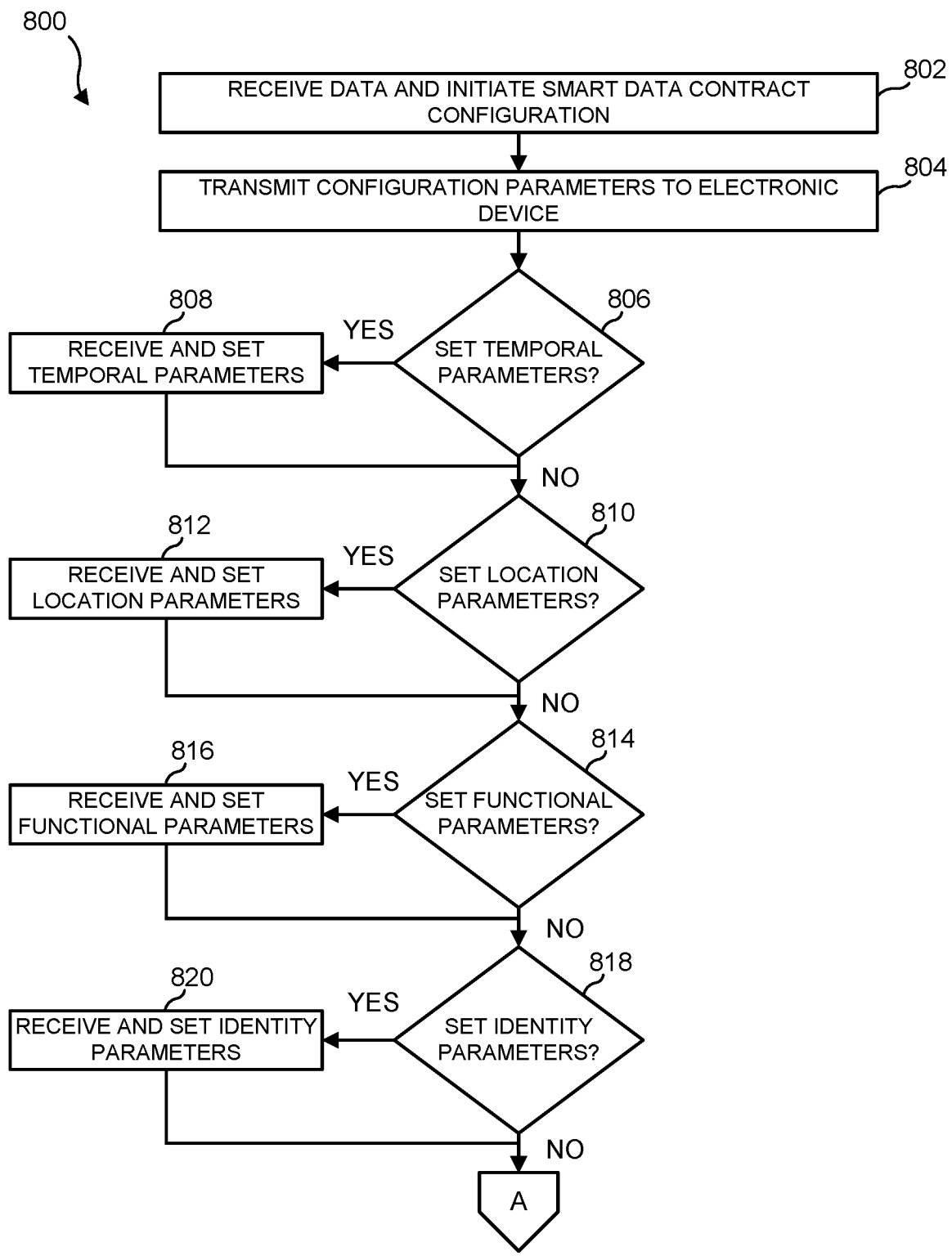
FIGS. 8A-8C illustrate a data access parameters creation process in accordance with various embodiments of this disclosure.
Figure 8B:
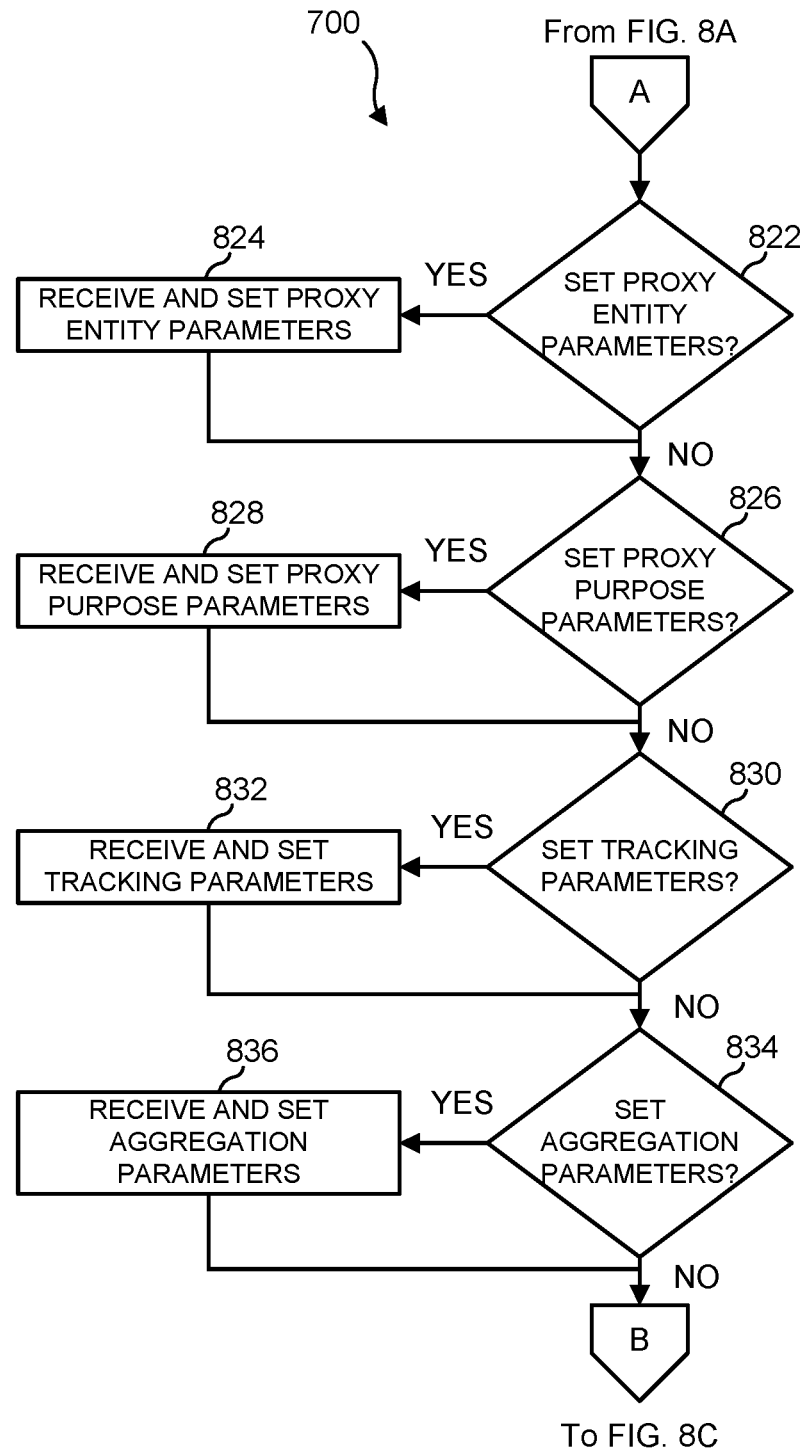
Figure 8C:
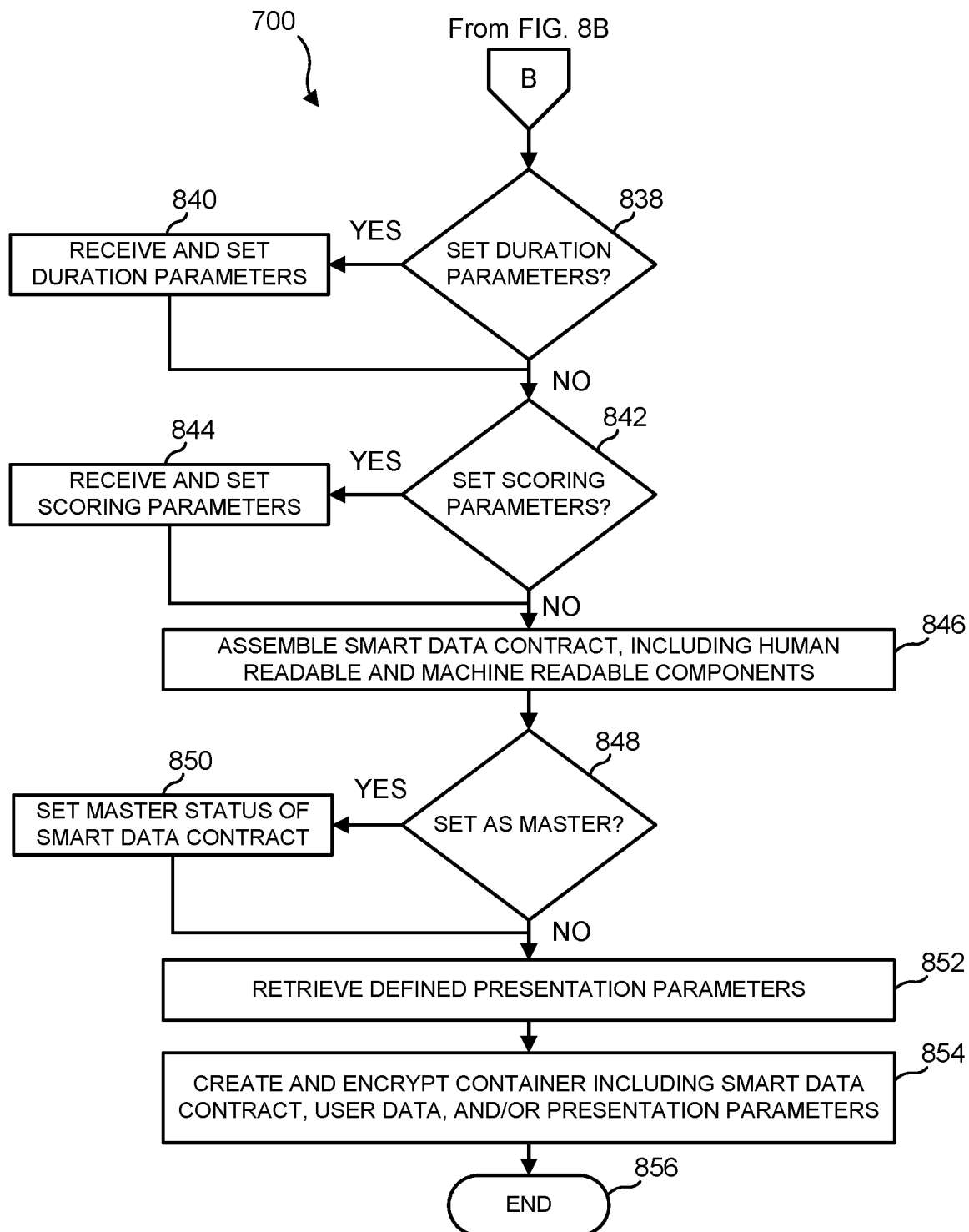

FIGS. 8A-8C illustrate a data access parameters creation process 800 in accordance with various embodiments of this disclosure. For ease of explanation, the process 800 may be described as being executed or otherwise used by the processor(s) 3002 disclosed with respect to FIG. 30, such as a processor executing the master data controller and/or the edge data controller. In some embodiments, the process 800 can be used by the architecture 600 described with respect to FIG. 6A, and/or the architecture 700 described with respect to FIG. 7. However, the process 800 may be used by any suitable device(s) and in any suitable system. While shown as a series of steps, various steps of the process 800 can overlap, occur in parallel, occur in a different order, or occur any number of times.

Current privacy arrangements between the owner of data and an entity wishing to use the owner's data are one-sided. The entity may provide a privacy agreement of some kind, but once the owner's data is shared, there is little the owner can do to control or limit the entity's use of that data. Additionally, the owner cannot dictate or alter the usage of the privacy or other agreement, leaving the owner with virtually no options for wresting back control of their data. The process 800 provides for the creation of a smart contract that sets up various parameters for data usage. It will be understood that certain steps of process 800 may be omitted, such as if an access and control parameter is not applicable to a particular type of data.

At block 802, the processor receives data from an electronic device and initiates smart data contract configuration. The data can be various data such as biographical information such as name, address, birthdate, etc., authentication information such as usernames, passwords, security questions, etc., financial information such as credit card information, billing address, digital payment methods, income or salary, etc., and other information used to establish relationships with other users, organizations, or services. The information can also be organizational data such as organization financial data, information technology data, research data, or other data. At block 804, the processor transmits configuration parameters to the electronic device. In some embodiments, the transmission of the configuration parameters can include back and forth communications between the processor and the electronic device. In some embodiments, the processor can transmit a user interface including all of the parameters to be set. In some embodiments, the layout, content, and information requested by the user interface can be defined by a third-party seeking access to the owner's data.

At decision block 806, the processor determines if the electronic device provides temporal parameters for the data to be controlled by the smart data contract. Temporal parameters can include parameters related to when other users or entities can collect or use the protected data. For example, consider a subscription service in which a traveler can subscribe to know when friends are also in an airport at the same time as the traveler, or to let friends or other entities know when the traveler is in the airport. When subscribing, the traveler can be presented via a user interface on the subscriber's electronic device access and control parameters for the smart data contract such as the parameters described with respect to the process 800. Temporal parameters could include parameters designating that the subscription service only collect information on the traveler at various times, such as a day of scheduled travel, 90 minutes before a flight, or other constrained times. If, at decision block 806, the processor determines that the electronic device does not provide temporal parameters, the process 800 moves to decision block 810. If, at decision block 806, the processor determines that the electronic device provides temporal parameters for the data to be controlled by the smart data contract, at block 808 the processor receives and sets the temporal parameters and the process 800 moves to decision block 810.

At decision block 810, the processor determines if the electronic device provides location parameters for the data to be controlled by the smart data contract. Location parameters can include parameters related to where data can be collected. For example, for the traveler subscription service, location parameters could include parameters designating that the subscription service only collect information on the traveler at when the traveler is in certain locations, such as only collecting data on the traveler when the traveler is in an airport, such as defined by global positioning system (GPS) information received from the traveler's electronic device. If, at decision block 810, the processor determines that the electronic device does not provide location parameters, the process 800 moves to decision block 814. If, at decision block 810, the processor determines that the electronic device provides location parameters for the data to be controlled by the smart data contract, at block 812 the processor receives and sets the location parameters and the process 800 moves to decision block 814.

At decision block 814, the processor determines if the electronic device provides functional parameters for the data to be controlled by the smart data contract. Functional parameters can include parameters related to how data can be collected and used. For example, for the traveler subscription service, functional parameters could include preferences defining that data can be collected pertaining to the traveler's flight, airport, and terminal, and that collected from the traveler can be used for airline marketing offers and/or marketing offers from partners of the airport. If, at decision block 814, the processor determines that the electronic device does not provide functional parameters, the process 800 moves to decision block 818. If, at decision block 814, the processor determines that the electronic device provides functional parameters for the data to be controlled by the smart data contract, at block 816 the processor receives and sets the functional parameters and the process 800 moves to decision block 818.

At decision block 818, the processor determines if the electronic device provides identity parameters for the data to be controlled by the smart data contract. Identity parameters can include parameters related to what persona the data owner wishes to operate under when the data requester interacts with the data owner. Data owners can thus use identities of their choice using federated and sovereign identity technologies and standards, and can control their many identities across many organizations. Data owners can create and use different identities for different contexts and roles like personal roles, work roles, or recreational roles. For example, for the traveler subscription service, identity parameters could include identities such as a frequent flyer traveling for work, vacation traveler traveling with family, not a traveler, but bought ticket for someone else, etc. The different identities can be used to tailor the types of communications sent to the traveler, such as marketing offers for busines dinners, family vacation activities, etc. If, at decision block 818, the processor determines that the electronic device does not provide identity parameters, the process 800 moves to decision block 822. If, at decision block 818, the processor determines that the electronic device provides identity parameters for the data to be controlled by the smart data contract, at block 820 the processor receives and sets the identity parameters and the process 800 moves to decision block 822.

At decision block 822, the processor determines if the electronic device provides proxy entity parameters for the data to be controlled by the smart data contract. Proxy entity parameters can include parameters related to other entities with which the requesting entity can share the data owner's information. For example, for the traveler subscription service, proxy entity parameters could include permissions for sharing the traveler's information with other entities, such as sharing the traveler's landing status or location with a car or rideshare service, providing a notification to another user or entity that the traveler's flight has been delayed, or permissions to allow another user besides the traveler to make itinerary changes. If, at decision block 822, the processor determines that the electronic device does not provide proxy entity parameters, the process 800 moves to decision block 826. If, at decision block 822, the processor determines that the electronic device provides proxy entity parameters for the data to be controlled by the smart data contract, at block 824 the processor receives and sets the proxy entity parameters and the process 800 moves to decision block 826.

At decision block 826, the processor determines if the electronic device provides proxy purpose parameters for the data to be controlled by the smart data contract. Proxy purpose parameters can include parameters related to conditions for sharing the owner's data. In some embodiments, the proxy purpose parameters can be dependent on the proxy entity parameters. For example, for the traveler subscription service, proxy purpose parameters could include conditions for sharing data such as sending third-party offers to the traveler in the event of a delayed flight, identifying certain third-parties for functional, temporal, or spacial marketing, or offering to sell the traveler's data to third parties, with associated parameters for setting a price, reward, or other incentive for doing so. If, at decision block 822, the processor determines that the electronic device does not provide proxy purpose parameters, the process 800 moves to decision block 830. If, at decision block 826, the processor determines that the electronic device provides proxy purpose parameters for the data to be controlled by the smart data contract, at block 828 the processor receives and sets the proxy purpose parameters and the process 800 moves to decision block 830.

At decision block 830, the processor determines if the electronic device provides tracking parameters for the data to be controlled by the smart data contract. Tracking parameters can include parameters related to recording data owner behavior. For example, for the traveler subscription service, tracking parameters could include permissions regarding whether to allow the subscription service to use third-parties or third-party tools to track and record the traveler's behavior, or whether the traveler wishes to opt-out of such tracking. If, at decision block 830, the processor determines that the electronic device does not provide tracking parameters, the process 800 moves to decision block 834. If, at decision block 830 the processor determines that the electronic device provides tracking parameters for the data to be controlled by the smart data contract, at block 832 the processor receives and sets the tracking parameters and the process 800 moves to decision block 834.

At decision block 834, the processor determines if the electronic device provides aggregation parameters for the data to be controlled by the smart data contract. Aggregation parameters can include parameters related to how data from the data owner can be aggregated. For example, for the traveler subscription service, aggregation parameters could include parameters relating to data sources that can be aggregated with the traveler's data, such as tracking data, purchase data, and travel data. In some embodiments, aggregation parameters can be used to define relationships between data containers, such as by creating links in a relational database or graph database between two containers. In some embodiments, aggregation parameters can cause two containers to be nested in a single container to associate the data. Aggregation parameters can also provide for anonymization of aggregated or nested data, such as by removing any personal, sensitive, or identifying information of the data owner before the data can be associated, aggregated, or nested. If, at decision block 834, the processor determines that the electronic device does not provide aggregation parameters, the process 800 moves to decision block 838. If, at decision block 834, the processor determines that the electronic device provides aggregation parameters for the data to be controlled by the smart data contract, at block 836 the processor receives and sets the aggregation parameters and the process 800 moves to decision block 838.

At decision block 838, the processor determines if the electronic device provides duration parameters for the data to be controlled by the smart data contract. Duration parameters can include parameters related to how long the requester has access to data and/or how long the requester can store the data. For example, for the traveler subscription service, duration parameters could include how long the subscription service can retain personally identifiable information and how long the subscription service can retain non-personally identifiable information. If, at decision block 838, the processor determines that the electronic device does not provide duration parameters, the process 800 moves to decision block 842. If, at decision block 838, the processor determines that the electronic device provides duration parameters for the data to be controlled by the smart data contract, at block 840 the processor receives and sets the duration parameters and the process 800 moves to decision block 842.

At decision block 842, the processor determines if the electronic device provides scoring parameters for the data to be controlled by the smart data contract. Scoring parameters can include parameters related to whether an entity can calculate scores using the data, or can perform other analytical evaluations of data. For example, for the traveler subscription service, scoring parameters could include allowing or disallowing rating data received from the traveler or otherwise performing analytical research using the data. The scoring parameters can also include whether to allow the traveler to be provided with additional information on the types of customer scoring mechanisms used by the subscription service and how they are used, and whether the traveler is allowed to submit corrections to scoring data. If, at decision block 842, the processor determines that the electronic device does not provide scoring parameters, the process 800 moves to block 846. If, at decision block 842, the processor determines that the electronic device provides scoring parameters for the data to be controlled by the smart data contract, at block 844 the processor receives and sets the scoring parameters and the process 800 moves to block 846.

At block 846, the processor assembles the smart data contract using all the set parameters, including human readable and machine readable components of the smart data contract. At decision block 848, the processor determines if the electronic device provides requests that the smart data contract be set as a master smart data contract. For example, a smart data contract could be set as a master data contract and used for all of or at least relevant parameters for other relationships entered into between the data owner and other entities. For example, the data owner may wish to set duration default duration parameters for all relationships, such as defining that all access to the owner's data be terminated after 90 days from establishment of the relationship. Setting the status of the smart data contract as the master smart data contract allows for the data owner to quickly enter relationships with a single click or command, setting all parameters for the relationship and providing the entity with the information necessary for the relationship. Parameters not relevant to a relationship could be ignored even when choosing to use the default master smart data contract. If other parameters are needed to establish the relationship, parameters that are relevant from the default master smart data contract can be set, and any additional parameters can then be selected by the data owner. If, at decision block 848, the processor determines that the electronic device does not set the smart data contract as the master smart data contract, the process 800 moves to block 852. If, at decision block 848, the processor determines that the electronic device sets the smart data contract as the master smart data contract, at block 850 the processor receives and sets a master flag for the smart data contract and the process 800 moves to block 852.

At block 852, the processor retrieves defined presentation parameters such as the container defined presentation parameters and the developer defined presentation parameters described with respect to FIG. 6A to create a format for presentation of the data stored in a container. In some embodiments, block 852 can be omitted, such as if the data container is to only include raw data such as text without presentation parameters. At block 854, the processor creates, encrypts, and stores a container including the created smart data contract, user data, and/or the presentation parameters. The process 800 ends at block 856.

It will be understood that the blocks 808, 812, 816, 820, 824, 828, 832, 836, 840, and 844 can be performed together after a data owner provides answers for each of the different parameter options. In various embodiments, the different parameters can be updated after initial configuration by updating the smart data contract and any related containers with the new parameters. The smart data contract can also designate the entity requesting permission to use the data, only allowing the particular entity to use the data in the container and protected by the smart data contract, unless specific proxy settings. In various embodiments, the parameters can be set in the smart data contract to be in human readable simple text and legal code or text. The parameters can also be set in the smart data contract as machine readable parameters that are used to determine when and how the data can be shared or accessed. For example, the parameters can each be set as a binary or Boolean variable that are processed along with other data such as GPS data, timestamps, or other data to determine if the variable evaluates to true or false. For example, if a temporal parameter compared to a current timestamp evaluates to true, the data may be shared. It will also be understood that the traveler subscription service described herein is but one example and the various smart data contract parameters can be used with various other use cases.

It will also be understood that certain parameters listed in the process 800 may not be applicable to all use cases. Also, if a certain parameter is not provided, in some embodiments a least invasive default will be used. For example, if the data owner does not provide a tracking parameter, the data owner may be opted out of behavior tracking by default. In various embodiments, one or more data containers of the data owner can be shared with the requesting entity or service, and any data gathered in relation thereto by the requesting entity or service can also be encrypted and encoded into the container. A relationship between the data owner's shared containers and the containers created by the requesting entity or service that relate to the data owner's shared containers can then related in a relational or graph database and tracked by the master data controller or edge data controller.

Figure 9:
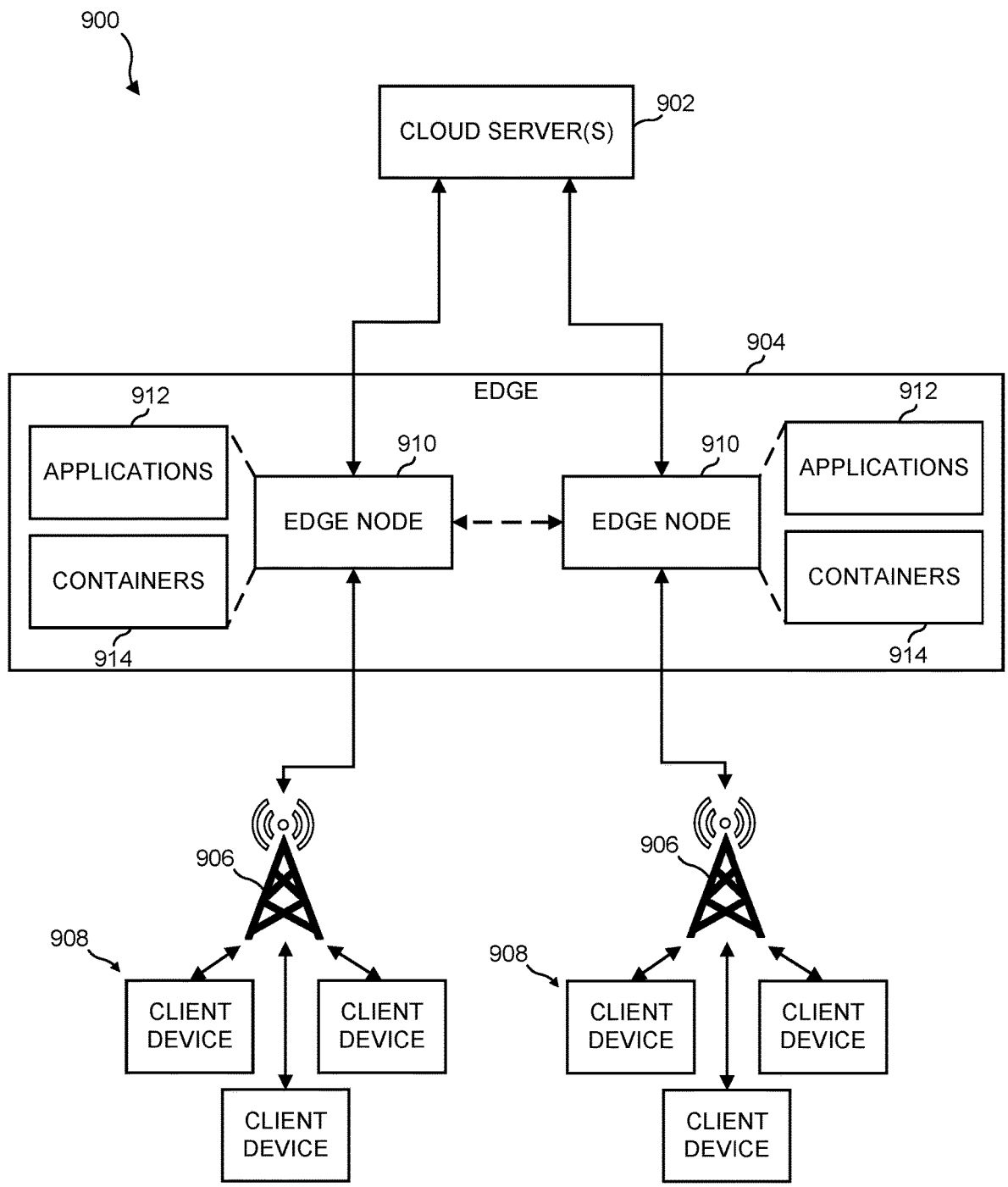
FIG. 9 illustrates an edge computing architecture in accordance with the various embodiments of this disclosure.

FIG. 9 illustrates an edge computing architecture 900 in accordance with the various embodiments of this disclosure. In some embodiments, the edge computing architecture 900 can be used with or as part of the architecture 600 or 700. The architecture 900 includes one or more cloud severs or master nodes 902, which can include at least portions of the SaaS environment 602 of FIG. 6A, an edge environment 904, network access devices 906 such as base stations or access points, and client devices 908. The edge environment 904 includes one or more edge nodes 910 that receive various data from the cloud servers 902.

For example, the edge nodes 910 can receive and store one or more applications 912, such as the container controller 618 or the edge controller 718, and one or more data containers 914, such as in an edge container cache. The edge nodes 910 can also store other information such as copies of relational or graph databases defining relationships between containers and entities, and logs for recording events related to containers. The edge nodes 910 can serve as access servers positioned near to the network access devices 906, and thus are also near the client devices 908. This allows for the client devices 908 to more quickly send and receive data to and from the edge node 910 in communication with the network access device 906 near the client device 908 than if the client device 908 were to send or receive data to or from the cloud servers 902 directly.

The edge nodes 910 can also host the applications 912, such as applications for creating and controlling data containers. In some embodiments, the edge nodes 910 can also employ virtualization technology to deploy and run a wider range of applications on the edge servers. In some embodiments, edge nodes 910 can also communicate with each other, such as if data for a client device in communication with one edge node 910 is stored in associated with another edge node 910. Requesting the data from the other edge node 910 can be faster than requesting the data directly from the cloud servers 902.

While, traditionally, media and code can be cached at the network edge, this disclosure provides for distributing and controlling data at the network edge. Data controlled inside containers with code and media can be distributed when and where required on the network edge by and for any number of actors and devices. Edge redirect rules can be implemented and executed at the edge to programmatically redirect the profiles of users to the appropriate stack depending on their account status, for example, or any other personal information that may be with the container or other referenced containers holding a user's personal data as variables to generate personalization results. Content stitching rules can also be implemented such as implementing a stitching layer to pull content from multiple systems and combine it together for each request, providing faster load times, reduced origin traffic, and lowered infrastructure costs. AB testing rules, that is the testing of two variants of a service, application, or website, can also be implemented to push new tests out faster and adjust them as needed, successfully reducing origin traffic and delivering an improved experience. Edge authentication rules can also be introduced for performing authentication, such as authenticating a third-party to access a user's container.

Figure 10:
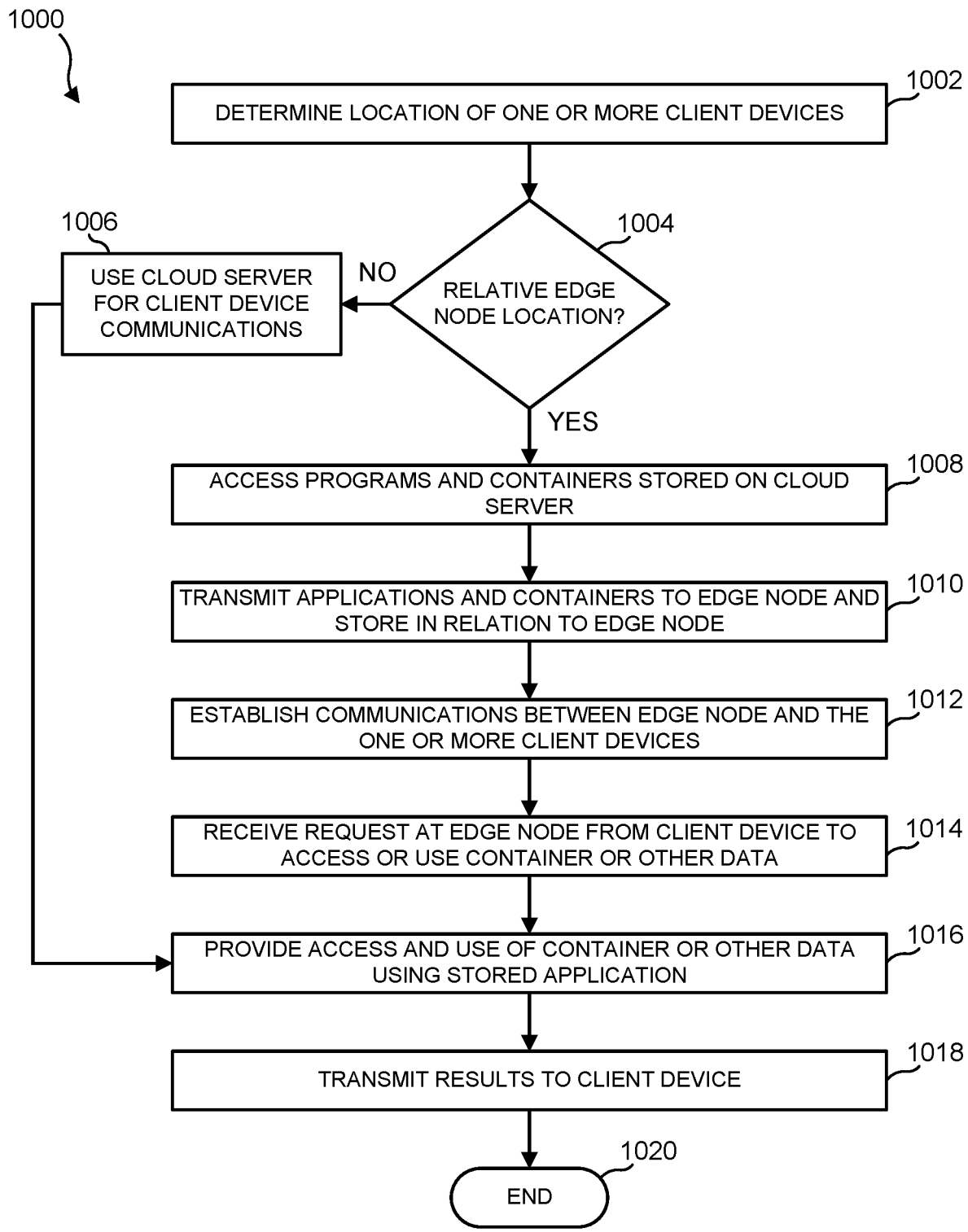
FIG. 10 illustrates an edge environment container control process in accordance with various embodiments of this disclosure.

FIG. 10 illustrates an edge environment container control process 1000 in accordance with various embodiments of this disclosure. For ease of explanation, the process 1000 may be described as being executed or otherwise used by the processor(s) 3002 disclosed with respect to FIG. 30, such as a processor executing the master data controller and/or the edge data controller. In some embodiments, the process 1000 can be used by the architecture 600 described with respect to FIG. 6A, the architecture 700 described with respect to FIG. 7, and/or the architecture 900 described with respect to FIG. 9. However, the process 1000 may be used by any suitable device(s) and in any suitable system. While shown as a series of steps, various steps of the process 1000 can overlap, occur in parallel, occur in a different order, or occur any number of times.

At block 1002, the processor determines the location of one or more client devices. For example, client devices can be identified by IP address or by an identifier of a base station or access point providing network connectivity to the client devices. At decision block 1004, the processor determines, based on the determined location of the one or more client devices, if an edge node is located relative to the one or more client devices. If, at decision block 1004, the processor determines that an edge node is not located relative to the one or more client devices, the process 1000 moves to block 1006. At block 1006, the processor designates that communications are to be performed between one or more cloud servers, such as the one or more cloud servers 902, and the one or more client devices. The process 1000 then moves to block 1016. At block 1016, the processor provides access to the use of a container or other data using a stored application on the cloud server. For example, a third-party requesting access to a user's container, if granted such access as described in the various embodiments of this disclosure, would be provided access by an application on the cloud server, such as the API of the master data controller. At block 1018, the application on the cloud server transmits results of the communications and access of the container to a client device. The process 1000 then ends at block 1020.

If, at decision block 1004, the processor determines that an edge node is located relative to the one or more client devices, the process 1000 moves to block 1008. At block 1008, the processor access program or applications and containers stored on the one or more cloud servers. For example, instances or copies of the processes or API performed or provided by the master data controller and/or the master data fabric can be retrieved from the cloud server, as well as containers associated with the one or more client devices identified in block 1002. At block 1010, the processor transmits the retrieved applications and containers to an edge node determined to be located relative to the one or more client devices. At block 1012, the processor or a processor of the edge node establish communications between the edge node and the one or more client devices.

At block 1014, the processor at the edge node receives a request from a client device to access or use a container or other data stored on the edge node. At block 1016, the processor provides access to the use of a container or other data using a stored application on the edge node. For example, a third-party requesting access to a user's container, if granted such access as described in the various embodiments of this disclosure, would be provided access by an application stored on the edge node, such as the API of the master data controller. At block 1018, the application on the edge node transmits results of the communications and access of the container to a client device. The process 1000 then ends at block 1020.

Figure 11A:
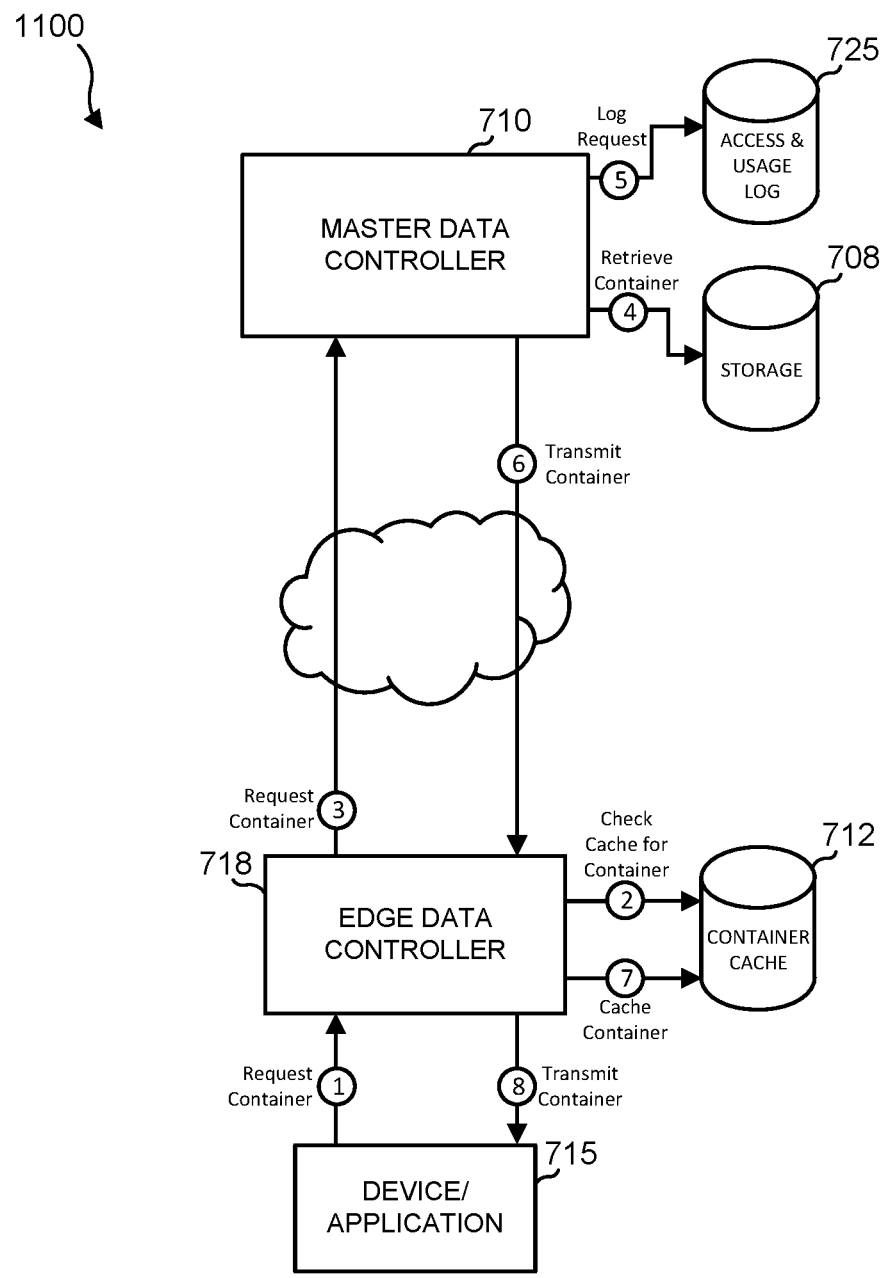
FIG. 11A illustrates a data container request and caching process in accordance with various embodiments of this disclosure.

FIG. 11A illustrates a data container request and caching process 1100 in accordance with various embodiments of this disclosure. For ease of explanation, the process 1100 may be described as being executed or otherwise used by the processor(s) 3002 disclosed with respect to FIG. 30, such as a processor executing the master data controller and/or the edge data controller. In some embodiments, the process 1100 can be used by the architecture 600 described with respect to FIG. 6A, the architecture 700 described with respect to FIG. 7, and/or the architecture 900 described with respect to FIG. 9. However, the process 1100 may be used by any suitable device(s) and in any suitable system. While shown as a series of steps, various steps of the process 1100 can overlap, occur in parallel, occur in a different order, or occur any number of times.

The process 1100 begins at a first step when a device or application 715 transmits a request to receive or access a container to the edge data controller 718. In various embodiments, the device or application 715 can be a data owner device or application, or can be a device or application of an entity requesting access to a data container of a data owner. It will also be understood that the request may not identify a specific data container, but may rather identify the data owner and a data category associated with the data owner, such as biographical or financial information.

Upon receiving the request for the data container, at a second step, one or more processors executing the edge data controller 718 check the container cache 712 for the requested container, such as by container UUID, by analyzing metadata of containers associated with the data owner, and/or by analyzing a cached relational or graph database. Upon a cache miss in which the one or more processors executing the edge data controller 718 determine that the container is not stored in the container cache 712, at a third step the one or more processors executing the edge data controller 718 transmits a request or forwards the original request to the master data controller 710. In some embodiments, whether or not the edge cache 712 includes the container, the processors executing the edge data controller 718 may deny the request if it can be determined that the requester has not been granted access to the container, such as by referencing a smart data contract associated with the data owner.

At a fourth step, the one or more processors executing the master data controller 710 retrieve the requested container from the container storage 708, such as by container UUID, by analyzing metadata of containers associated with the data owner, and/or by analyzing a cached relational or graph database. In some embodiments, the processors executing the master data controller 710 may deny the request if is determined that the requester has not been granted access to the container, such as by referencing a smart data contract associated with the data owner. At a fifth step, the one or more processors executing the master data controller 710 log data relating to the request in an access and usage log 725. Logging the data related to the request can include various information, such as a timestamp for the request, an identity of the content owner, an identity of the requester, the UUID of the requested container or other data related to the requested container, a result of the request, such as whether the request was allowed or denied, and/or whether granting the request results in creating a copy of the container and identifying such a copy for tracking and container lineage purposes.

At a sixth step, the one or more processors executing the master data controller 710 transmit the retrieved container to the edge data controller 718. At a seventh step, the one or more processors executing the edge data controller 718 caches the container in the container cache 712. At an eighth step, the one or more processors executing the edge data controller 718 transmit the container to the device 715 either decrypted or with information for the device 715 to decrypt the container, such as decryption keys provided by the data owner. In some embodiments, instead of providing the container to the device 715, the one or more processors executing the edge data controller 718 decrypts the data and/or the container and only temporarily provides the decrypted data to the device or application 715, such as displayed in a user interface, while disallowing permanent storage of the data by the device or application 715. In some embodiments, the one or more processors executing the edge data controller 718 transmit only a result reached using data from the now cached container, such as according to privacy enhanced technologies (PETs) as described in the various embodiments of this disclosure.

Figure 11B:
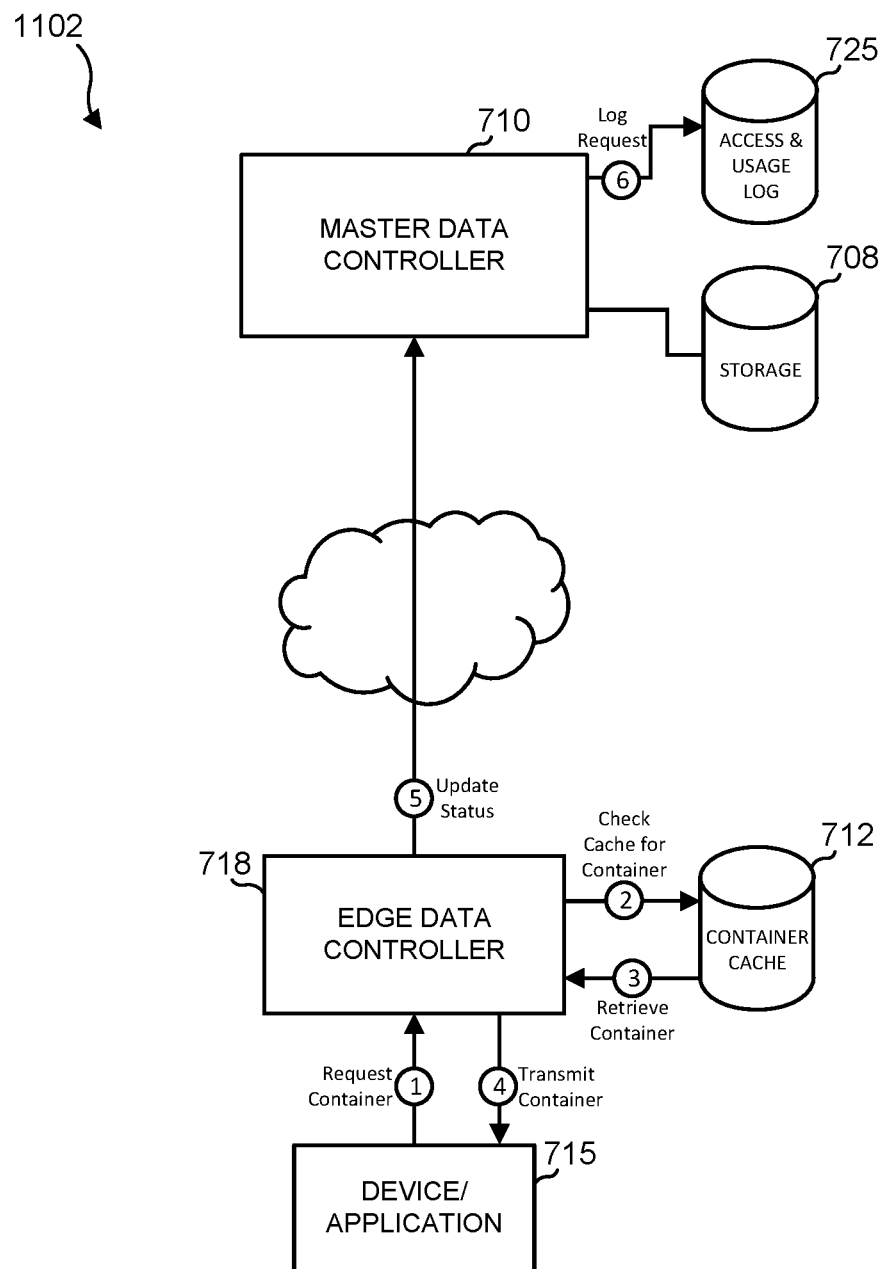
FIG. 11B illustrates a cached data container request process in accordance with various embodiments of this disclosure.

FIG. 11B illustrates a cached data container request process 1102 in accordance with various embodiments of this disclosure. For ease of explanation, the process 1102 may be described as being executed or otherwise used by the processor(s) 3002 disclosed with respect to FIG. 30, such as a processor executing the master data controller and/or the edge data controller. In some embodiments, the process 1102 can be used by the architecture 600 described with respect to FIG. 6A, the architecture 700 described with respect to FIG. 7, and/or the architecture 900 described with respect to FIG. 9. However, the process 1102 may be used by any suitable device(s) and in any suitable system. While shown as a series of steps, various steps of the process 1102 can overlap, occur in parallel, occur in a different order, or occur any number of times.

The process 1100 begins at a first step when a device or application 715 transmits a request to receive or access a container to the edge data controller 718. In various embodiments, the device or application 715 can be a data owner device or application, or can be a device or application of an entity requesting access to a data container of a data owner. It will also be understood that the request may not identify a specific data container, but may rather identify the data owner and a data category associated with the data owner, such as biographical or financial information.

Upon receiving the request for the data container, at a second step, one or more processors executing the edge data controller 718 check the container cache 712 for the requested container, such as by container UUID, by analyzing metadata of containers associated with the data owner, and/or by analyzing a cached relational or graph database. Upon a cache hit in which the one or more processors executing the edge data controller 718 determine that the container is stored in the container cache 712, at a third step the one or more processors executing the edge data controller 718 retrieves the container from, the container cache 712. In some embodiments, whether or not the edge cache 712 includes the container, the processors executing the edge data controller 718 may deny the request if it can be determined that the requester has not been granted access to the container, such as by referencing a smart data contract associated with the data owner.

At a fourth step, the one or more processors executing the edge data controller 718 transmit the container to the device 715 either decrypted or with information for the device 715 to decrypt the container, such as decryption keys provided by the data owner. In some embodiments, instead of providing the container to the device 715, the one or more processors executing the edge data controller 718 decrypts the data and/or the container and only temporarily provides the decrypted data to the device or application 715, such as displayed in a user interface, while disallowing permanent storage of the data by the device or application 715. In some embodiments, the one or more processors executing the edge data controller 718 transmit only a result reached using data from the now cached container, such as according to privacy enhanced technologies (PETs) as described in the various embodiments of this disclosure.

At a fifth step, the one or more processors executing the edge data controller 718 transmits a status update to the master data controller 710. At a sixth step, the one or more processors executing the master data controller 710 log data relating to the request in an access and usage log 725. Logging the data related to the request can include various information, such as a timestamp for the request, an identity of the content owner, an identity of the requester, the UUID of the requested container or other data related to the requested container, a result of the request, such as whether the request was allowed or denied, and/or whether granting the request results in creating a copy of the container and identifying such a copy for tracking and container lineage purposes. In some embodiments, the one or more processors executing the edge data controller 718 maintains an access and usage log at the network edge. This access and usage log can be a separate log or a log that syncs with the access and usage log 725. In some embodiments, the one or more processors executing the edge data controller 718 log requests and other events related to containers and at defined intervals send updates regarding the edge log to the master data controller 710 to update the access and usage log 725 with any new records.

Figure 12:
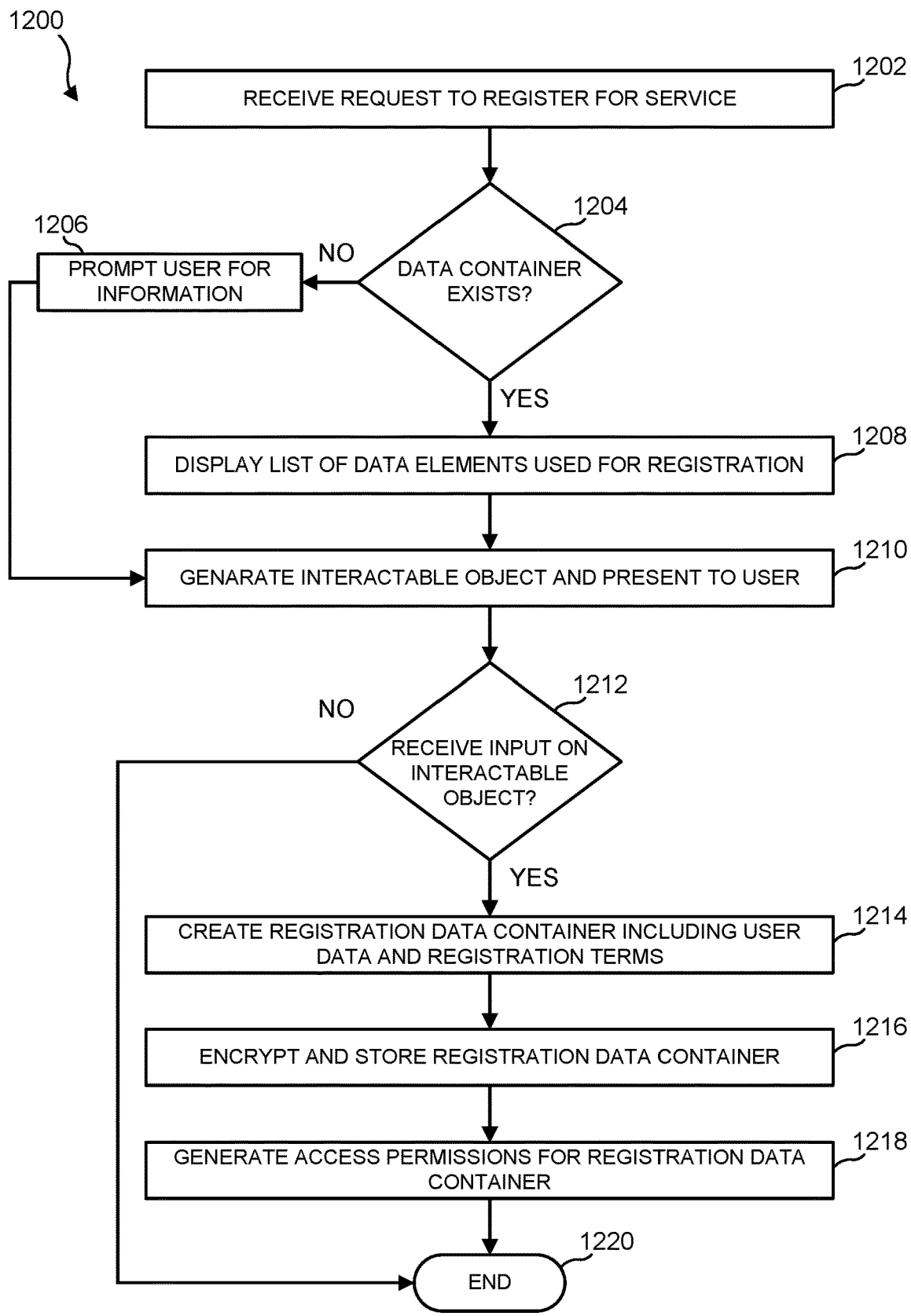
FIG. 12 illustrates a service registration process in accordance with various embodiments of this disclosure.

FIG. 12 illustrates a service registration process 1200 in accordance with various embodiments of this disclosure. For ease of explanation, the process 1200 may be described as being executed or otherwise used by the processor(s) 3002 disclosed with respect to FIG. 30, such as a processor executing the master data controller and/or the edge data controller. In some embodiments, the process 1200 can be used by the architecture 600 described with respect to FIG. 6A and/or the architecture 700 described with respect to FIG. 7. However, the process 1200 may be used by any suitable device(s) and in any suitable system. While shown as a series of steps, various steps of the process 1200 can overlap, occur in parallel, occur in a different order, or occur any number of times.

At block 1202, the processor of the container controller and/or the master data controller receives a request from a user to register for a service, such as usage of a website. At decision block 1204, the processor determines if a container exists for the user, such as a container stored locally on a user device or stored in remotely, such as by the SaaS environment. If not, at block 1206, the processor prompts the user for information such as user demographic information, user preferences, etc. The process 1200 then moves to block 1210. If, at decision block 1204, the processor determines that a data container exists, the process 1200 moves to block 1208. At block 1208, the processor causes the display of a list of data elements to the user that are used for registration of the service. For example, if a user is registering to use a website, the list of data elements can include the user's name, age, or other demographic information, as well as data access and sharing parameters. In some embodiments, the service may request certain access and sharing permissions for a user to register for the service, or may allow the user to choose from different options for access and sharing permissions.

At block 1210, the processor generates an interactable object and presents the interactable object to the user. At decision block 1212, the processor determines if the processor receives an input on the interactable object. If not, the process 1200 ends at block 1220. If so, the process 1200 moves to block 1214. At block 1214, the processor creates a registration data container including user data and registration terms. At block 1216, the processor encrypts and stores the registration data container. At block 1218, the processor generates access permissions for the registration data container based on the list of data elements and preferences set during creation. The process 1200 then ends at block 1220. The process 1200 thus provides, for example, instead of a traditional registration form, that users can share their individually encrypted data along with contract terms in data containers. Registration forms are eliminated as users are shown a list of data elements used for registration and with a single button click on the interactable object they allow a container to be created and shared while keeping a permanent record of the transfer within the master data preferences center. In some embodiments, instead of creating a new registration data container, an existing container including user data and preferences can be used to register for the service. In various embodiments, the user can revoke access to the data container, which may cancel the service registration.

Figure 13:
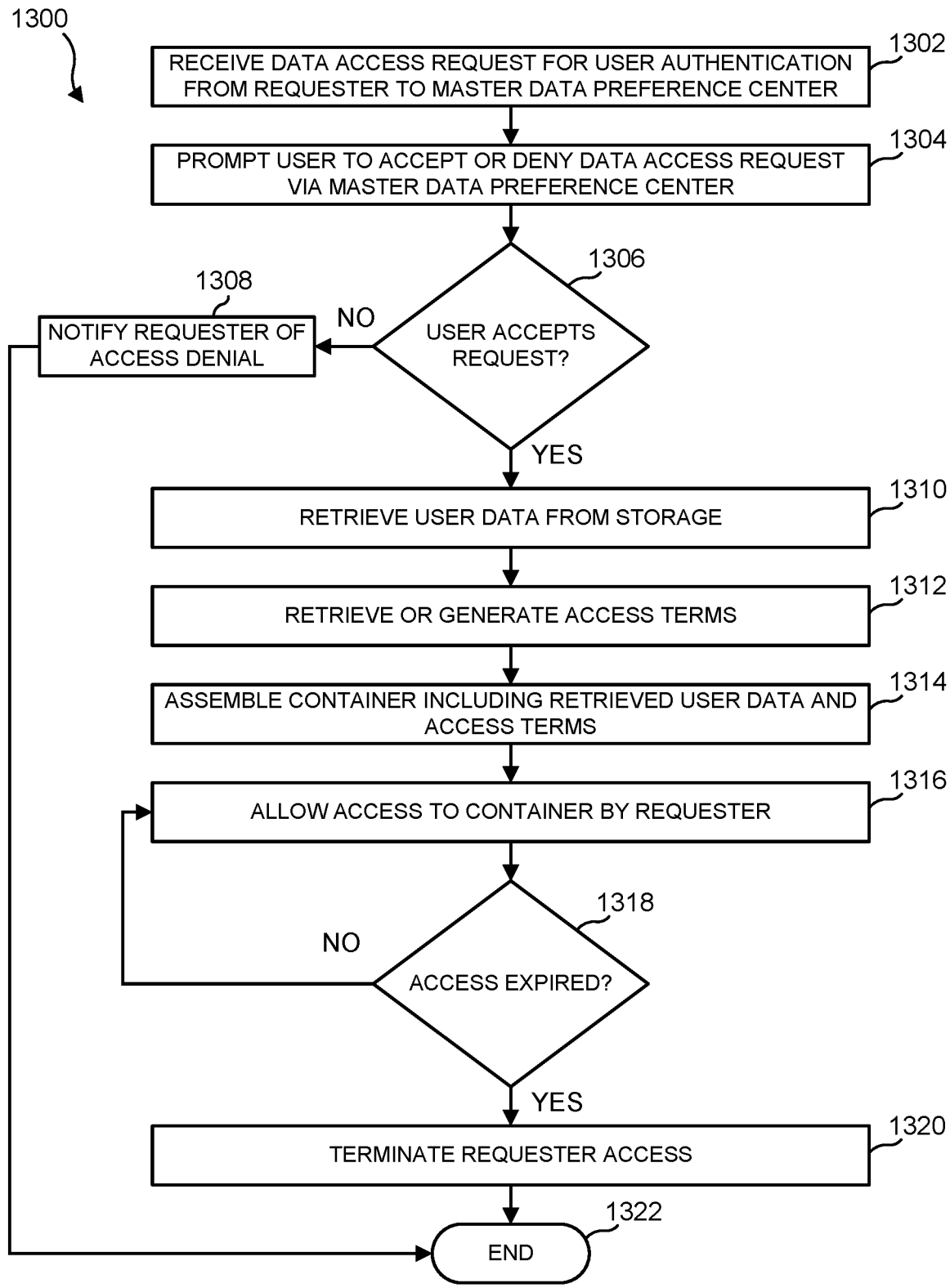
FIG. 13 illustrates an authentication process in accordance with various embodiments of this disclosure.

FIG. 13 illustrates an authentication process 1300 in accordance with various embodiments of this disclosure. For ease of explanation, the process 1300 may be described as being executed or otherwise used by the processor(s) 3002 disclosed with respect to FIG. 30, such as a processor executing the master data controller and/or the edge data controller. In some embodiments, the process 1300 can be used by the architecture 600 described with respect to FIG. 6A and/or the architecture 700 described with respect to FIG. 7. However, the process 1300 may be used by any suitable device(s) and in any suitable system. While shown as a series of steps, various steps of the process 1300 can overlap, occur in parallel, occur in a different order, or occur any number of times.

At block 1302, the processor via the master data preference center receives a data access request from a third-party requester for user authentication of the access request. For example, the request can include a data sharing request, such as if a third-party website having access to a data container wishes to share user data or the data container with another third-party. As another example, a third-party such as a customer service staff member currently on a call with a user could request access to the data container so that they can see the user's information, which protects the user's information from unknown access by restricting when and how the third-party accesses the user's data.

At block 1304, the processor, via the master data preference center and/or the master data controller, prompts the user to accept or deny the data access request. In some embodiments, the request and/or prompt can be received by the container controller and presented to the user in the client device application. At decision block 1306, the processor determines if the user accepts the request in response to the prompt. If not, the processor transmits a notification to the requester indicated that access to the data container is denied. The process 1300 then ends at block 1322. If, at decision block 1306, the processor receives acceptance from the user, the process 1300 moves to block 1310. At block 1310, the processor retrieves user data from storage, such as a storage or memory associated with the SaaS environment or local user storage on the client device. In some embodiments, the data can be raw data. In some embodiments, the data is within a previously created data container, which is accessed and decrypted.

At block 1312, the processor retrieves or generates access terms, such as a period of time in which the data can be accessed or used by the requester, or restrictions on data sharing. At block 1314, the processor assembles a container including the retrieved user data and the access terms. In some embodiments, an existing data container can be used and provided to the requester. At block 1316, the processor allows access to the data container by the requester. At decision block 1318, the processor determines if access to the container has expired, based on the access terms. If not, the process 1300 loops back to block 1316 to continue allowing access to the data container by the requester. If, at decision block 1318, the processor determines that access has expired, at block 1320 the processor terminates the requester's access to the container. In some embodiments, the processor can also delete the container if the container was created only for the requester's use. The process 1300 then ends at block 1322.

For example, calls to customer service staff often require that they confirm the user's identity often with a pin. Process 1300 eliminates this step by asking the user to accept the data access request through the master data preference center. Once the user accepts the request the customer service staff screen populates with the user's data. In some embodiments, this generates a new data container with contract terms allowing that individual access for a certain time period per the new contract while updating the business's records for that customer. In various embodiments of this disclosure, shared containers such as the one described with respect to FIG. 13 can be automatically updated to ensure a party has the user's most recent data at all times. In some embodiments, the processor does not prompt users to confirm their data or prompt them to update their information.

Figure 14A:
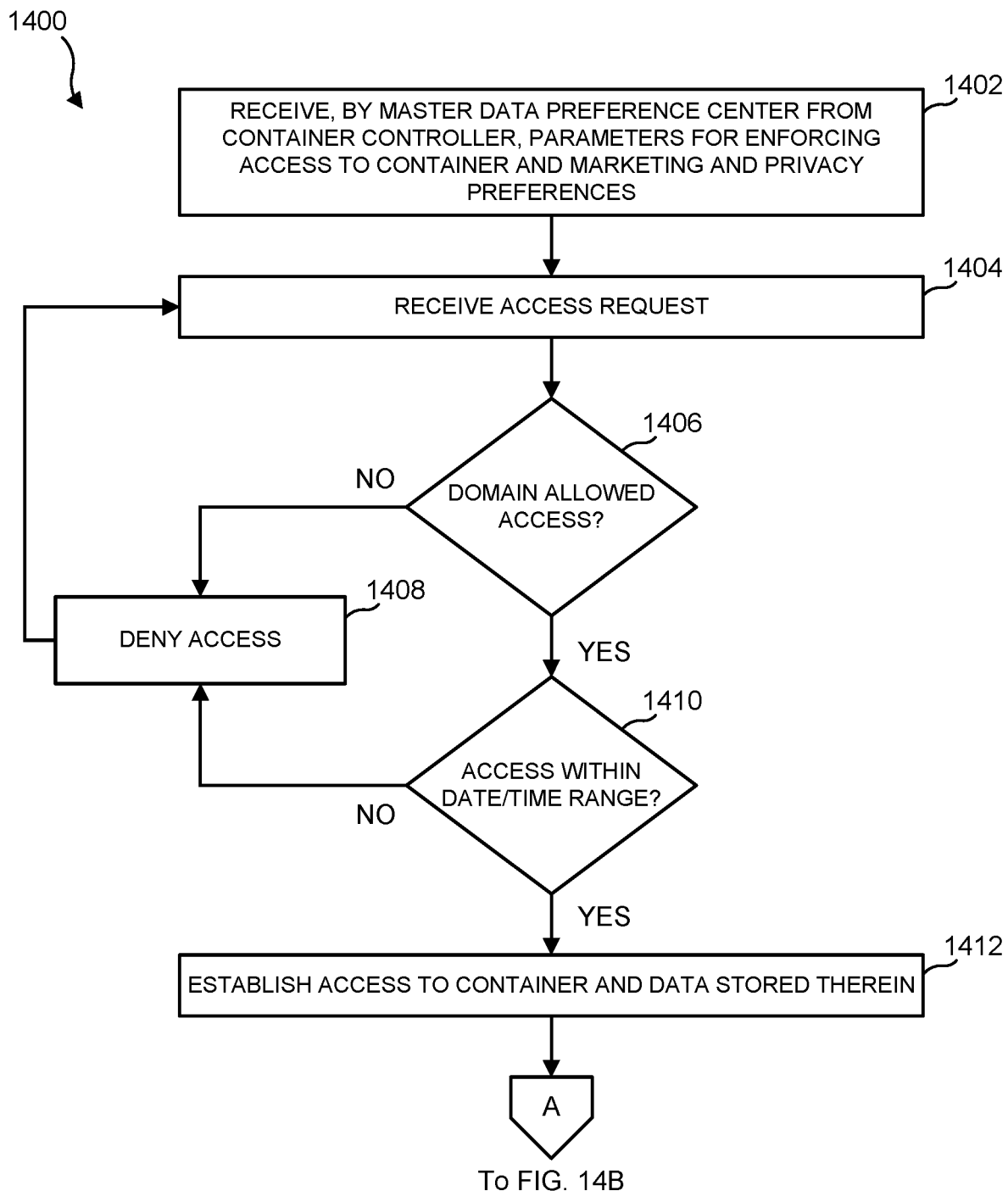
FIGS. 14A and 14B illustrate a data access and control process in accordance with various embodiments of this disclosure.
Figure 14B:
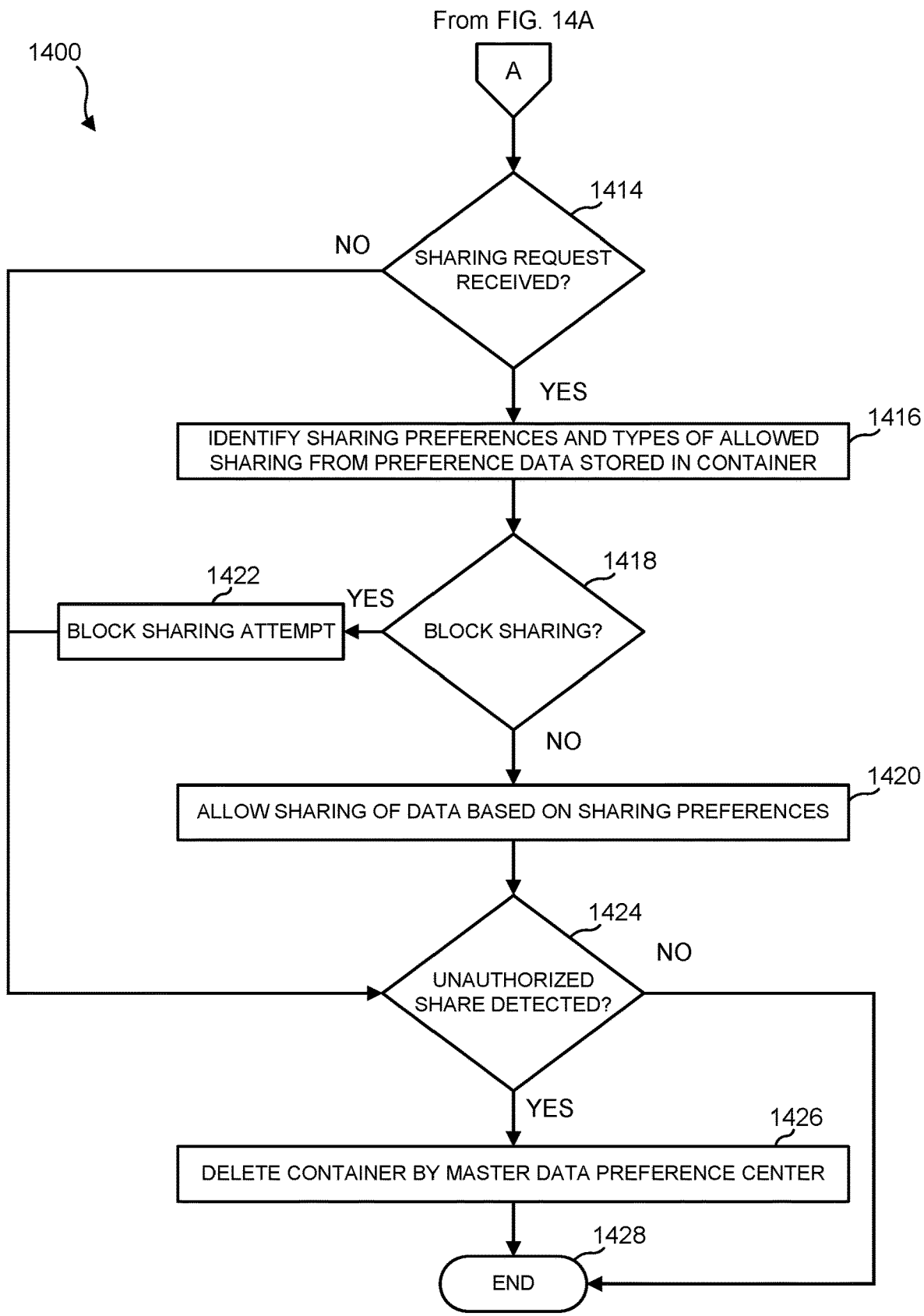

FIGS. 14A and 14B illustrate a data access and control process 1400 in accordance with various embodiments of this disclosure. For ease of explanation, the process 1400 may be described as being executed or otherwise used by the processor(s) 3002 disclosed with respect to FIG. 30, such as a processor executing the master data controller and/or the edge data controller. In some embodiments, the process 1400 can be used by the architecture 600 described with respect to FIG. 6A and/or the architecture 700 described with respect to FIG. 7. However, the process 1400 may be used by any suitable device(s) and in any suitable system. While shown as a series of steps, various steps of the process 1400 can overlap, occur in parallel, occur in a different order, or occur any number of times.

At block 1402, the processor receives, via the master data preference center from the container controller, parameters for enforcing access to a container and marketing and privacy preferences. In some embodiments, the parameters for enforcing access and the marketing and privacy preferences can be stored within the container itself. The container can be stored either by the SaaS system or locally on a user's client device. The master data preference center can be configured to enforce marketing and privacy preferences via the contract enforcement from the container controller. This gives the marketing and privacy preferences as defined by a user enforcement capabilities and usage limiting capabilities via the contracts as well as the final option of data deletion capabilities thereby ending the relationship with the data holder. In some embodiments, users can publish data contract terms to everyone by defining contract terms for all the data the user shares with others. In some embodiments, users can publish accessibility and modality preferences to everyone by defining accessibility "modality" preferences within the master data preferences center so that integrated applications automatically personalize to a user's accessibility and modality preferences.

At block 1404, the processor receives an access request for the container. At decision block 1406, the processor determines if a domain associated with the access request is allowed to access the container. For example, a contract can be established between a user and a third-party to allow the third-party to access a container associated with the user. The third-party can be associated with a domain name, and rules or preferences for limiting access to a container can be established and stored in the legal code portion of the container. The rules or preferences for limiting access to a container can also be established and stored by the master data fabric as disclosed in the various embodiments herein.

If, at decision block 1406, the processor determines that the domain is not allowed to access the container, the process 1400 moves to block 1408. At block 1408, the processor denies access to the container based on the determination at decision block 1406. The process 1400 then loops back to block 1404. If, at decision block 1406, the processor determines that the domain is allowed to access the container, the process 1400 moves to decision block 1410. At decision block 1410, the processor determines if the access request is within a date and/or time range. For example, when a user sets preferences for allowing a third-party to access a container, the preferences can define a period of time in which access is allowed. If access has expired, the process 1400 moves to block 1408 to deny access to the container. If access has not expired, the process 1400 moves to block 1412. At block 1412, the processor establishes access to the container and the data stored therein for the requester.

At decision block 1414, the processor determines if a sharing request is received. For example, the sharing request can be requested by a third-party having access to the container, such as a third-party confirmed by steps 1402-1412. The third-party may attempt to share the data container and its contents to another third-party, which may or may not be allowed per the contract or preferences defining use or access of the container. If a sharing request is not received at decision block 1414, the process 1400 moves to decision block 1424. If a sharing request is received at decision block 1414, the process 1400 moves to block 1416. At block 1416, the processor identifies the sharing preferences and types of allowed sharing from the preference data stored in the container. In some embodiments, such preferences can also be stored and accessed by at least one of the container controller, the master data controller, or the master data fabric. The preferences and types of allowed sharing can indicate whether certain other third-parties can access the container. For example, the contract or license to the container can indicate that the user or licensor permits others to copy, distribute, display, and use the data in the container, as well as make and distribute derivative works based on the data, which such use can also be designated as for either personal use only or as including commercial uses. As another example, sharing the container can also be predicated on that the container can be shared so long as others share alike, i.e., the licensor permits others to create and distribute derivative works, but only under the same or a compatible license or contract. In some embodiments, the licensor can permit others to copy, distribute, display, and perform the work, but not distribute derivative works based on it. In some embodiments, the licensor permits others to copy, distribute, display, and perform the work for non-commercial purposes only. In some embodiments, no sharing to other parties is allowed.

At decision block 1418, the processor determines if, based on the preferences identified in block 1416, whether to block the sharing request. If so, at block 1422, the processor blocks the sharing request and the process 1400 moves to decision block 1424. If not, at block 1420, the processor allows the sharing of the container and its data based on the sharing preferences. At decision block 1424, the processor determines if an unauthorized share is detected. An unauthorized share can include a detected attempt to decrypt and access a container without a prior access request. For example, a third-party having a copy of the container controller may attempt to access a user's container obtained from another third-party without the user's consent. Since the container controller works in conjunction with the SaaS environment to decrypt and provide contents of data containers, such an unauthorized share attempt can be detected by the processor and appropriate action taken. If no unauthorized share is detected, the process 1400 ends at block 1428. If an unauthorized share is detected, at block 1426, the processor via the master data preference center can delete the container to prevent access to the data in the container by unauthorized third-parties. In some embodiments, a kill switch flag can be included in the master data fabric or within the container itself indicating that unauthorized shares are to result in deletion of the container. In some embodiments, instead of a kill switch, an access denial can be issued to the unauthorized third-party. In some embodiments, an unauthorized share or other behavior can revoke access from a party that previously enjoyed access to the container. In some embodiments, access can be revoked simply because the data owner wishes to revoke such access. The process 1400 then ends at block 1428.

Figure 15:
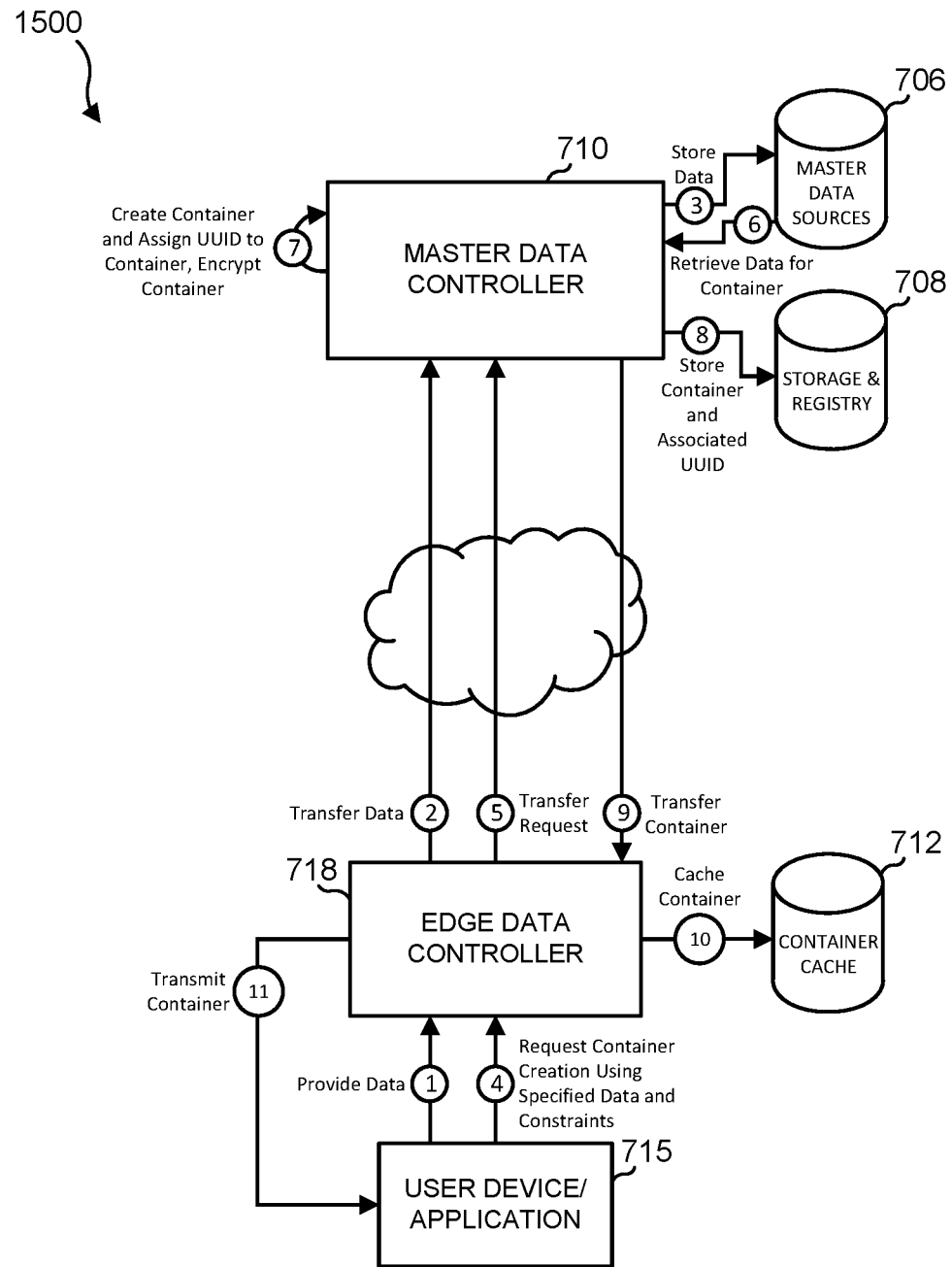
FIG. 15 illustrates a data container creation process in accordance with various embodiments of this disclosure.

FIG. 15 illustrates a data container creation process 1500 in accordance with various embodiments of this disclosure. For ease of explanation, the process 1500 may be described as being executed or otherwise used by the processor(s) 3002 disclosed with respect to FIG. 30, such as a processor executing the master data controller and/or the edge data controller. In some embodiments, the process 1500 can be used by the architecture 600 described with respect to FIG. 6A, the architecture 700 described with respect to FIG. 7, and/or the architecture 900 described with respect to FIG. 9. However, the process 1500 may be used by any suitable device(s) and in any suitable system. While shown as a series of steps, various steps of the process 1500 can overlap, occur in parallel, occur in a different order, or occur any number of times.

At a first step in the process 1500, a user device or application 715 provides data to the edge data controller 718, such as biographical data, financial data, authentication data, or other types of data as disclosed in the various embodiments of this disclosure. At a second step, the processor executing the edge data controller 718 transfer the data over a networked connection to the master data controller 710. At a third step, the processor executing the master data controller 710 stores the data in a master data sources or storage 706. In some embodiments, the master data storage 706 stores data in containers to increase security of the data. In some embodiments, data provided to the master data controller 710 is not permanently stored, but rather stored within a created data container and discarded. In various embodiments of this disclosure, the master data sources 706 can be a datastore maintained by the server(s) executing the master data controller 710 that includes data submitted by users and used to create data containers. In such embodiments, the data in the master data sources 706 can be containerized as well for increased security. In some embodiments, the master data sources 706 is a datastore accessible by the server(s) executing the master data controller 710 that links to data records stored on client devices or other server devices. For example, in such embodiments, when a user creates new data to be included in a container, a data file, such as a SQLITE data file, or other data structure stored by a user or organization including the new data is linked to the master data sources 706.

At a fourth step, the user device transmits a request for container creation using or referring to specified data and constraints to the edge data controller 718. In some embodiments, instead of specifying the constraints in the request, existing constraints or an existing smart data contract previously stored in associated with the user can be used. At a fifth step, the processor executing the edge data controller 718 transfers the request for container creation to the master data controller 710. At a sixth step, the processor executing the master data controller 710 retrieves the specified data from the master data storage 706. In some embodiments, the sixth step includes retrieving data stored by a user or organization using a user or organizational source such as a data file linked in the master data sources 706. At a seventh step, the processor executing the master data controller 710 creates a container using the retrieved data, encoding the data into a data storage portion or the multipurpose data store of the container, and encoding the smart data contract in human and machine readable form in the legal code portion of the data container, as well as encoding any container or developer defined presentation attributes into the container. The processor executing the master data controller 710 also generates and assigned a new UUID to the container, and encrypts the data and/or the container. Encryption of the data and/or the data container can be accomplished by various encryption algorithms such as The Advanced Encryption Standard (AES), Triple Data Encryption Standard (DES), Rivest-Shamir-Adleman (RSA) encryption, or other encryption methods. In some embodiments, the master data controller 710 maintains encryption and decryption keys, and provides decryption keys to users or entities with authorization to access the data container. In some embodiments, the master data controller 710 only has access to encryption keys, with the data owner, such as the user of the user device 715, maintaining a private decryption key that the data owner provides to authorized users or entities upon request.

At an eighth step, the processor executing the master data controller 710 stores the container in association with its UUID to maintain a registry including information on the data container and other data containers. In some embodiments, the registry maintains records of all data containers, their owner, the current holder of the container, the master data source URL to source data updates, as well as physical and URL locations for both the original container and any copies. In various embodiments of this disclosure, data containers are registered and tracked with the UUID by the master data controller 710 and/or the container controller

718. Upon creation of copies of the container, such as if an authorized user or entity requests a copy of the container, the registry is updated with a location such as a URL for the copy.

At a ninth step, the processor executing the master data controller 710 transfers a copy of the container to the edge data controller 718. At a tenth step, processor executing the edge data controller 718 stores a cached version of the container in the container cache 712 to allow for quick retrieval or access by client devices. In some embodiments, the processor executing the edge data controller 718 can provide to the master data controller 710 the URL or other storage location identifier for the cached version of the container. At an eleventh step, the processor executing the edge data controller 718 transmits the container to the user device 715. In some embodiments, step eleven may not occur, with the container simply remaining in the container cache 712 until the container, data from the container, or a result to a query using the containerized data is requested by a user device from the edge data controller 718. In some embodiments, steps one and four include sending the respective transmissions to the master data controller 710 directly instead of the edge data controller 718. In some embodiments, containers are not stored in the storage 708, but are stored locally by the user device 715 and/or by the container cache 712. In some embodiments, the edge data controller 718 can encode the data into and create the container, while providing a QUID and other information for registration and tracking to the master data controller 710.

Figure 16:
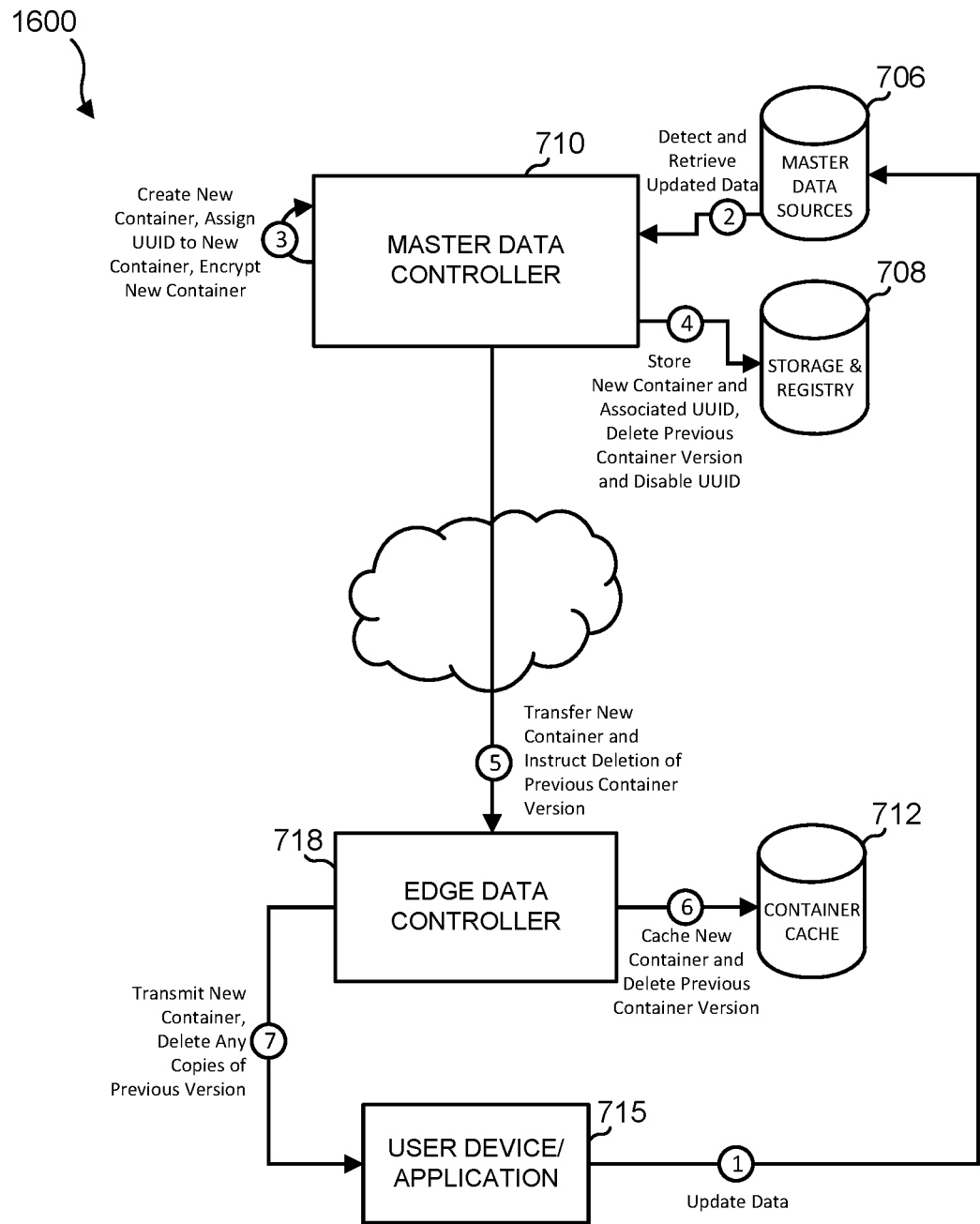
FIG. 16 illustrates a data container update process in accordance with various embodiments of this disclosure.

FIG. 16 illustrates a data container update process 1600 in accordance with various embodiments of this disclosure. For ease of explanation, the process 1600 may be described as being executed or otherwise used by the processor(s) 3002 disclosed with respect to FIG. 30, such as a processor executing the master data controller and/or the edge data controller. In some embodiments, the process 1600 can be used by the architecture 600 described with respect to FIG. 6A, the architecture 700 described with respect to FIG. 7, and/or the architecture 900 described with respect to FIG. 9. However, the process 1600 may be used by any suitable device(s) and in any suitable system. While shown as a series of steps, various steps of the process 1600 can overlap, occur in parallel, occur in a different order, or occur any number of times.

At a first step in the process 1600, a user device or application 715 updates data in the master data sources 706, such as biographical data, financial data, authentication data, or other types of data as disclosed in the various embodiments of this disclosure. In various embodiments of this disclosure, the master data sources 706 can be a datastore maintained by the server(s) executing the master data controller 710 that includes data submitted by users and used to create data containers. In such embodiments, the data in the master data sources 706 can be containerized as well for increased security. In some embodiments, the master data sources 706 is a datastore accessible by the server(s) executing the master data controller 710 that links to data records stored on client devices or other server devices. For example, the master data sources 706 can include a link to a data file including various user or organizational data, such as a SQLITE data file, stored by the user or the organization. When data included within the data file is altered, such as if the user or organization changes an address, adds a different payment method, changes a password, stores a new file such as an image, video, or text document, etc., the data file updates or is replaced by a new data file, triggering the link to the master data sources 706 to update to reflect a new timestamp for the data file.

At a second step, upon updating the link in the master data sources 706, the processor executing the master data controller 710 detects the updated data source in the master data sources 706 and retrieves the linked updated data. In some embodiments, updated data can first be detected by the edge data controller 718, or a message indicating data has been updated is sent to the edge data controller 718 from the user device 715. The edge data controller 718 can then trigger the update process at the server executing the master data controller 710. At a third step, the processor executing the master data controller 710 creates a new container using the retrieved updated data, encoding the data into a data storage portion or the multipurpose data store of the container, and encoding the smart data contract in human and machine readable form in the legal code portion of the data container, as well as encoding any container or developer defined presentation attributes into the container. The processor executing the master data controller 710 also generates and assigned a new UUID to the container and encrypts the data and/or the container.

At a fourth step, the processor executing the master data controller 710 stores the new container in association with its new UUID to maintain a registry including information on the data container and other data containers. The new UUID can be stored in relation to the original UUID. The processor executing the master data controller 710 also deletes the previous version of the container and disables the UUID of the previous version. Disabling the UUID causes there to still be a record of the original container version to track container lineage. However, once disabled, the master data controller 710 and/or the edge data controller 718 will deny any requests for access to the original container. This prevents a user or organization from accessing the original container even if copies of the original container, and even if the original, is stored at locations other than the server executing the master data controller or the edge node executing the edge data controller. This is because, in the various embodiments disclosed herein, access to and use of containers is managed by the master data controller 710 and the edge data controller 718, such that any attempts to access the container can require proprietary software or modular software incorporating the APIs disclosed herein, such as a browser extension, that causes any attempt to decrypt or decode containers managed by the systems disclosed herein to first request access permissions from the edge data controller 718 and/or the master data controller 710.

At a fifth step, the processor executing the master data controller 710 transfers to the edge data controller 718 a copy of the new container along with an instruction for the edge data controller 718 to delete the previous version of the container. At a sixth step, processor executing the edge data controller 718 stores a cached version of the new container in the container cache 712 and deletes the previous version of the container from the container cache 712. In some embodiments, the processor executing the edge data controller 718 can provide to the master data controller 710 the URL or other storage location identifier for the cached version of the container. In some embodiments, containers are not stored in the storage 708, but are stored locally by the user device 715 and/or by the container cache 712. In some embodiments, the edge data controller 718 can encode the data into and create the container, while providing a UUID and other information for registration and tracking to the master data controller 710. At a seventh step, the processor executing the edge data controller 718 transmits the container to the user device 715. In some embodiments, step seven may not occur, with the container simply remaining in the container cache 712 until the container, data from the container, or a result to a query using the containerized data is requested by a user device from the edge data controller 718.

Figure 17:
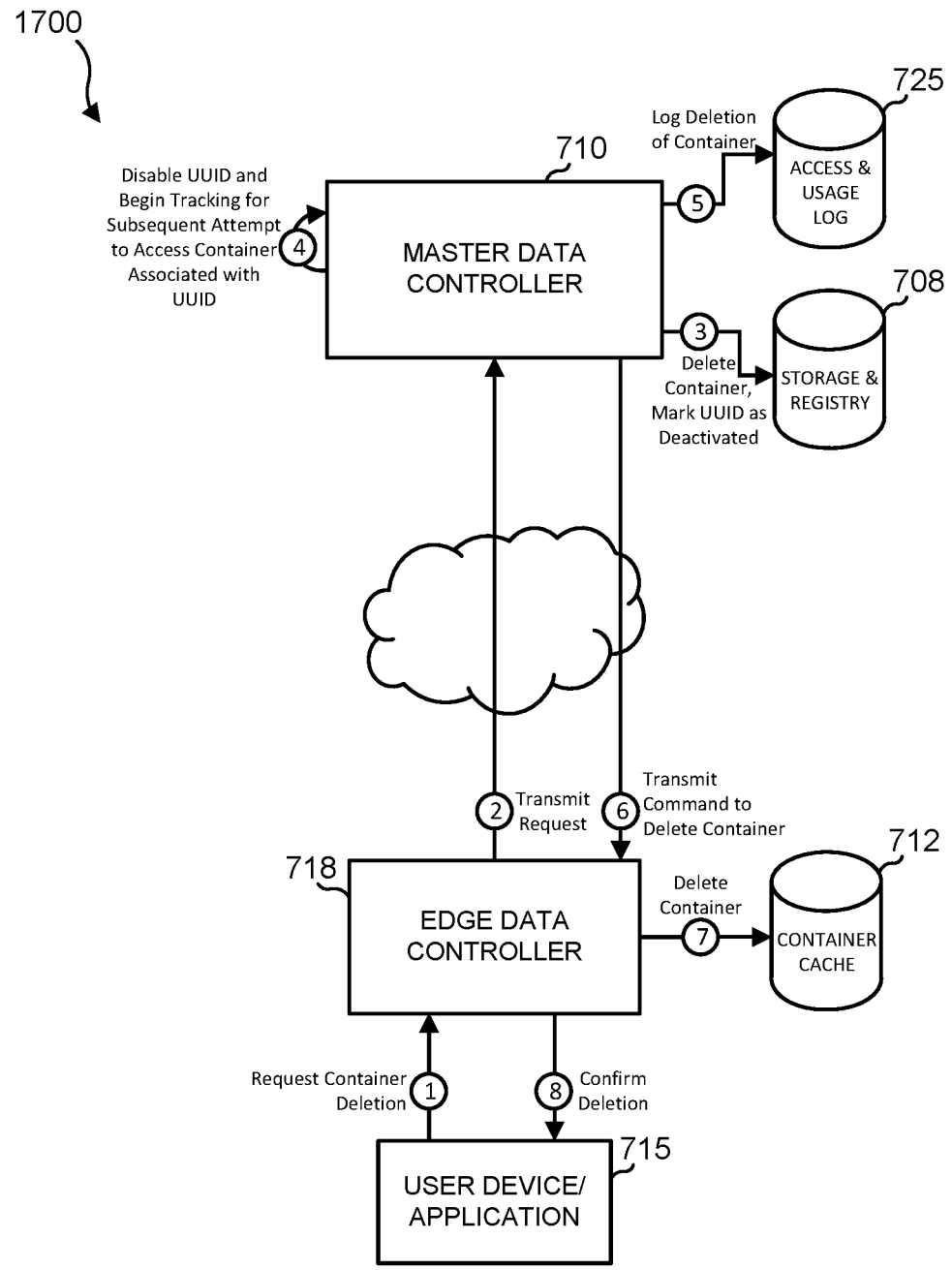
FIG. 17 illustrates a data container deletion process in accordance with various embodiments of this disclosure.

FIG. 17 illustrates a data container deletion process 1700 in accordance with various embodiments of this disclosure. For ease of explanation, the process 1700 may be described as being executed or otherwise used by the processor(s) 3002 disclosed with respect to FIG. 30, such as a processor executing the master data controller and/or the edge data controller. In some embodiments, the process 1700 can be used by the architecture 600 described with respect to FIG. 6A, the architecture 700 described with respect to FIG. 7, and/or the architecture 900 described with respect to FIG. 9. However, the process 1700 may be used by any suitable device(s) and in any suitable system. While shown as a series of steps, various steps of the process 1700 can overlap, occur in parallel, occur in a different order, or occur any number of times.

At a first step in the process 1700, a user device or application 715 transmits a request to delete a container to the edge data controller 718. In some embodiments, the deletion request can be a request identifying a specific container to delete, such as by referencing the container's UUID. In some embodiments, a data file or other data source linked in the master data sources 706 can be deleted by the user or organization, triggering a deletion by the edge data controller 718 and/or the master data controller 710. At a second step, the edge data controller 718 transmits a deletion request to the master data controller. In some embodiments, the edge data controller 718 and/or the master data controller 710 also performs a verification or authorization step to ensure the deletion request was submitting by a user or organization authorized to access or manage the data container.

At a third step, the processor executing the master data controller 710 deletes the container from the storage, and marks or flags the UUID as deactivated or disabled. At a fourth step, the processor executing the master data controller 710 begins tracking the disabled UUID for subsequent attempts to access the deleted container associated with the disabled UUID. It will be understood that the tracking of the disabled UUID can be a passive tracking, such that the processors executing the master data controller 710 and/or the edge data controller 718 react and use their resources when a request is received that identifies or disabled UUID or otherwise requests data associated with the deleted container. Disabling the UUID causes there to still be a record of the original container version to track container lineage. However, once disabled, the master data controller 710 and/or the edge data controller 718 will deny any requests for access to the original container. This prevents a user or organization from accessing the original container even if copies of the original container, and even if the original, is stored at locations other than the server executing the master data controller or the edge node executing the edge data controller. This is because, in the various embodiments disclosed herein, access to and use of containers is managed by the master data controller 710 and the edge data controller 718, such that any attempts to access the container can require proprietary software or modular software incorporating the APIs disclosed herein, such as a browser extension, that causes any attempt to decrypt or decode containers managed by the systems disclosed herein to first request access permissions from the edge data controller 718 and/or the master data controller 710.

At a fifth step, the processor executing the master data controller 710 logs the deletion of the container in the access and usage log 725. Logging the data related to the deletion request can include various information, such as a timestamp for the request, an identity of the content owner, an identity of the requester, the UUID of the deleted container or other data related to the deleted container, and/or a result of the request, such as whether the deletion was allowed or denied. It will be understood that the access and usage log 725 can be updated during the processes 1500 and 1600 as well.

At a sixth step, the processor executing the master data controller 710 transfers to the edge data controller 718 an instruction for the edge data controller 718 to delete the container from the container cache 712. At a seventh step, the processor executing the edge data controller 718 deletes the cached version of the container in the container cache 712. In some embodiments, the seventh step can be skipped if no cached version of the container exists in the container cache 712. At an eighth step, the processor executing the edge data controller 718 transmits a confirmation of deletion of the container to the user device 715.

Figure 18:
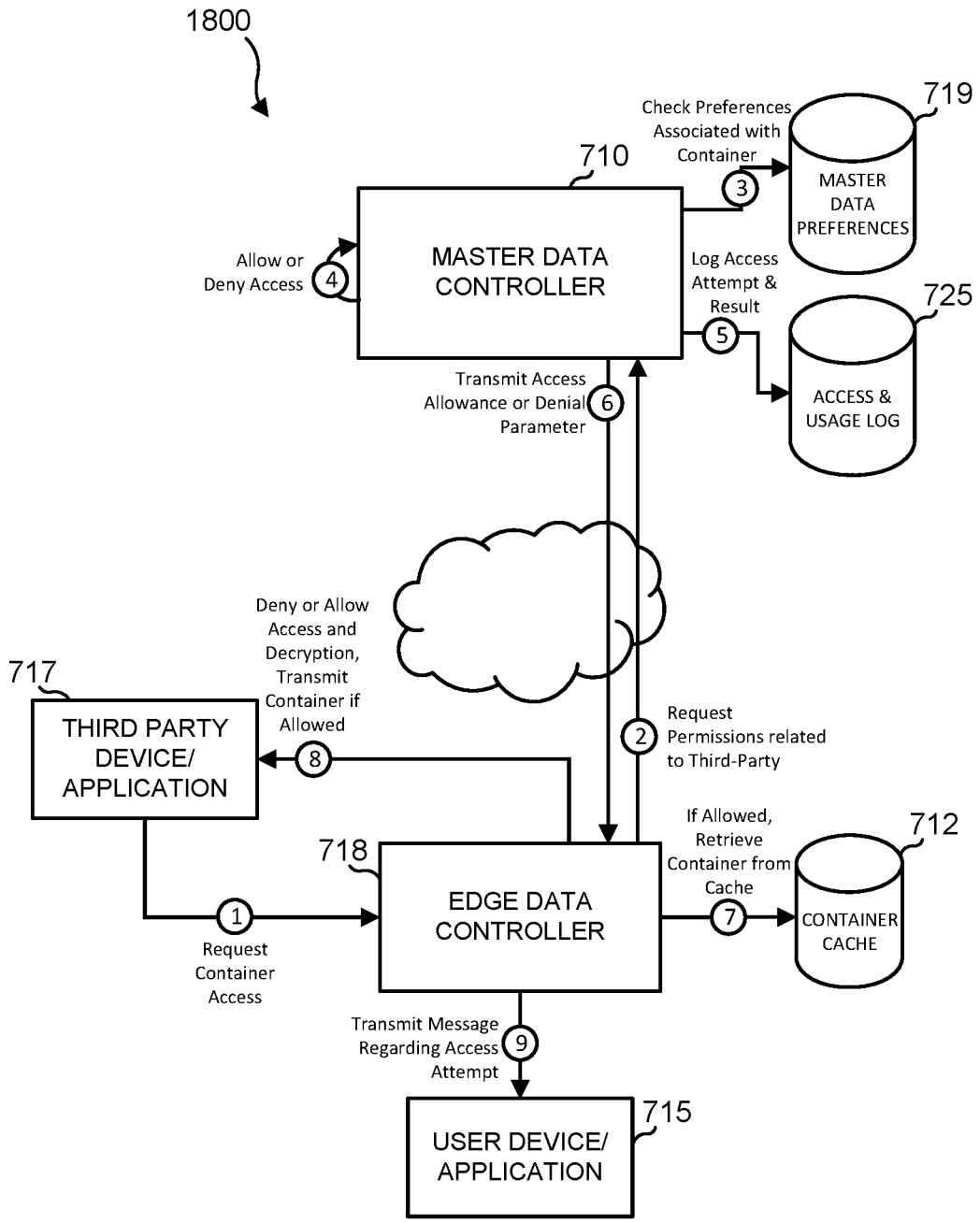
FIG. 18 illustrates a data container access request process in accordance with various embodiments of this disclosure.

FIG. 18 illustrates a data container access request process 1800 in accordance with various embodiments of this disclosure. For ease of explanation, the process 1800 may be described as being executed or otherwise used by the processor(s) 3002 disclosed with respect to FIG. 30, such as a processor executing the master data controller and/or the edge data controller. In some embodiments, the process 1800 can be used by the architecture 600 described with respect to FIG. 6A, the architecture 700 described with respect to FIG. 7, and/or the architecture 900 described with respect to FIG. 9. However, the process 1800 may be used by any suitable device(s) and in any suitable system. While shown as a series of steps, various steps of the process 1800 can overlap, occur in parallel, occur in a different order, or occur any number of times.

The process 1800 begins at a first step in which a third party device or application 717, that is, some device associated with a user or organization that is not the owner of the data stored in a container, transmits a request to access a container to the edge data controller 718. The request can include various information, such as the identity of the requesting user or organization, the identify or ID of the data owner, a specific identification of the container, such as a UUID, an identification of the types of data desired with respect to the data owner, a timestamp identifying the time of the request, information regarding why the request is being made or the context the request is being made, this information being used to satisfy one or more access and usage constraints or parameters such as temporal parameters, proxy parameters, duration parameters, etc.

At a second step, the processor executing the edge data controller 718 transmits a request for a compliance check regarding third party request to the master data controller 710. In some embodiments, depending on the applications and data stored at the edge node executing the edge data controller 718, some or all of the following steps 3-5 can be performed by the edge data controller 718. At a third step, the processor executing the master data controller 710 checks the access and usage preferences, constraints, or parameters associated with the container against a master data preferences datastore or database 719. In some embodiments, the master data preferences database 719 can be the master data preference center and/or the organizational marketing, privacy, and data preference centers described with respect to FIGS. 1 and 6. In some embodiments, the master data preferences database 719 can include a copy of the smart data contract that is also encoded in the container.

In some embodiments, the master data preferences database 719 can include just the machine readable components of the smart data contract. In some embodiments, one or more portions of the access and usage preferences, constraints, or parameters can be implements in a graph database defining relationships between data containers, data owners, organizations etc. In some embodiments, the graph database can be used in tandem with other stored preferences, such as using the graph database to determine if the requesting third party is allowed access to a container, and, if so, using the machine readable constraints to determine if the third party is allowed access at the given request time based on circumstances surrounding the request, such as the location of the user, time of day or status of a user interaction with the third party, whether the third party has permission to share the data owner's data with other third parties, etc. In some embodiments, the smart data contract within the container itself can be accessed to determine compliance or noncompliance of the request with the smart data contract, in which the container can be decrypted to analyze the smart data contract, or, in some embodiments, the smart data contract portion of the containers can remain unencrypted while the data storage portion of the container can be encrypted.

In response to checking the request against the master data preferences database 719, the processor executing the master data controller 710 determines whether to allow or deny access to the container, the data in the container, or a query result regarding the data in the container. At a fifth step, the processor executing the master data controller 710 logs the access attempt and the result in the access and usage log 725. At a sixth step, the processor executing the master data controller 710 causes a transmission to be sent to the edge node that includes the edge data controller 718, the transmission including a parameter indicating whether the access and usage request was allowed or denied.

If the request is allowed, the processor executing the edge data controller 718 retrieves the container from the container cache 712 and, at an eighth step, sends a communication to the third party device allowing access and decryption of the container. If the request is denied, the processor executing the edge data controller 718 does not retrieve the container from the container cache 712, and instead sends a communication to the third party device denying the access and usage request. At a ninth step, the processor executing the edge data controller 718 transmits a message regarding the access attempt to the user device 715, that is, the data owner, providing information on the access and usage request, which can include the identity of the requester, the outcome of the request, i.e., allowance or denial, reasons for why the request was allowed or denied based on certain access and usage constraints or parameters, or other information.

In some embodiments, decryption of the container is performed using a key managed by the server or edge node executing the master data controller 710 and the edge data controller 718, respectively, either by providing the decryption key to the third party, or using the decryption key at the master data controller 710 or the edge data controller 718 to decrypt the data before providing the data to the third party. In some embodiments, the data owner maintains the decryption key, and the server, edge node, and third party do not have access to the decryption key. In such embodiments, the process 1700 can also include a step in which the user device 715 either provides the decryption key to the third party device 717, or decrypts the container for the third party device 717 without sending the decryption key to the third party device 717, in response to being notified of allowance of the request. Whether the decryption key is maintained by the user device 715 or the master data controller 710 and/or the edge data controller 718, in some embodiments the third party device 717 can be prevented from seeing the actual data in the container. For example, embodiments of this disclosure provide for sending an answer to a query or some other kind of request to the third party device 717, while obfuscating one or more portions of the data stored in the container, such that the third party never has access to the actual data itself. Obfuscation of data can be accomplished using one or more privacy enhanced technologies (PETs) as described in the various embodiments of this disclosure.

It will be understood that, in FIGS. 11A, 11B, and 15-18, although the user device 715 and the third party device 717 are not shown as sending transmissions over the network cloud, transmissions between the user device 715 and the edge data controller 718, and transmissions between the third party device 717 and the edge data controller 718, can still be considered as transmissions over a network. FIGS. 11A, 11B, and 15-18 are to illustrate that the edge node executing the edge data controller 718 resides at the network edge closer to the user devices. In some embodiments, depending on if a user device moves or otherwise changes location, requests can be sent to the server executing the master data controller 710. In some embodiments, a local container controller 618 can also be executed by the user device 715 and/or the third party device 717 to manage container creation, deletion, updating, and access and usage request between the user device 715 and/or the third party device 717 and the server executing the master data controller 710.

Figure 19:
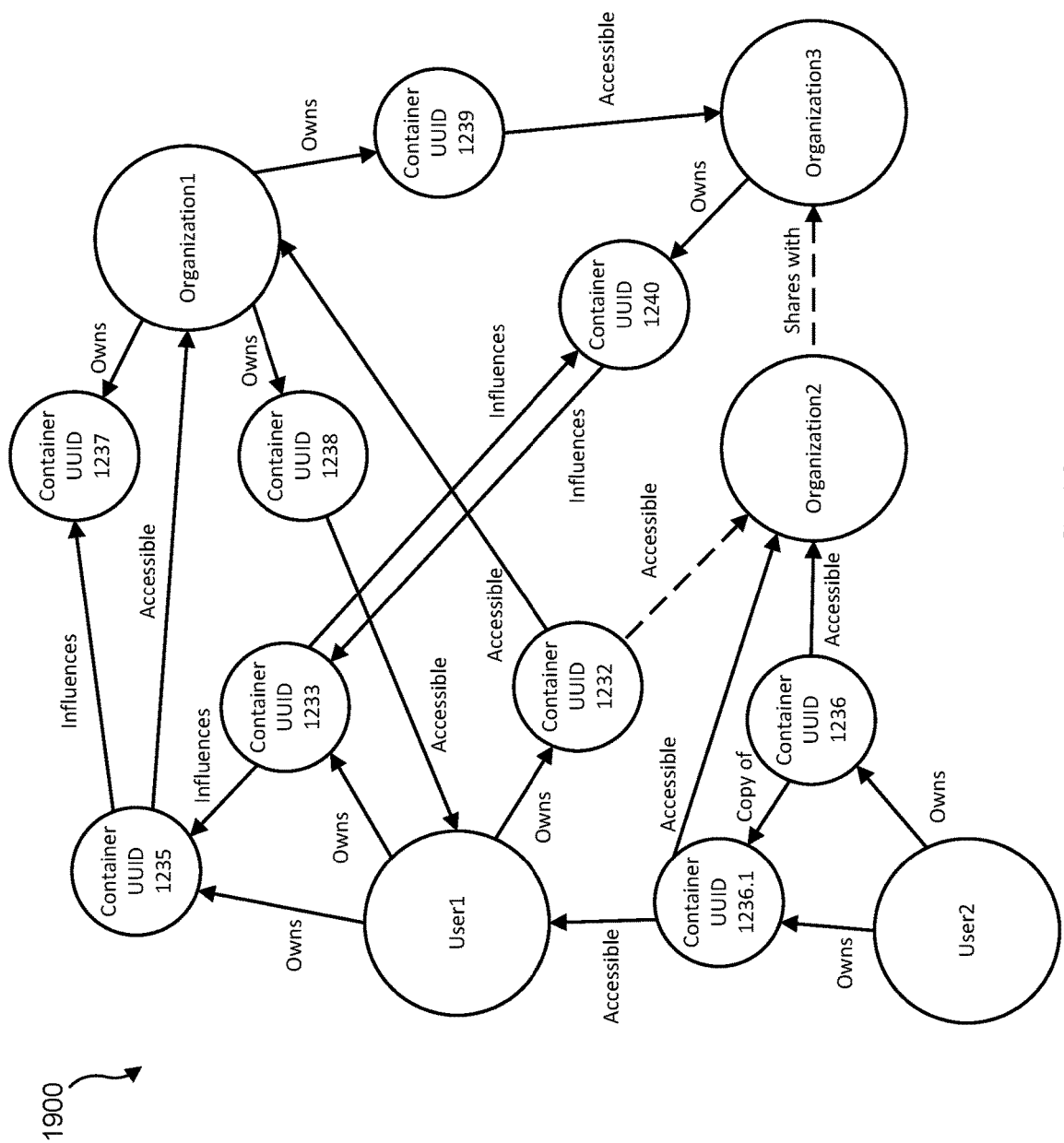
FIG. 19 illustrates a representation of an example graph database configuration in accordance with various embodiments of this disclosure.

FIG. 19 illustrates a representation of an example graph database configuration 1900 in accordance with various embodiments of this disclosure. It will be understood that FIG. 19 is for purposes of illustration of certain relationships defined by an example graph database of the present disclosure, but that other configurations, entity identifications and relationships, and parameters can be used without deviating from the scope of the present disclosure.

The graph database configuration 1900 shows various relationships between users, organizations, and data containers owned by those users and organizations. For example, the graph database configuration 1900 includes a User1 and a User2. User1 is the owner of data included in three containers identified by UUID numbers 1232, 1233, and 1235. It will be understood that these UUID numbers are examples, and other UUID formats can be used, including any number characters such as a combination of alphanumeric characters. Based on one or more smart data contracts established by User1, User1 has granted access of container 1232 with Organization1 and Organization2. Additionally, User1 has established proxy parameters with Organization2 allowing Organization2 to share container 1232, its data, or data or conclusions derived therefrom, with an Organization3. As shown in FIG. 19, organizations can also own data containers. For example, Organization1 owns three containers identified by UUID numbers 1237, 1238, and 1239. Organizations can also share containers or data, such as shown by container 1239 owned by Organization1 being accessible by Organization3, or by container 1238 owned by Organization1 being accessible by User1.

In some embodiments, containers can also reference each other via the graph database to establish that changes to data or the smart data contract within a container influences another container, even if the other containers is owned by another user or organization. For example, User1 may wish separate data into different containers for increased security, such as storing biographical information in one container and financial information in another container. The containers can be linked such that the containers can be shared together, but requiring multiple decryption steps to access all the data. In some embodiments, one container may store raw information, while another container stores information derived from the raw information. For example, suppose that container 1233, which is shown as influencing container 1235, both owned by User1, includes data related to financial information of User1, such as paycheck amounts, and the container 1235 includes a total salary, or even simply an indication that User1's salary is above a certain amount or threshold.

User1 may be willing to share the data in container 1235 regarding the salary or that the salary is above a certain amount, but may not be willing to share exact paycheck values. Whenever new paycheck values are acquired, container 1233 can be updated, which triggers an update of container 1235 to update the total salary or the indication regarding the amount or threshold. Since only container 1235 is accessible by Organization1, and not container 1233, Organization1 would only be able to access the total or the indication regarding the amount or threshold, and not the actual paycheck values. This could be used, for example, to qualify for an apartment application, a car rental or purchase, or other items where only an indication that User1 makes a certain amount is relevant.

Containers owned by different users and organizations can also be configured as components of an application, such as using a SQLITE data file format for a containers where the SQLITE data file is configured to be used as an application file format. Various programmable and executable application components can be implemented in containers in this way, and such containers can be influenced by or influence other containers. For example, one application file format container can include graphical user interface (GUI) elements for presenting data, requests, options, or other content to other users or organizations, and these containers can be influenced by changes to other containers, either temporarily or permanently. As shown in FIG. 19, container 1240 owned by Organization3 and container 1233 owned by User1 influence each other.

For example, suppose that container 1240 has encoded therein a GUI for retrieving and presenting employee paycheck information to a user, and suppose that container 1240 is executed to present this information to User1. Container 1240 can present the GUI to User1, such as displaying a GUI for selecting a date range of paychecks to search. Conducting the search causes container 1240 to present a new GUI display to User1 showing retrieved paycheck values, which can either be pulled from secure storage or from another container in which these values are stored by Organization3. This influences container 1233 to be updated with the values provided by containers 1240. In some embodiments, container 1233 can also influence container 1240. For example, if container 1233 includes authentication information for accessing the paycheck values maintained by Organization3, container UUID 1240 can be executed to request the authentication information, which is provided by container 1233, which influences container 1240 to proceed to a next step or presentation of a next GUI as defined by the application file encoded in the container 1240. Container 1240 may also be influenced by container 1233 in other ways, such as if an application or script executed by container 1240 requests information from container 1233 regarding paychecks already stored in container 1233, such as paycheck dates, and then automatically updates container 1233 with any new information, such as information related to paychecks not yet included in containers 1233.

In a similar manner, container 1235, influenced by the data in container 1233, can also influence container 1237 owned by Organization1, such as if container 1237 provides an application and/or GUI for qualifying for a mortgage or other asset based on a salary or income threshold included in the container 1235. In some embodiments, an instance or copy of container 1240 can be executed during such an exchange with container 1233, and then the instance or copy deleted when the exchange is complete, such that original container 1240 remains unaltered or uninfluenced for the next exchange with a user or a user's container. It will be understood that the salary example is but one example. Other examples can include retrieving and updating authentication information such as usernames, passwords, and biometric information, filling out forms in a GUI for various reasons such as a job application, travel bookings, online shopping, social media platform posts, repeat client-server communications for online services such as online gaming or instant messaging, or other reasons.

As also shown in FIG. 19, the graph database can also include relationships between containers and their copies. For example, User2 is shown as owning two containers, container 1236 and container 1236.1, container 1236.1 being a copy of container 1236. In some embodiments, container copies can be designated as a copy of another container in the database, and also be indicated as a copy by using a floating point number for the UUID, where the UUID is the same as the original container except for including incremental decimal point values in the UUID. It will be understood that other ways of indicating a container is a copy can also be used. For example, to save memory, instead of using a floating point value, other formats can be used such as using a combination of numbers and letters, 1236A, for example, such as by using ASCII or string data structures for the UUID. As shown in FIG. 19, container 1236 is accessible by Organization2, while the copy is accessible to User1. As described in the various embodiments of this disclosure, containers and their copies, including their storage locations and lineage, can also be tracked by the container registry.

Figure 20:
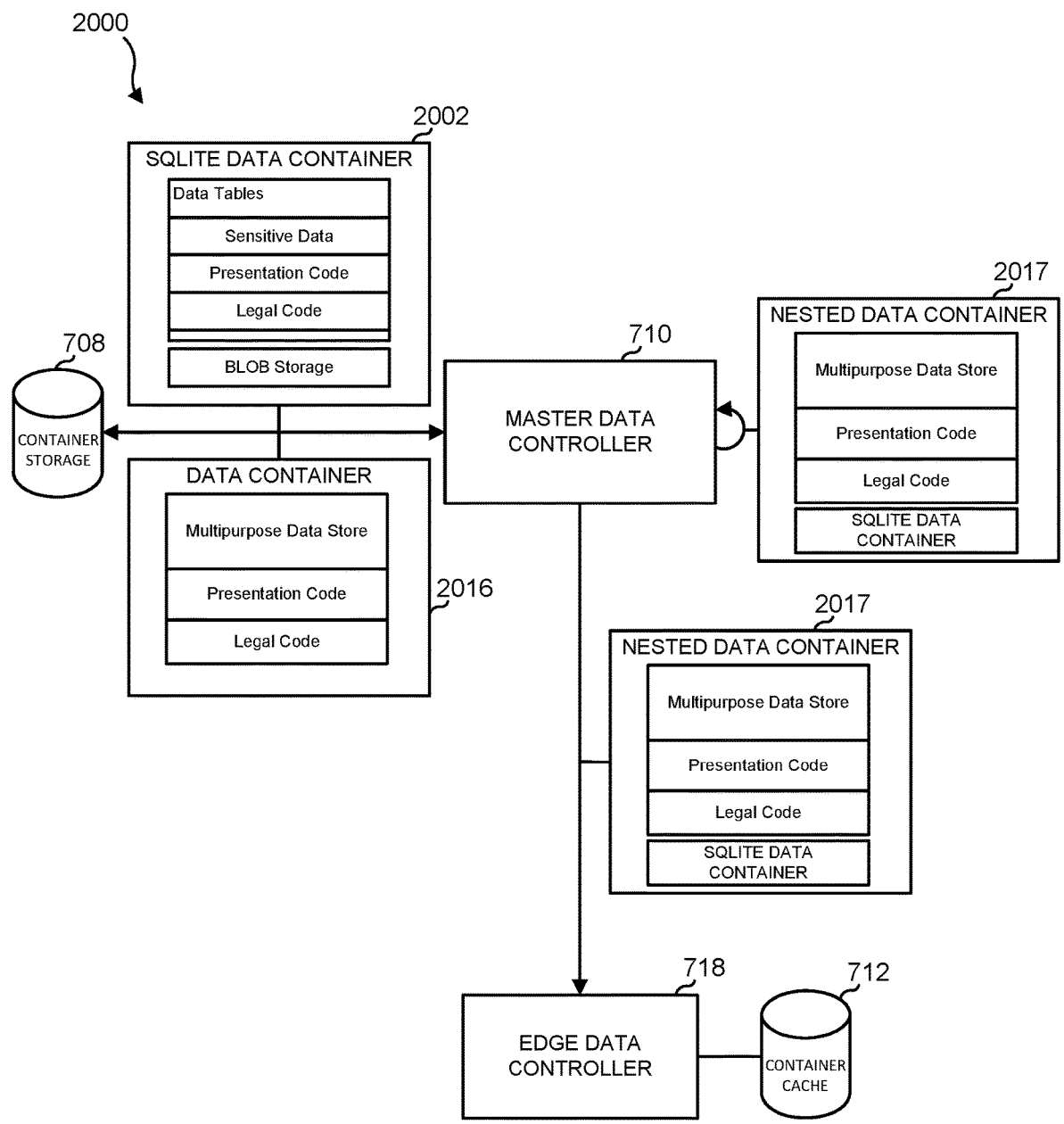
FIG. 20 illustrates an example container nesting process in accordance with various embodiments of this disclosure.

FIG. 20 illustrates an example container nesting process 2000 in accordance with various embodiments of this disclosure. As described herein, containers can be related to one another in various ways, such as by establishing relationship between two containers in a database. Another method of creating either temporary or permanent relationships between containers is to nest a container within another container. Containers as disclosed herein can be in different formats. A container belongs to a class of objects that can allow for multiple data streams to be encoded into a single file, typically with metadata identifying and further defining the data streams.

In some embodiments, the metadata may not be encrypted to allow for easier and quicker analysis of what the data container includes without revealing the sensitive data itself. For example, a data container can be formatted as a decrypted SQLITE data file or SQLITE application data file. SQLITE application data files can be used to persist application states or to exchange information between programs. SQLITE application files allow for an application state to be recorded as a pile-of-files, such as by using a key/value schemes such as "CREATE TABLE files (filename TEXT PIMRARY KET, content BLOB)." Compressed content in the SQLITE data file can be equivalent to other compressed archive formats, such as a ZIP archive, while also having the advantage of being able to update individual files without rewriting the entire document. However, a SQLITE container file is not limited to a simple key/value structure like a pile-of-files database. A SQLITE container also have a large number of different tables, with dozens or hundreds or thousands of fields per table, each with different datatypes and constraints and particular meanings, all cross-referencing each other, appropriately and automatically indexed for rapid retrieval, and all stored efficiently and compactly in a data file.

There are numerous benefits to using a SQLITE data file as containers and for both data and applications. No new code is needed for reading or writing the application file, but rather the SQLITE library can be linked against or a single "sqlite3.c" source file can be included with the rest of the application code, and SQLITE can take care of file I/O. This can reduce application code size by many thousands of lines. Since a SQLITE database is contained in a single file or container, it can be easily copied or moved. SQLITE data containers also provide a complete relational database engine, which means that the application can access content using high-level queries. Developers can thus write SQL that expresses the information they want and then let the database engine to figure out how to best retrieve that content.

SQLITE writes are also atomic. Writes can happen completely or not at all, even during system crashes or power failures. SQLITE is also transactional, meaning that multiple changes can be grouped together such that either all or none of them occur, and so that the changes can be rolled back if a problem is found prior to commit. This allows an application to make a change incrementally, then run various sanity and consistency checks on the resulting data prior to committing the changes to disk. Incremental And Continuous Updates. When writing to an SQLITE database file, only those parts of the file that actually change are written out to disk. This makes the writing happen faster and provides an advantage over other application file formats, which can require a rewrite of the entire document in order to change a single byte. SQLITE also supports continuous updates. Instead of collecting changes in memory and then writing them to disk only on a File/Save action, changes can be written back to the disk as they occur. As an application grows, new features can also be added to a SQLITE application file format simply by adding new tables to the schema or by adding new columns to existing tables. Adding columns or tables does not change the meaning of prior queries, so with a modicum of care to ensuring that the meaning of legacy columns and tables are preserved, backwards compatibility is maintained.

In many cases, a SQLITE application file format will be faster than a pile-of-files format or a custom format. In some cases, SQLITE can read and write smaller Binary Large Objects (BLOBs) from its database faster than those same BLOBs can be read or written as separate files from the filesystem. A BLOB is a collection of binary data stored as a single entity, and are typically images, audio, or other multimedia objects, although binary executable code can also be stored as a BLOB. A SQLITE application file format also provides for applications to be written in different languages and by different development teams. SQLITE application file formats also provide the complete documentation for that file format in the database schema, with perhaps a few extra words about what each table and column represents.

In some embodiments, containers can include one or more archive file container formats such as ZIP format, RAR format, etc., or multimedia playback container formats such as MASTROSKA, MP4, AVI, etc. Other containers types can also be implemented. For example, containers that interleave disparate file or data types into one container for enhanced security and convenience can be used, such as CHM or CHIF files as disclosed in U.S. Pat. No. 10,187,443 and U.S. Patent Application Publication No. 2020/0351323, which are each incorporated by reference herein.

As shown in FIG. 20, a SQLITE data container 2002 can include data tables including sensitive data such as biographical information such as name, address, birthdate, etc., authentication information such as usernames, passwords, security questions, etc., financial information such as credit card information, billing address, digital payment methods, income or salary, etc., and other information used to establish relationships with other users, organizations, or services. The data tables of the SQLITE lite data container 2002 can also include legal code such as the smart data contract and presentation code. Additionally, the SQLITE data container can include a BLOB storage portion in which one or more BLOB objects such as images, audio, video or other types of data can be stored.

As illustrated in FIG. 20, two or more containers can be nested to associate the data of the two containers, or to provide information for use by the other container. For example, as described with respect to FIG. 19, one container may present to a user or request from user information to be provided by one or more of the user's data containers. To provide the information, the user's data containers can be nested in the requester's container. In other embodiments, applications defined by one or more data containers can be nested, either as an application is updated or as application responses are provided that manipulate the application, such as inputs changing a GUI as described in the examples with respect to FIG. 19.

As illustrated in FIG. 20, the processor executing the master data controller 710 retrieves two containers from the container storage 708. In some embodiments, the containers can be transmitted to the master data controller 710 from one or more users or organizations. In this example, the two data containers to be nested include the SQLITE data container 2002 and another data container 2016 of another type, such as those described above. It will be understood that data containers of the same or differing types can be nested, and more than two containers can all be nested within each other.

In this example, the processor executing the master data controller 710 nests the containers 2002 and 2016 by storing the SQLITE data container 2002 within the data container 2016 subsequent to all the data in data container 2016, creating a nested data container 2017. This may be performed by the processor executing the master data controller 710 decrypting the containers 2002 and 2016, encoding the data from one into the other, and then re-encrypting the nested data container 2017. In some embodiments, the data from the data container 2002 can precede the data from data container 2016. In some embodiments, the data from containers 2002 and 2016 can be intermingled or interleaved into the nested data container 2017, and then reversing the process when decoding the nested data container 2017. Once the nested data container 2017 is created, the processor executing the master data controller 710 can store the newly created nested data container 2017 in the container storage 708. The processor executing the master data controller 710 can also transmit the nested data container 2017 to the edge data controller 718 for storage in the container cache 712.

Figure 21:
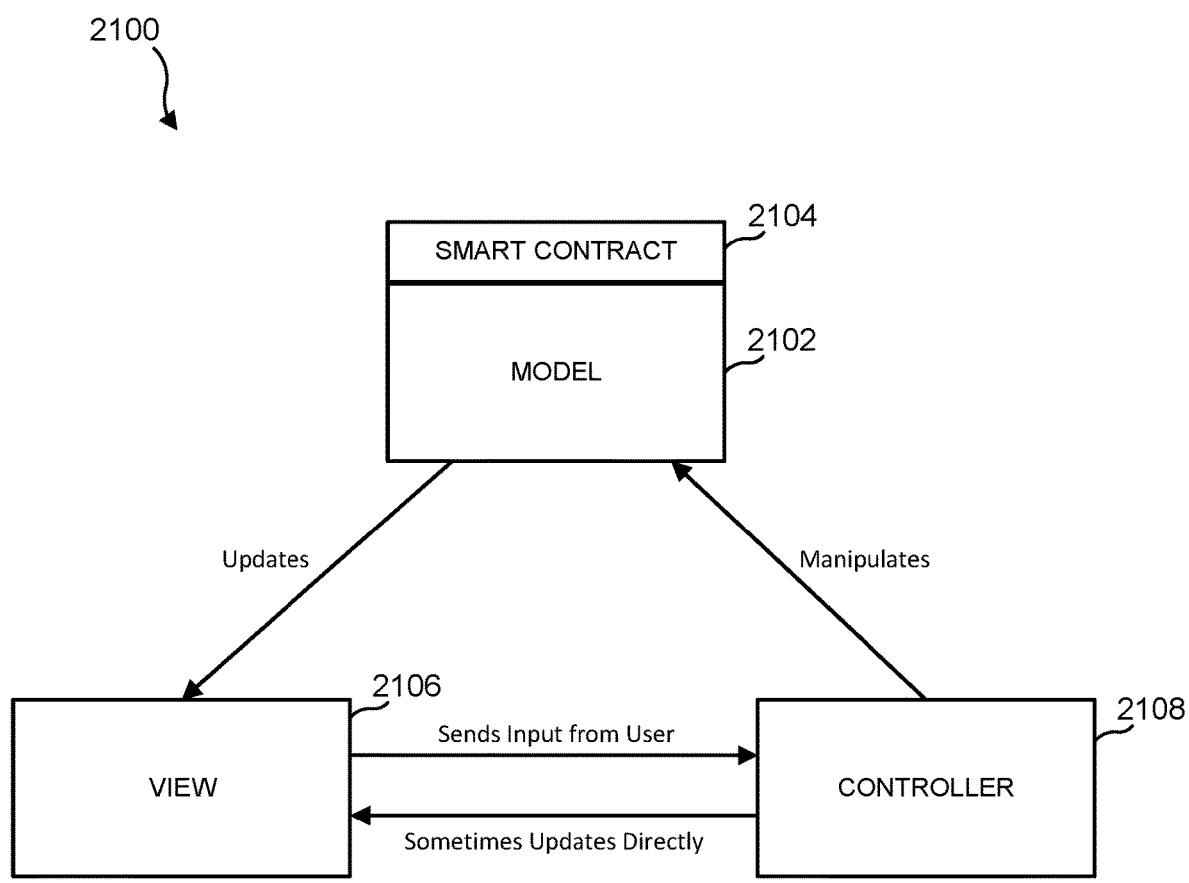
FIG. 21 illustrates an example composable application diagram in accordance with various embodiments of this disclosure.

FIG. 21 illustrates an example composable application diagram 2100 in accordance with various embodiments of this disclosure. As described hereinabove, data containers of the present application can be used as building blocks for applications, enabling users or organizations to create intelligent composable applications that update or respond to inputs and outputs to facilitate interactions with other users and organizations. Composable applications can allow for rapidly redesigned digital business solutions, new business models, automation and new products, services and channels via modular data and application architectures. As described herein, relationships between containers can be established such as by linking containers by graph database reference or by nesting a container within another container. These relationships can be temporary to facilitate the exchange of information or the updating of application states, or can be permanent, such as permanently storing a new data item in a container after it interacts with an application data container.

The example illustrated in FIG. 21 shows a customized model-view-controller (MVC) object model utilizing containers and smart contracts that can be used as a model for creating GUIs, web applications, or other programs. As illustrated in FIG. 21, a model 2102 can be a defined model or data structure, such as a container of the various types and formats disclosed herein. Usage, execution, or access to the model 2102 is controller by a smart contract 2104 as described in the various embodiments herein. For example, the model 2102 as constrained by the smart contract 2104 may only present the application to authorized individuals and based on various constraints such as those described with respect to FIG. 8.

The model 2102 is programmed to provide a view 2106 to a user and update that view based on inputs from the user or other sources. For example, the view 2106 can present an online shopping GUI that includes a button to add an item to the user's cart. Upon interacting with the "add to cart" button, the view 2106 sends the user input to a controller 2108. The controller 2108 can be the control logic for the application that handles events for the application, such as user inputs. In some cases, the controller 2108 can update the view 2106 directly. In other cases, the controller 2108 manipulates or updates the model 2102 to update the data stored therein to reflect the added cart item. The model 2102 then updates the view 2106 to show the item in the cart.

It will be understood that the updating of the model 2102 can be temporary, such as if an instance of the data container is executed and is updated multiple times as shown in FIG. 21 until a user ceases using the application, at which point the application is terminated and the original data container remains unchanged. In some embodiments, the instance can be a temporary copy of the data container. In some embodiments, multiple data containers can be used to execute the composable application.

Other example composable applications can include retrieving and updating authentication information such as usernames, passwords, and biometric information, filling out forms in a GUI for various reasons such as a job application, travel bookings, online shopping, social media platform posts, repeat client-server communications for online services such as online gaming or instant messaging, or other applications.

Figure 22:
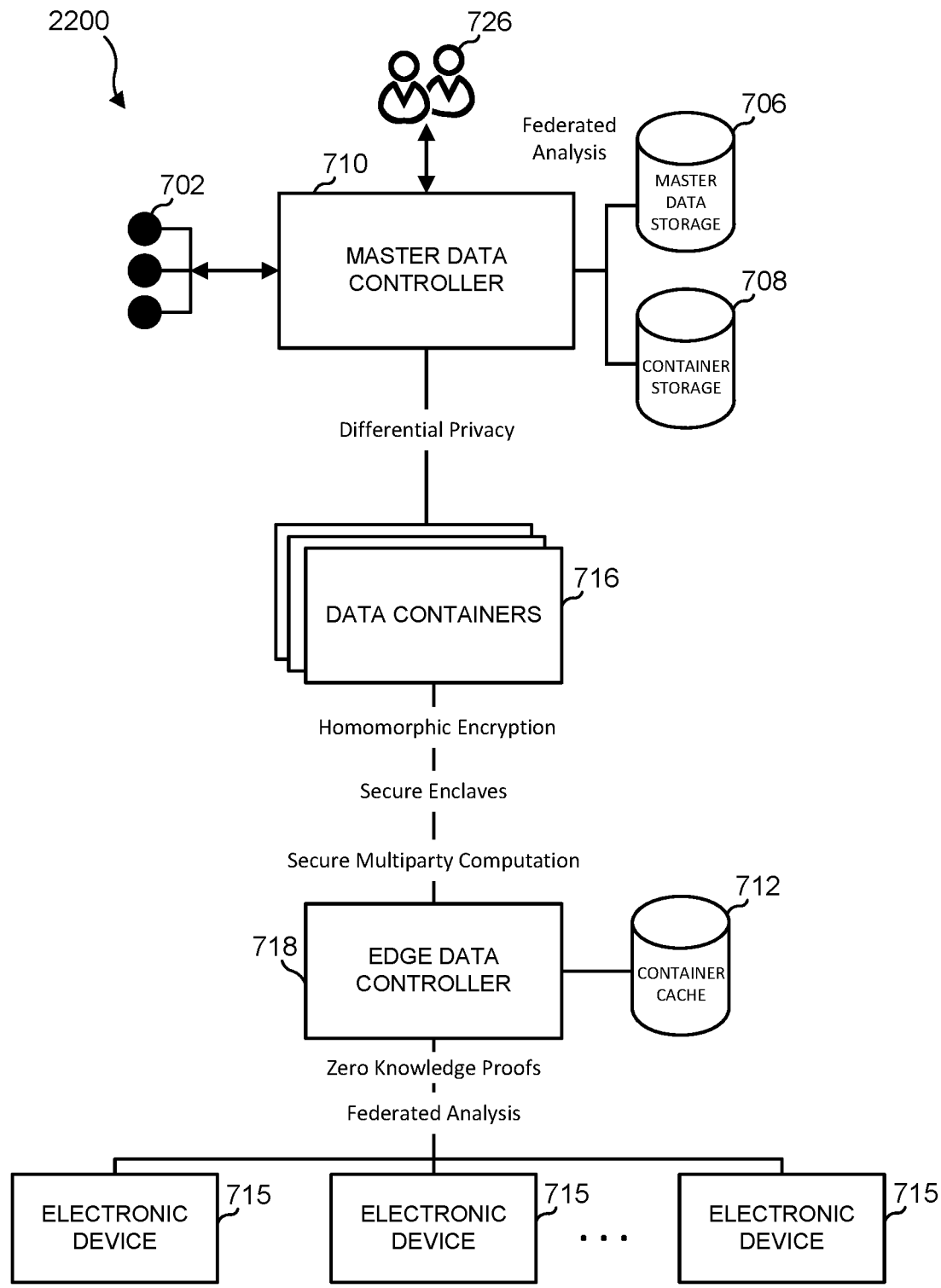
FIG. 22 illustrates an example container access and control architecture incorporating Privacy Enhancing Technologies.

FIG. 22 illustrates an example container access and control architecture 2200 incorporating Privacy Enhancing Technologies in accordance with various embodiments of this disclosure. Data containers of this disclosure can support and choreograph within one data architecture Privacy Enhancing Technologies (PETs) such as Zero-Knowledge Proofs, Homomorphic Encryption, Secure Enclaves, Differential Privacy, Federated Analysis, and Secure Multiparty Computation.

As shown in FIG. 22, PETs can be between different components of the architecture 2200. For example, data provided by the master data controller 710 can by manipulated using differential privacy to obfuscate data from the data containers, or to obfuscate how a result is reached using the data from the data containers. Differential privacy includes the process of adding noise to a dataset so that one cannot reverse-engineer the individual inputs. As also shown in FIG. 22, federated analysis can be performed between the electronic devices 715 and the edge data controller 718, or between the master data sources 706 and the master data controller 710. Federated analysis includes parties sharing insights from an analysis of their data without sharing the data itself.

As also shown in FIG. 22, homomorphic encryption and secure enclaves can be used by data containers and during use of data containers. Homomorphic encryption includes encrypting data before sharing the data such that the data can be analyzed, but not decoded into the original information. Secure enclaves are hardware security modules (HSMs) that are application-specific devices that provide cryptographic services to applications. HSMs also provide a closed operating environment with hardened operating systems and secure boot code and certified implementations of cryptographic algorithms with tightly defined APIs and a small attack surface. Using homomorphic encryption and/or secure enclaves allows for containers stored in the master data sources to be encrypted at rest, to remain encrypted in transit between architecture components, to remain encrypted during use, and then to remain encrypted at rest at edge devices.

As also illustrated in FIG. 22, secure multiparty computation can be used with data containers as disclosed herein, such that data analysis is spread across multiple parties so no individual party can see the complete set of inputs. Also, zero-knowledge proofs can be used to prevent client devices 715 from accessing, viewing, or storing data or data values by proving users have knowledge of a value without revealing the value itself.

It will be understood that the components of the architecture 2200 described as performing each of these PETs implementations are but examples, and other components of the system can also perform different PETs methods. It will also be understood that, while FIGS. 23-27 describe example processing using certain PETs, a combination of PETs can be used by the data container access and control architectures described in the various embodiments of this disclosure.

Various embodiments of this disclosure include or incorporate a cybersecurity mesh approach as part of the various systems and architectures disclosed herein. A cybersecurity mesh is a distributed architectural approach that moves security from being perimeter-centric to being defined around identities of people or objects, i.e., de-perimeterization. A cybersecurity mesh centralizes security policies while ensuring enforcement is more distributed and can include zero trust principles. In the various architectural embodiments disclosed herein, such as in FIGS. 7, 9, 11A, 11B, and 15-22, access to data within data containers is controlled by identity rather than a location inside a specific network. This enables location independent data security as more organizations face more data spread across BYODs, Clouds and SaaS platforms, and centralizes control of data while distributing enforcement of data access regardless of the data's location. By defining the security perimeter around the identity of a person or thing, cybersecurity mesh allows only authorized parties to work with given materials regardless of the location.

Figure 23:
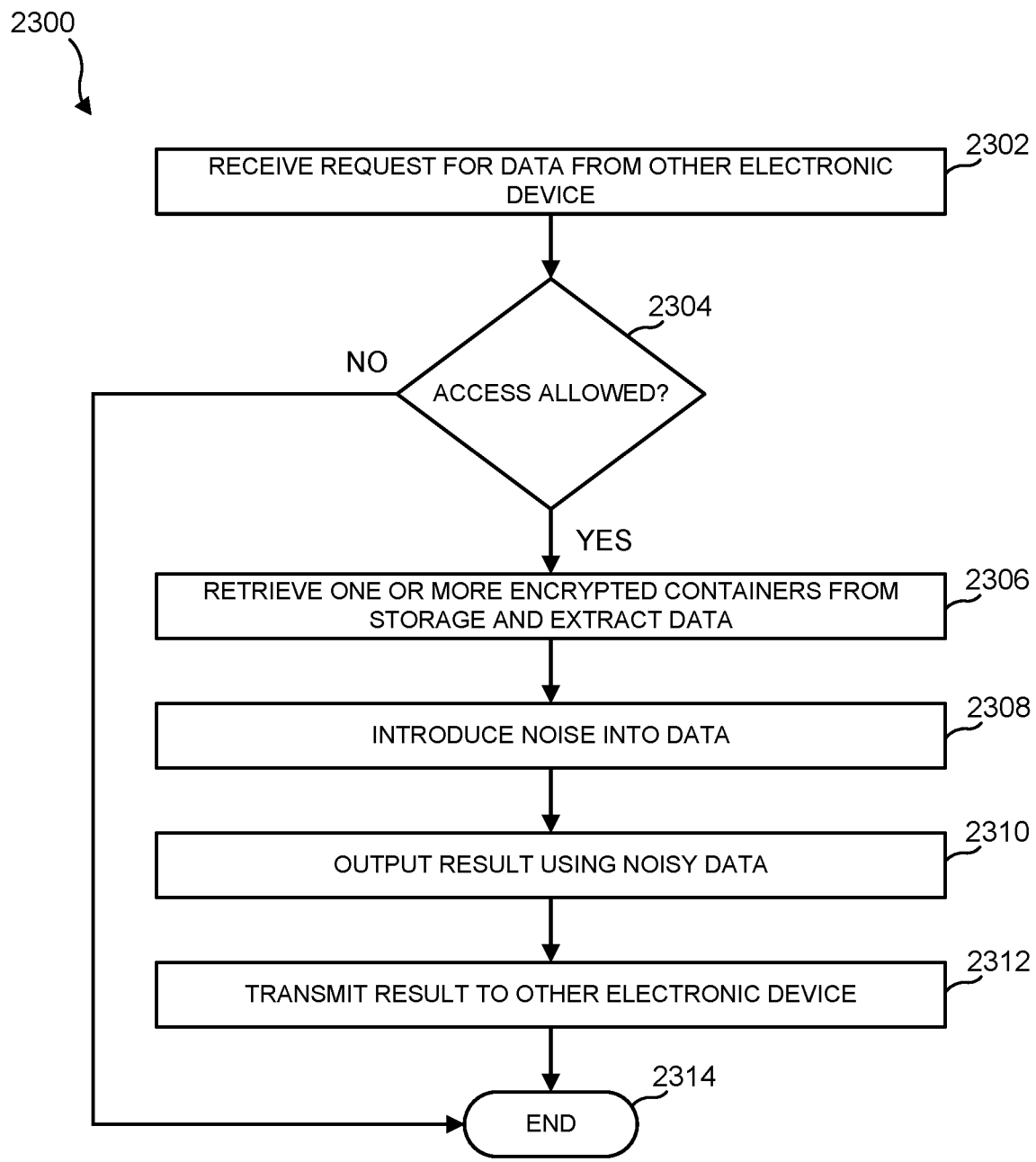
FIG. 23 illustrates a container access and control with differential privacy process in accordance with various embodiments of this disclosure.

FIG. 23 illustrates a container access and control with differential privacy process 2300 in accordance with various embodiments of this disclosure. For ease of explanation, the process 2300 may be described as being executed or otherwise used by the processor(s) 3002 disclosed with respect to FIG. 30, such as a processor executing the master data controller and/or the edge data controller. In some embodiments, the process 2300 can be used by the architecture 600 described with respect to FIG. 6A, the architecture 700 described with respect to FIG. 7, and/or the architecture 900 described with respect to FIG. 9. However, the process 2300 may be used by any suitable device(s) and in any suitable system. While shown as a series of steps, various steps of the process 2300 can overlap, occur in parallel, occur in a different order, or occur any number of times.

When a user or organization shares data with a third party, removing or anonymizing personally identifiable information is not always enough to protect privacy. For example, the data could be correlated to other datasets to reidentify specific individuals in the database. Differential privacy can avoid this problem by adding noise to the inputs, the calculations themselves, or to the outputs, ensuring the privacy of individual rows of data while meaningful insights can still be derived from queries on the aggregate data.

The process 2300 begins at step 2302 in which the processor receives a request for data in one or more data containers from another electronic device. At decision block 2304, the processor determines if the other electronic device is allowed to access the data in the data container, as described in the various embodiments of this disclosure. If not, the process 2300 ends at block 2314. If, at decision block 2304, the processor determines the other electronic device is allowed to access the data in the data container, the process 2300 moves to block 2306.

At block 2306, the processor retrieves one or more encrypted containers from storage and extracts the data from the one or more containers. At block 2308, the processor introduces noise into the data. For example, if an organization is requesting salary data from multiple users in order to calculate an average salary for those users, a user may not wish to provide their actual salary for various reasons, and noise is introduced into the user's value so that the actual value cannot be discerned. Differential privacy can thus be used to introduce noise into the data to slightly alter the result, without significantly altering the conclusion. For example, if 10 user salaries are provided in the data containers of 45K, 55K, 39K, 50K, 54K, 58K, 47K, 45K, 50K, and 57K, the calculated average salary is 50K. However, if the processor introduces noise into one user's data by generating a random number between the minimum salary, 39K, and the maximum salary, 58K, such as changing 45K to 55K, the average remains similar, 51K in this case, without allowing the user's salary to be discerned.

In some embodiments, differential privacy can be defined by letting E be a positive real number and A be a randomized algorithm that takes a dataset as input. Let im A denote the image of A. The algorithm A provides $\epsilon$-differential privacy if, for all datasets $D_1$ and $D_2$ that differ on a single element, i.e., the data of one person, and all subsets of S of im A:

$$P_r[A[D_1] \in S] \leq \exp(\epsilon) \cdot P_r[A[D_2] \in S]$$

where the probability is taken over the randomness used by the algorithm.

In some embodiments, Laplace noise can be added to data which can be expressed by probability density function, $\text{noise}(y) \propto \exp(-|y|/\lambda)$, which has mean zero and standard deviation $\sqrt{2}\lambda$. The output function of A can then be defined as a real valued function as, $T_A(x) = f(x) + Y$, where $Y \sim \text{Lap}(\lambda)$, and $f$ is the original real valued query/function planned to execute on the database or dataset. $T_A(x)$ can thus be considered to be a continuous random variable, where $$\frac{pdf(T_{A,D_1}(x) = t)}{pdf(T_{A,D_2}(x) = t)} = \frac{\text{noise}(t - f(D_1))}{\text{noise}(t - f(D_2))}$$

which is at most $$e^{\frac{|f(D_1) - f(D_2)|}{\lambda}} \leq e^{\frac{\Delta(f)}{\lambda}} \cdot \frac{\Delta(f)}{\lambda}$$

can be considered the privacy factor $\epsilon$ and thus T follows a differentially private mechanism. Other noise could also be introduced into the data, such as Gaussian noise.

After noise is introduced into the data at block 2308, at block 2310, the processor outputs a result using the noisy data. At block 2312, the processor transmits the result to the other electronic device. As such, process 2300 allows the master data controller and/or the edge data controller to provide data or results on data to requesting parties while obfuscating user data so that the requester can use the data and draw conclusions from the data without completely revealing all user data. The process 2300 ends at block 2314.

Figure 24:
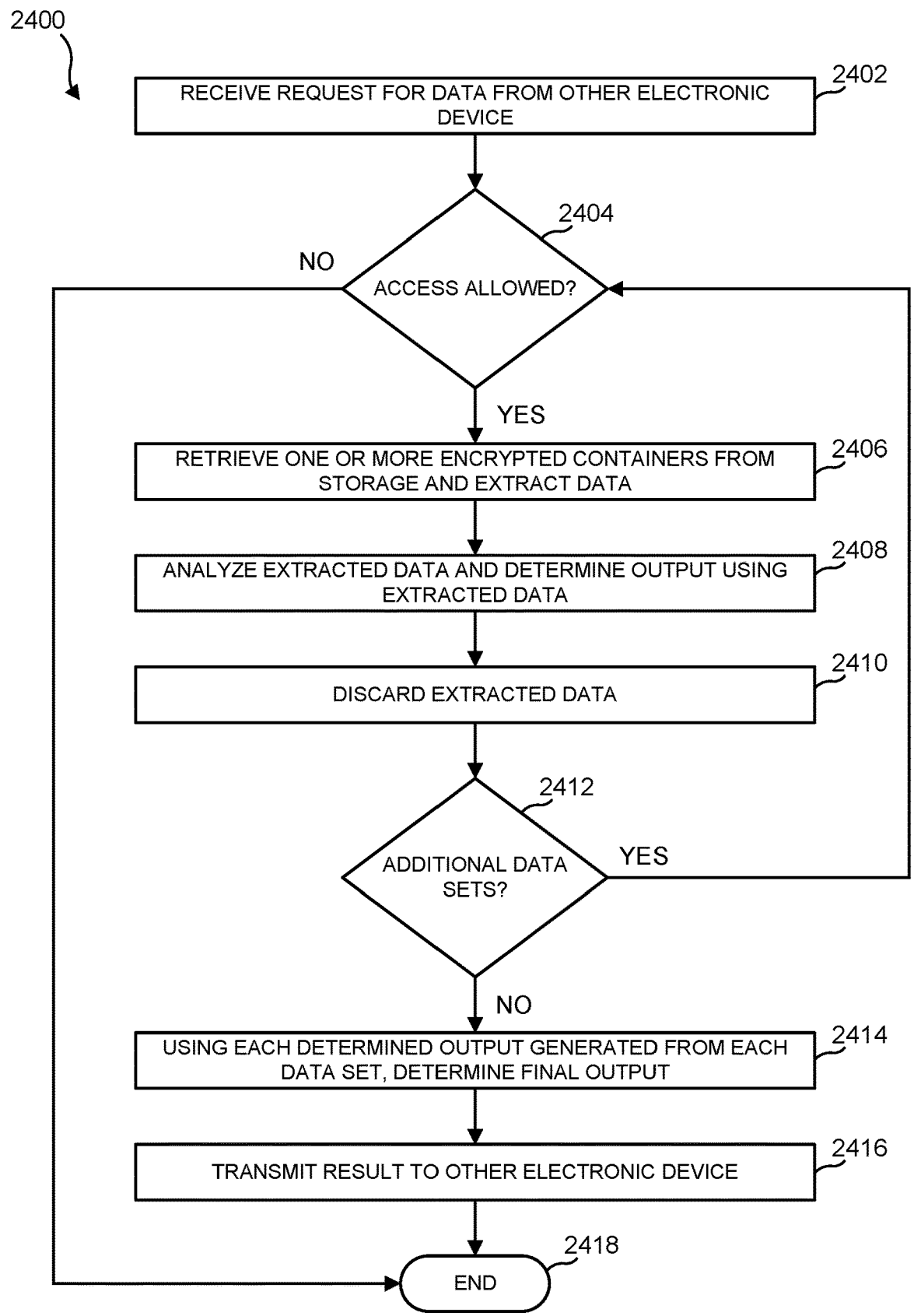
FIG. 24 illustrates a container access and control with federated analysis process in accordance with various embodiments of this disclosure.

FIG. 24 illustrates a container access and control with federated analysis process 2400 in accordance with various embodiments of this disclosure. For ease of explanation, the process 2400 may be described as being executed or otherwise used by the processor(s) 3002 disclosed with respect to FIG. 30, such as a processor executing the master data controller and/or the edge data controller. In some embodiments, the process 2400 can be used by the architecture 600 described with respect to FIG. 6A, the architecture 700 described with respect to FIG. 7, and/or the architecture 900 described with respect to FIG. 9. However, the process 2400 may be used by any suitable device(s) and in any suitable system. While shown as a series of steps, various steps of the process 2400 can overlap, occur in parallel, occur in a different order, or occur any number of times.

If an organization is seeking to analyze large sets of data held across multiple data containers, the organization can combine them into one database to conduct analysis across the aggregate set of information. However, this introduces issues. The data may be sensitive in nature, such as medical records or private transactions and the user may not want to share direct access to it. Centralizing the data can introduce a risk that if the central database is breached sensitive information would be exposed. Federated analysis allows can address these issues by conducting analysis on disparate datasets separately, and then sharing back the insights from this analysis across the datasets.

The process 2400 begins at step 2402 in which the processor receives a request for data in one or more data containers from another electronic device. At decision block 2404, the processor determines if the other electronic device is allowed to access the data in the data container, as described in the various embodiments of this disclosure. If not, the process 2400 ends at block 2418. If, at decision block 2404, the processor determines the other electronic device is allowed to access the data in the data container, the process 2400 moves to block 2406.

At block 2406, the processor retrieves one or more encrypted containers from storage and extracts the data from the one or more containers. At block 2408, the processor analyzes the extracted data and determines an output using the extracted data. After analyzing the dataset and reaching an output or conclusion, the processor discards the data. At decision block 2412, the processor determines if additional datasets are to be analyzed and, if so, the process 2400 loops back to decision block 2404 to determine if access is allowed to the additional dataset. If, at decision block 2412, the processor determines that no additional datasets remain to be analyzed, the process 2400 moves to block 2414.

At block 2414, the processor, using each determine output generated from each dataset, determines a final output, conclusion, model, or other result. At block 2416, the processor transmits the result to the other electronic device. In some embodiments, the processor of the master data controller and/or the edge controller can perform federated analysis in this way to provide conclusions or generate models based on a plurality of datasets without commingling the datasets or providing multiple datasets to the requesting other electronic device. For example, if an organization wishes to create an AI model using a plurality of users' datasets, but the users do not wish to commingle that many datasets together, or the data is sensitive in nature, the processor can perform federated analysis by taking, for example, a first data set to produce a first model, a second data set to produce a second model, and a third dataset to produce a third model. The AI models can then be used in succession on new data or combined without needing to reference all three datasets at the same time.

As another example, a first spam engine could be created from one set of data from a plurality of data containers, a second spam engine could be created from a second set of data from a plurality of data containers, and a third spam engine could be created from one set of data from a plurality of data containers. The first spam engine may be configured such that one type of email is treated as spam, such as emails suggesting a user is violating tax law. The second spam engine may be configured such that another type of email is treated as spam, such as emails stating the sender is a Nigerian prince. The third spam engine may be configured such that yet another type of email is treated as spam, such as emails from a particular email address. Each of the spam engines can be independently created from the disparate datasets, but then combined such that all three email types are treated as spam by a shared spam engine, without accessing all datasets at the same time, and without revealing all datasets to third party organizations. The process 2400 ends at block 2418.

Figure 25:
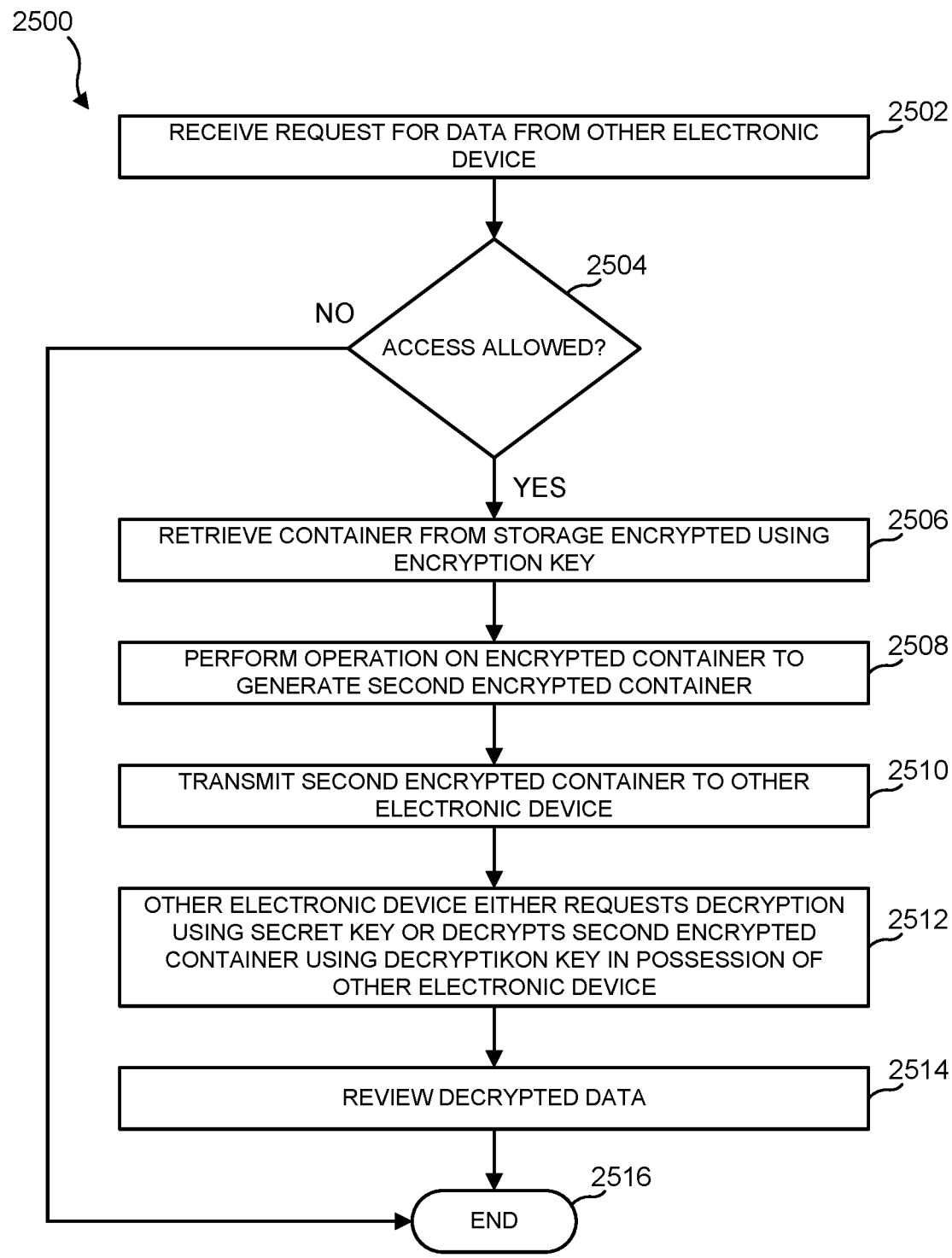
FIG. 25 illustrates a container access and control with homomorphic encryption process in accordance with various embodiments of this disclosure.

FIG. 25 illustrates a container access and control with homomorphic encryption process 2500 in accordance with various embodiments of this disclosure. For ease of explanation, the process 2500 may be described as being executed or otherwise used by the processor(s) 3002 disclosed with respect to FIG. 30, such as a processor executing the master data controller and/or the edge data controller. In some embodiments, the process 2500 can be used by the architecture 600 described with respect to FIG. 6A, the architecture 700 described with respect to FIG. 7, and/or the architecture 900 described with respect to FIG. 9. However, the process 2500 may be used by any suitable device(s) and in any suitable system. While shown as a series of steps, various steps of the process 2500 can overlap, occur in parallel, occur in a different order, or occur any number of times.

In some cases, data analysis may be conducted by a third party because the third party has capabilities the data steward does not, and the third party wishes to provide their analytics as a service without sharing the underlying functions they are using. The third party may also have access to other, complementary data that the data steward does not have, and as a result is able to provide better analytics and insights than the steward could do independently. As with federated analysis, however, the data steward may not have permission to transfer the data. Furthermore, if the data steward does not trust the third party, it will be reluctant to share this data for fear that it will be misused by insiders within the third party or its other partners. Finally, if this third party were to be breached, the original data steward would likely still be held responsible by its customers for sharing the data with the third party in the first place. Homomorphic encryption (HE) can be used to address these challenges by encrypting the data so that analysis can be performed on it, without the information itself ever being readable. The results of the analysis would also not be readable by anyone other than the intended party.

The process 2500 begins at step 2502 in which the processor receives a request for data in one or more data containers from another electronic device. At decision block 2504, the processor determines if the other electronic device is allowed to access the data in the data container, as described in the various embodiments of this disclosure. If not, the process 2500 ends at block 2516. If, at decision block 2504, the processor determines the other electronic device is allowed to access the data in the data container, the process 2500 moves to block 2506.

At block 2506, the processor retrieves one or more containers from storage previously encrypted with an encryption key. At block 2508, the processor performs an operation on the encrypted containers to generate a second encrypted container. In some embodiments, the master data controller or edge data controller can perform block 2508. In other embodiments, third parties such as an organization that a data owner has granted access to the data owner's containers can perform block 2508. For example, the data owner can retain a private key that is used to encrypt the data container and send the data container to the third party. The third party can then perform operations on the data container at block 2508, without being able to decrypt the data container since the third party does not have access to the private key, and generating a second encrypted data containers as a result. Once the second encrypted container is generated, at block 2510, the second encrypted container is transmitted to the data owner or another party having access to the decryption key. At block 2512, the device of the other party decrypts the second data container using the secret key, or requests decryption form the data owner. At block 2514, the device of the other party can then review the decrypted data.

Homomorphic encryption allows for operations to be performed on encrypted data containers to provide another still encrypted container. The second container, when decrypted, contains the same data as if the operations had been performed on the decrypted first container. As such, the sensitive data in the data containers do not have to be revealed, but the data can still be used, manipulated, and changed. Homomorphic encryption can be viewed as an extension of either symmetric-key or public-key cryptography and the encryption and decryption functions can be thought of as homomorphisms between plaintext and ciphertext spaces.

In various embodiments of this disclosure, different types of homomorphic encryption can be used, such as partially homomorphic, somewhat homomorphic, leveled fully homomorphic, and fully homomorphic encryption. In various embodiments, the computations are represented as either Boolean or arithmetic circuits. Partially homomorphic encryption encompasses schemes that support the evaluation of circuits consisting of only one type of gate, such as addition or multiplication. Somewhat homomorphic encryption schemes can evaluate two types of gates for a subset of circuits. Leveled fully homomorphic encryption supports the evaluation of arbitrary circuits of bounded or pre-determined depth. Fully homomorphic encryption (FHE) allows the evaluation of arbitrary circuits of unbounded depth.

One example of a partially homomorphic scheme is unpadded RSA. For example, if an RSA public key has a modulus n and encryption component e, and where $\varepsilon(x)$ is used to denote the encryption of the message x, then the encryption of a message m is given by $\varepsilon(m)=m^e \mod n$. This provides a homomorphic property of:

$$\varepsilon(m_1) \cdot \varepsilon(m_2) = m_1^e m_2^e \mod n = (m_1 m_2)^e \mod n = \varepsilon(m_1 \cdot m_2)$$

A fully homomorphic encryption scheme can also be used in the various embodiments of this disclosure, which enables the construction of programs for any desirable functionality, which can be run on encrypted inputs to produce an encryption of the result. Since such a program need never decrypt its inputs, it can be run by an untrusted party without revealing its inputs and internal state. In some embodiments, an FHE library can be integrated into the architectures discloses herein to perform homomorphic encryption, such as PALISADE, MICROSOFT SEAL, or NUCYPHER FULLY HOMOMORPHIC ENCRYPTION (NuFHE). The process 2500 ends at block 2516.

Figure 26:
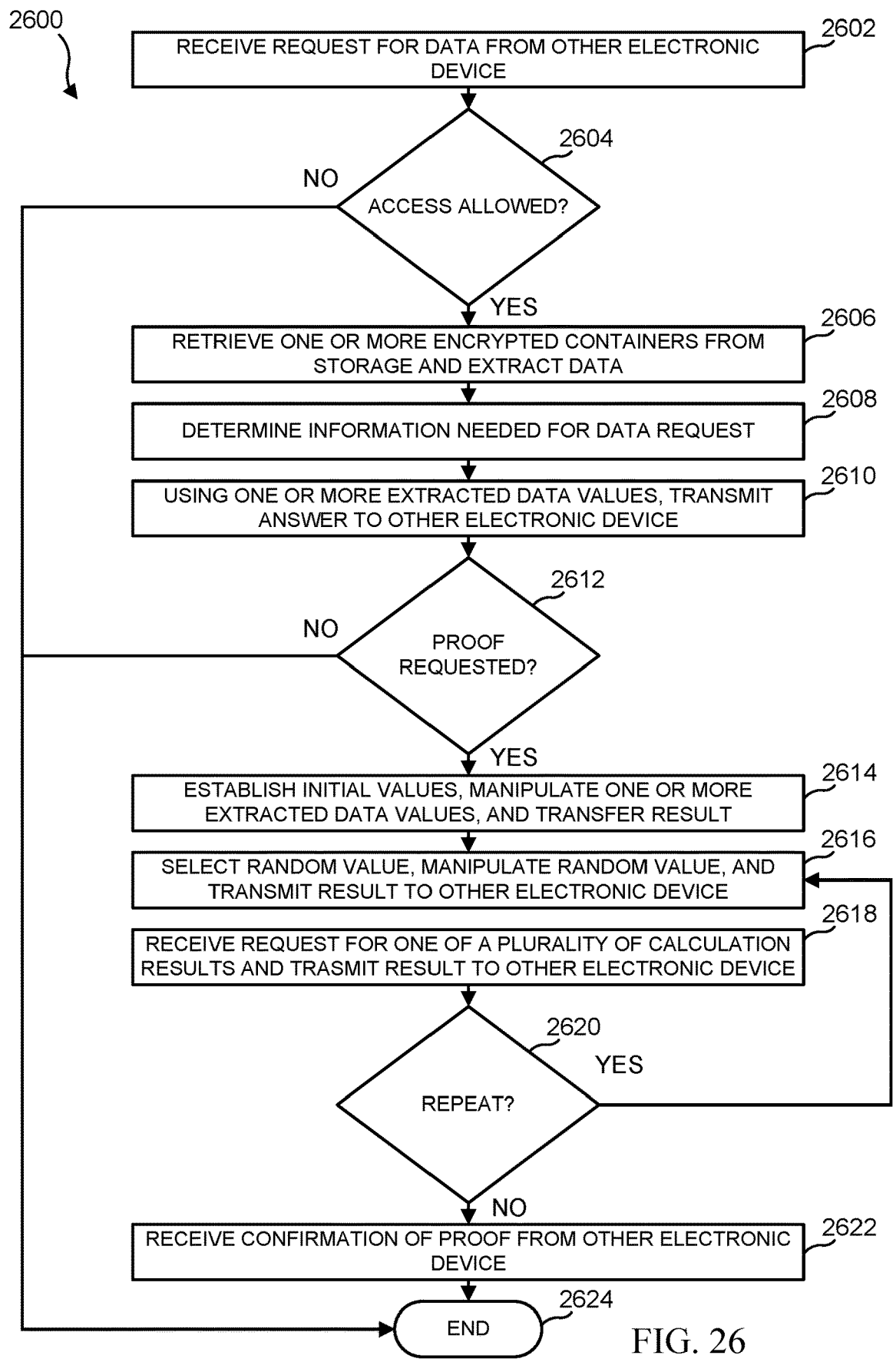
FIG. 26 illustrates a container access and control with zero-knowledge proofs process in accordance with various embodiments of this disclosure.

FIG. 26 illustrates a container access and control with zero-knowledge proofs process 2600 in accordance with various embodiments of this disclosure. For ease of explanation, the process 2600 may be described as being executed or otherwise used by the processor(s) 3002 disclosed with respect to FIG. 30, such as a processor executing the master data controller and/or the edge data controller. In some embodiments, the process 2600 can be used by the architecture 600 described with respect to FIG. 6A, the architecture 700 described with respect to FIG. 7, and/or the architecture 900 described with respect to FIG. 9. However, the process 2600 may be used by any suitable device(s) and in any suitable system. While shown as a series of steps, various steps of the process 2600 can overlap, occur in parallel, occur in a different order, or occur any number of times.

User or organization may seek to share specific information without leaking any additional data. This is important in situations where the user seeking to share the information does not trust the other party not to use it for something other than the intended purpose. For example, when filling out a rental application, an individual may want to prove that their income exceeds the landlord's minimum requirements. However, they may not want to share exactly how much they earn. If it is significantly over the minimum requirement, there is a risk that the landlord will raise the rent at the first available opportunity. In this case, the third party receiving the income verification could use the additional information they received, i.e., the exact salary, to derive additional knowledge that the applicant sought to keep secret. Zero-knowledge proofs (ZKPs) allow for one party to prove to another some specific information without sharing anything other than the intended information. The various embodiments of this disclosure allow for zero-knowledge proofs to be used without revealing any data of the data owner.

The process 2600 begins at step 2602 in which the processor receives a request for data in one or more data containers from another electronic device. At decision block 2604, the processor determines if the other electronic device is allowed to access the data in the data container, as described in the various embodiments of this disclosure. If not, the process 2600 ends at block 2624. If, at decision block 2604, the processor determines the other electronic device is allowed to access the data in the data container, the process 2600 moves to block 2606.

At block 2606, the processor retrieves one or more encrypted containers from storage and extracts the data from the one or more containers. At block 2608, the processor determines the information needed for the data request, such as if the data owner's salary exceeds a threshold, to qualify for a good or service, such as the rental property, as one example. At block 2610, the processor, using one or more extracted values, transmits the answer to the other electronic device, without revealing the extracted values. For example, the processor, such as of the master data controller 710 or the edge data controller 718, can provide to the rental property manager an answer including that the data owner's salary exceeds the threshold to qualify for the rental property, without revealing the data owner's actual salary.

At decision block 2612, the processor determines if the other electronic device requests proof. In some embodiments, the other electronic device may trust the answer, such as if the answer comes from the master data controller, and the process 2600 ends at block 2624. If, however, at decision block 2612, the processor determines that proof is requested by the other electronic device, the process 2600 moves to block 2614.

For example, zero-knowledge proofs can be implemented in the various embodiments by the user, or the master data controller and/or the edge data controller on behalf of the user, proving to a third party that the user knows the discrete log of a given value in a given group. At block 2614 initial values to be used in the proof are established between the user and the third party. For instance, given a value y, a large prime p, and a generator g, the user wants to prove that the user knows a value x such that $g^x \mod p=y$, without revealing x. At block 2614, the user and the third party agree on values for prime p and generator g of a multiplicative group of the field $\mathbb{Z}_p$ to be used to perform the proof. The processor of the user device or the processor of the master data controller and/or edge data controller on behalf of the user, manipulates one or more of the extracted values from the data container using the established values, and transmits the result to the third party device. For example, the processor calculates the value of $y=g^x \mod p$, and transmits the result, y, to the third party device, where x is the value that the user does not wish to reveal, such as the user's salary.

Blocks 2616 and 2618 are then repeated a plurality of times. At block 2616, the processor randomly selects a value, manipulates the random value, and transmits the result to the third party device. For example, the processor can randomly select a value, $r \in U[0,p-1]$, and calculate $C=g^r \mod p$, and transmit the result to the third party device. At block 2618, the processor receives a request from the third party device for an answer to one of a plurality of queries, determines the result, and transmits the result to the third party device. For example, the processor can receive a request from the third party device to calculate and transfer either the value (x+r) mod (p−1), or the value r. In the first case, the processor verifies:

$$(C \cdot y) \bmod p \equiv g^{(x+r) \bmod (p-1)} \bmod p$$

and in the second case, the processor verifies:

$$C \equiv g^r \bmod p$$

where the value (x+r) mod (p−1) can be seen as the encrypted value of x mod (p−1).

Since r is random and equally distributed between zero and (p−1), no information is leaked regarding x. In such a zero-knowledge proof, a cheating prover has a 0.5 probability of successfully cheating in one round. By executing a large enough number of rounds, the probability of a cheating prover succeeding can be made arbitrarily low. As such, at block 2620, the processor determines whether to repeat blocks 2616 and 2618. The number of times to repeat the proof can be established between the two parties. Once repeated the set number of times, the process 2600 moves to block 2622. At block 2622, the processor receives confirmation from the third party devices that the proof is satisfied, accepting the answer previously provided by the processor to the third party device in block 2610. The process 2600 ends at block 2624.

Figure 27:
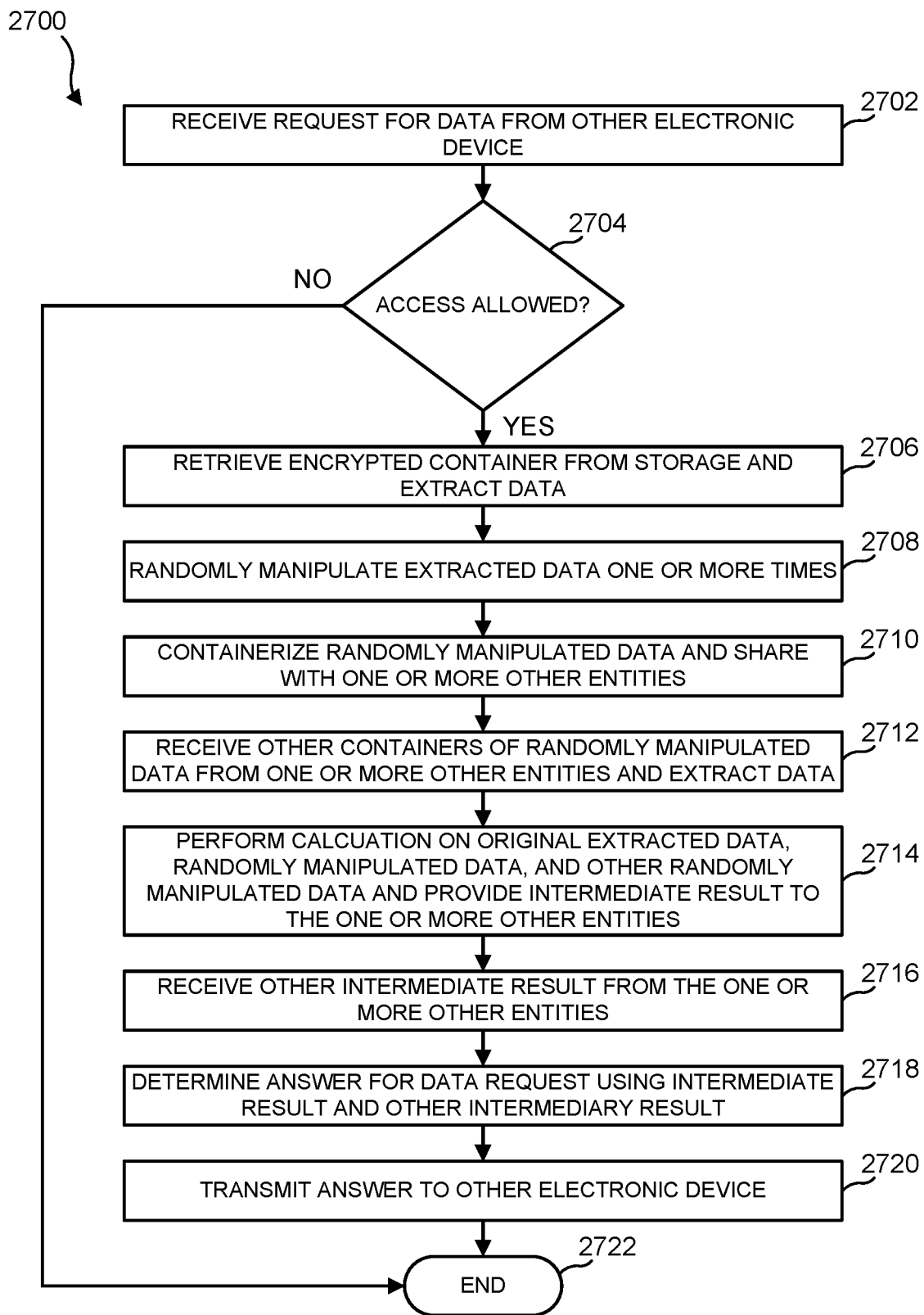
FIG. 27 illustrates a container access and control with secure multiparty computation process in accordance with various embodiments of this disclosure.

FIG. 27 illustrates a container access and control with secure multiparty computation process 2700 in accordance with various embodiments of this disclosure. For ease of explanation, the process 2700 may be described as being executed or otherwise used by the processor(s) 3002 disclosed with respect to FIG. 30, such as a processor executing the master data controller and/or the edge data controller. In some embodiments, the process 2700 can be used by the architecture 600 described with respect to FIG. 6A, the architecture 700 described with respect to FIG. 7, and/or the architecture 900 described with respect to FIG. 9. However, the process 2700 may be used by any suitable device(s) and in any suitable system. While shown as a series of steps, various steps of the process 2700 can overlap, occur in parallel, occur in a different order, or occur any number of times.

As with homomorphic encryption and zero-knowledge proofs, secure multiparty computation allows for individual privacy to be maintained when sharing information with untrusted third parties. Secure multiparty computation (SMC) allows organization to conduct analysis on private data held by multiple other organizations without ever revealing those inputs. SMC relies on secret sharing where sensitive data from each contributor is distributed across every other contributor as encrypted shares. These shares, if intercepted by a malicious third party or misused by an individual contributor, would be worthless, since they are decipherable only once they are combined with the information distributed across many other parties. Secret sharing allows one to distribute a secret among a number of parties by distributing shares to each party. Shares are random elements of a finite field that add up to the secret in the field. Security is achieved because any non-qualifying set of shares looks randomly distributed.

The process 2700 begins at step 2702 in which the processor receives a request for data in one or more data containers from another electronic device. At decision block 2704, the processor determines if the other electronic device is allowed to access the data in the data container, as described in the various embodiments of this disclosure. If not, the process 2700 ends at block 2722. If, at decision block 2704, the processor determines the other electronic device is allowed to access the data in the data container, the process 2700 moves to block 2706.

At block 2706, the processor retrieves one or more encrypted containers from storage and extracts the data from the one or more containers. At block 2708, the processor randomly manipulates the extracted data one or more times. At block 2710, the processor shares the randomly manipulates data with one or more other entities. For example, if three users wish to know an average of their salaries, without revealing their actual salaries to each other, each of the users can participate in SMC using salary data from a data container owned by the user. At block 2708, each of the users can randomly manipulate their salary data by selecting a number between 0 and 3 (the upper limit of the number of participants) for each other participant, and multiplying the user's salary by each of the randomly selected numbers.

Suppose that a first user has a salary of 42K, and the processor randomly selects the numbers 1.6 and 1.1. The processor then multiplies 42K by 1.6 and 1.1, providing results of 67.2K and 46.2K. At block 2710, the processor encodes or requests the encoding of the results into containers and shares each container with one of the other two users, such as providing the result of 67.2K to the second user and the result of 46.2K to the third user. As such, each of the second and third users have a copy of the first user's salary that are drastically different and cannot be reverse engineered to derive the first user's actual salary, even if the second and third users were colluding. The second and third user devices also manipulate their own salaries in this manner, and, at block 2712, the processor receives other containers from the other users that contain their shares, which are also randomly manipulated, and uses decryption keys as authorized to extract the data from the containers. For the purposes of this example, suppose that the second user's salary is 56K, the second user randomly generates 0.5 and 2.2, and the second user shares with the first user the value of 28K and shares with the third user the value of 123.2K. Also suppose that the third user's salary is 48K, the third user randomly generates 1.7 and 0.8, and the third user shares with the first user the value of 81.6K and shares with the second user the value of 38.4K.

As such, in this example, the first user knows his salary is 42K, and now has the values of 28K and 81.6K for the second and third user, respectively. The second user knows his salary is 56K, and now has the values of 67.2K and 38.4K for the first and third user, respectively. The third user knows his salary is 48K, and now has the values of 46.2K and 123.2K for the first and second user, respectively. At block 2714, the processor performs a calculation on the originally extracted data belonging to the user, the randomly manipulated data belonging to the user and shared to the other users, and the other randomly manipulated data provided to the user from the other users. The processor then provides the result as an intermediate result to the other users.

For example, in this running example, the device of the first user performs the calculation at block 2714 of (x= (actual salary)+(second user salary)+(third user salary)−(first share)−(second share)), again keeping in mind that the first user does not have the second and third user's actual salary values. In this example, the first user's device thus calculates x=42+28+81.6−67.2−46.2, which results in 38.2K. The processor then provides this intermediate result to the other users, such as by creating another data container to store the intermediate result and transmitting the container or copies of the container to the other users. The other users also calculate and provide intermediate results. For example, the second user device in this example would calculate x=56+67.2+38.4−28−123.2, which results in 10.4K. Similarly, the third user device calculates x=48+46.2+123.2−81.6−38.4, which results in 97.4K. At block 2716, the processor receives the other intermediate values from the second and third user devices.

At block 2718, the processor determines using the intermediate results an answer to the original data request, that is, the original request for the average salary of the three users. For example, as all user devices now have all the intermediate results, 38.2K, 10.4K, and 97.4K, the user devices can calculate the average of these three values, which is approximately 48K. Although all the real salaries are known to the users, the end resulting average is the same as if the average of the real salaries were taken. That is, in this example, the average of the real salaries of the three users, 42K, 56K. and 48K is also approximately 48K. As such, SMC allows for certain data to be shared or conclusions on data to be made without revealing personally sensitive information between parties. At block 2720, the processor transmits the answer to the originally requesting device. The process 2700 ends at block 2722.

Figure 28:
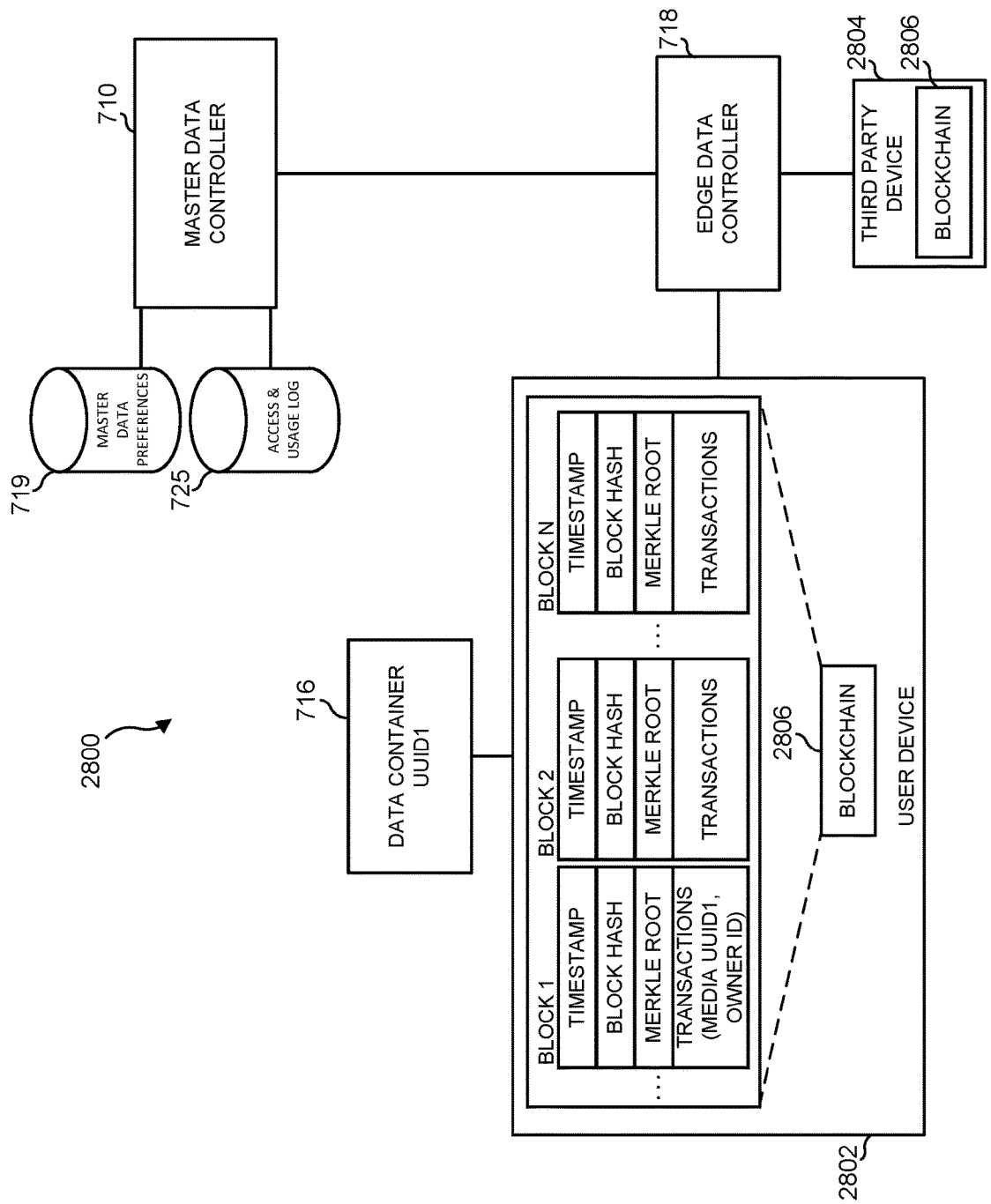
FIG. 28 illustrates a data container access and control blockchain architecture in accordance with various embodiments of this disclosure.

FIG. 28 illustrates a data container access and control blockchain architecture 2800 in accordance with various embodiments of this disclosure. The architecture 2800 includes the master data controller 710 and associated master data preferences 719 and access and usage log 725, and the edge data controller 718. As described in the various embodiments herein, data containers 716 can store data and/or digital assets such as text, images, audio, or other data. The various embodiments of the present disclosure provide that the data container access and usage is controlled and enforced via the edge data controller 718 and the master data controller 710. The architecture 2800 further provides that transactions involving data containers between a user device 2802 and a third party device 2804 using a blockchain to control and secure the transactions.

A block chain is a distributed ledger including records or blocks secured by cryptographic principles. Blockchains are decentralized, secure, and immutable. As illustrated in FIG. 28, the user device 2802 includes a blockchain 2806 that includes a plurality of blocks representing a plurality of transactions, one or more of which are associated with a data container 716 owned by the user of the user device 2802. In some embodiments, the data container 716 can be stored on the user device 2802 or stored elsewhere in association with the user device 2802. In some embodiments, the blockchain 2806 is stored on the user device 2802 as shown in FIG. 28. In some embodiments, the user device 2802 is a lightweight node that does not store the blockchain 2806, but just the block headers of the blockchain 2806 to reduce the storage requirements.

When a data container 716 is created by the user, information regarding the data container 716 is stored in a new block, such as block 1, in the blockchain 2806. As illustrated in the example of FIG. 28, block 1 includes data regarding the data container 716 and its owner, such as a media ID and owner ID, or the UUID as described in the various embodiments of this disclosure, of the data container 716 in the list of transactions in the block. Blocks also include a timestamp for the creation of the block, a block hash of the previous block, a nonce, a Merkle root, and other information included in blockchain blocks. The Merkle root is a hash of the root of a Merkle tree included in the block's transactions.

A hash is a numeric value of a fixed length that uniquely identifies the data. In some embodiments, the block hash and Merkle root hash can be generated using a cryptographic process such as SHA256. For example, the block hash using a plurality of inputs, such as an index (number of current block in chain), a previous hash (for blocks after the genesis block), the timestamp, the data (container UUID), and the nonce. In some embodiments, the block hash can be the header data hashed twice using SHA256. The nonce is a random number used to find or verify a valid hash.

When the owner of the data container 716 wishes to reference the data container 716 on the blockchain 2806, a specific transaction to generate this reference is created and eventually stored in a block on the blockchain 2806, potentially along with other transactions. The Merkle tree stored is a data structure providing information on all transactions stored in the block. The transaction stored in the block concerning the data container 716 includes both the media ID, i.e., the UUID of the data container, and the owner ID. The owner ID can, in some embodiments, be a public key generated from the user's private key. The owner ID confirms ownership of the data container 716, and can be secured using a private-public key approach in which the user/owner of the container 716 has a private key that is used to generate a public key provided to and used by the third party device 2804 to access and participate in transactions using the blockchain 2806. In some embodiments, the owner ID can be an additional address created using the public key. For example, the public key generated using from a private key using a cryptographic function can then be further manipulated to create an address using a separate hash or cryptographic function to create an owner ID. Whether the owner ID is the public key, or an address created using another hash or cryptographic function on the public key, the owner ID is also stored on the blockchain 2806. In some embodiments, the transaction regarding the generation of the reference of the data container 716 is hashed and stored as a hash in the transactions portion of the block (block 1).

In some embodiments, transactions using the blockchain 2806 can be performed directly between the user device 2802 and the third party device 2804, with the edge data controller 718 and the master data controller 710 handling access, smart contracts, and usage enforcement as described herein for the data container and its digital content. In some embodiments, the edge data controller 718 or the master data controller 710 can act as a middleman between the user device 2802 and the third party device 2806. As a transaction is performed between the user device 2802 and the third party device 2806, a record of the transaction is stored in a new block on the blockchain. In some embodiments, multiple transactions involving the data container 716 can be stored in a block of the blockchain 2806, depending on how many transactions occur between block creation/mining. Such transactions can include access, sharing, or transfer requests for the data container 716. The third party device 2804 can be a full node that also stores a copy of the blockchain 2806, or can be a lightweight node. In some embodiments, the blockchain 2806 can either be a private blockchain or a public blockchain.

In some embodiments, each block in the blockchain 2806 can include a step of a transaction. For example, a first block in the blockchain 2806 may include an offer to provide access to, or an offer for sale of, the data container 716, a second block may include a conditional acceptance, a third block may include a verification of smart contract compliance, a transfer of consideration, etc., and a fourth block represents a completed transfer of the data container 716. It will be understood that these blocks are examples, and other blocks or different blocks including different steps in the transaction can occur and be included in the blockchain 2806. In some embodiments, all these transactions can be represented in a single block as part of a transaction between the user and the third party.

It will be understood based on the above that the architecture 2800 can thus be used to perform and enforce NFT transactions. For example, a user or organization creating digital artwork can encrypt and encode the digital artwork into a data container 716, preventing unauthorized users or organizations from accessing and copying or distributing the artwork. Users or organizations that store digital assets in a data container 716 can use the constraining parameters of the data container 716 to provide the digital asset for sale, and allow only authorized purchasers to access the digital asset using an NFT. If any unauthorized user somehow has the data container 716 in their possession, the system and methods of the various embodiments herein would prevent that unauthorized user from breaking into the encrypted data of the container and accessing the digital assets. NFTs can be used as part of the architecture 2800 by holding a reference to the NFT, e.g., the UUID paired with the owner ID, in the blockchain 2806, with the blockchain 2806 recording any licensing or sale of the data container 716. In some embodiments, the UUID paired with the owner ID represents the NFT. In some embodiments, a hash of these two values, the UUID and the owner ID, is the NFT. In some embodiments, a hash of the UUID is the NFT, with the owner ID/public key being used for verification and security using a private-public key scheme. While a successful data container offer is recorded on the blockchain 2806, the operation of transferring value for the data container 716 holding the digital asset can be handled off the blockchain 2806, but in some embodiments could be interfaced with blockchains in the case of a cryptocurrency payment for the data container 716.

Upon completing the transaction represented by the blockchain 2806, the edge data controller 718 and/or the master data controller 710 can take over in the transfer process to confirm ownership of the data container 716 and verify the smart contract terms for the data container 716. If the access and usage of the data container 716 is in compliance with the smart contract, the edge data controller 718 and/or the master data controller 710 approve the access and transfer of the data container 716, as described in the various embodiments herein. In some embodiments, the approval of the access and transfer of the data container 716 can occur during and as part of the transactions represented by the blockchain 2806, such as one or more blocks in the blockchain 2806 including a compliance verification performed by the edge data controller 718 and/or the master data controller 710. After the transaction is complete, further access and use of the data container 716 is still controlled by the edge data controller 718 and/or the master data controller 710 to ensure continued compliance, as described in the various embodiments of this disclosure, including revoking access to the data container 716 if the third party device 2804 performs a non-compliant action.

Figure 29:
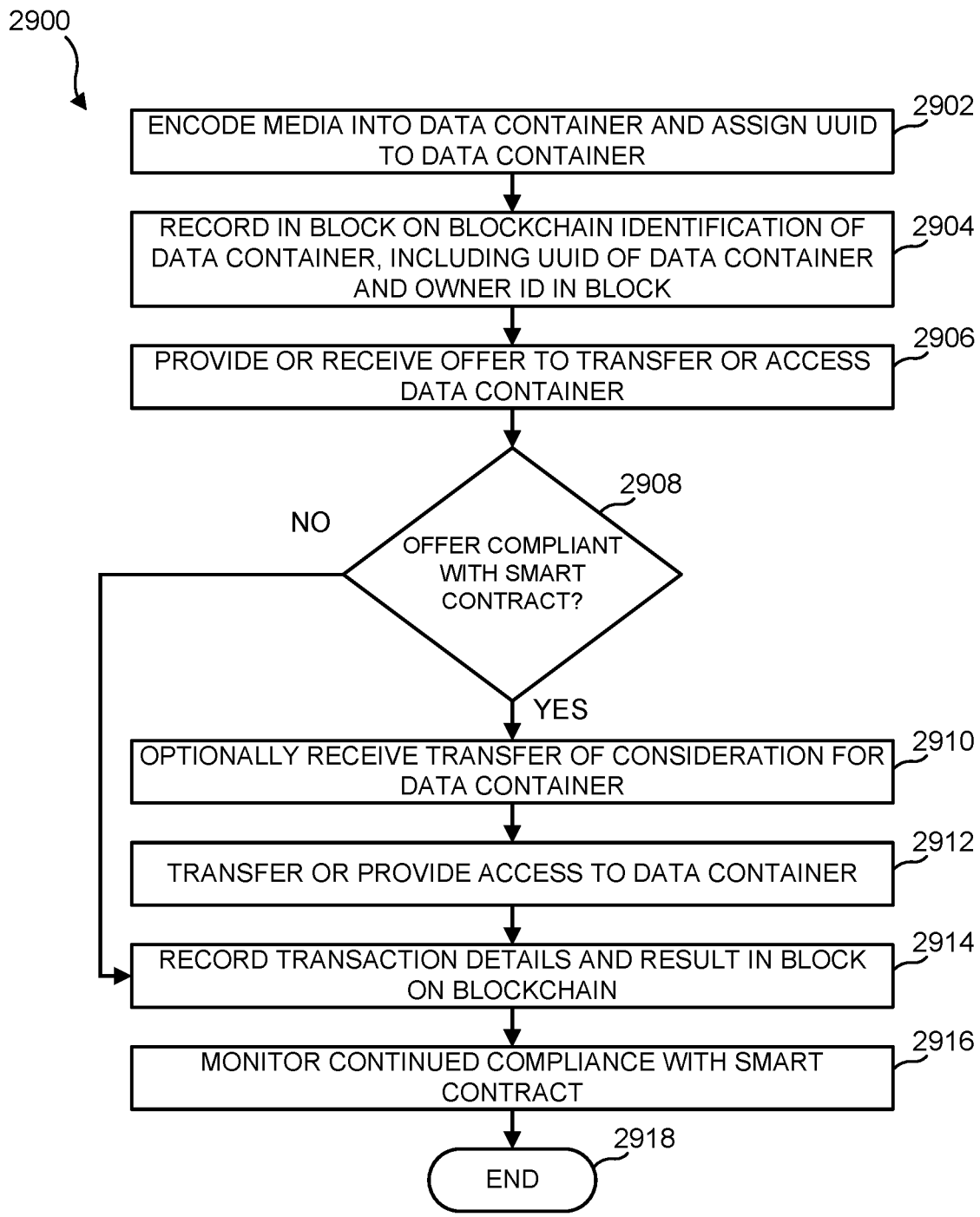
FIG. 29 illustrates a data container blockchain and NFT process in accordance with various embodiments of this disclosure.

FIG. 29 illustrates a data container blockchain and NFT process 2900 in accordance with various embodiments of this disclosure. For ease of explanation, the process 2900 may be described as being executed or otherwise used by the processor(s) 3002 disclosed with respect to FIG. 30, such as a processor executing the master data controller and/or the edge data controller. In some embodiments, the process 2900 can be used by the architecture 600 described with respect to FIG. 6A, the architecture 700 described with respect to FIG. 7, the architecture 900 described with respect to FIG. 9, and/or the architecture 2800 described with respect to FIG.RUE 28. However, the process 2900 may be used by any suitable device(s) and in any suitable system. While shown as a series of steps, various steps of the process 2900 can overlap, occur in parallel, occur in a different order, or occur any number of times.

The process 2900 beings at block 2902, in which the processor encodes media into a data container and assigns a UUID to the new data container. The media can include text, audio, video, one or more images, a GIF, or any other type of data. At block 2904, the processor provides and/or actively records in a block on the blockchain an identification of the data container that includes the UUID and the owner ID, such as described with respect to FIG. 28, minting an NFT in some embodiments for the media stored in the data container. The blockchain holds a reference to the NFT, e.g., the UUID paired with the owner ID, with the blockchain recording any subsequent licensing, sale, or transfer of the data container. In some embodiments, the UUID paired with the owner ID represents the NFT. In some embodiments, a hash of these two values, the UUID and the owner ID, is the NFT. In some embodiments, a hash of the UUID is the NFT, with the owner ID/public key being used for verification and security using a private-public key scheme.

At block 2806, the processor provides or receives an offer to transfer or access the data container. For example, an owner of the media in the data container can offer the media for license, transfer, or sale to a third party, or an offer can be sent from a third party to the owner. The offer and subsequent steps in the transaction between the owner and third party can be secured using the public key associated with the data container generated from the owner's private key. Upon providing or receiving an offer, at decision block 2908, the processor determines if the offer is compliant with the smart contract governing the data container, such as sending a notification of the offer to the edge data controller and/or the master data controller, as described in the various embodiments of this disclosure. The processor can then be notified of compliance or noncompliance. If the offer is not compliant, the process 2900 moves to block 2914 and the failed offer is recorded in a block of the blockchain. In some embodiments, failed offers may not be recorded, but only successful offers are recorded on the blockchain. If, at decision block 2908, the processor determines that the offer is compliant with the smart contract, the process 2900 moves to block 2910.

At block 2910, the processor can receive a transfer of consideration for the data container from the third party. For example, in embodiments in which media stored in the data container is intended to be sold or licensed to a third party, the owner of the media stored in the data container can request payment as a condition of the offer. The payment can be handled off the blockchain in some embodiments. In embodiments in which payment is provided via cryptocurrency, the payment can be handled on the blockchain, or on a separate blockchain. At block 2912, the processor transfers or provides access to the data container, such as described in the various embodiments of this disclosure, including providing information to decrypt the data container to the third party. At block 2914, the successful offer and license, transfer, or sale of the data container is recorded in a block on the blockchain. At block 2916, the processor and/or the edge data controller/master data controller continue to monitor compliance with the smart contract. For example, the data container as described in the various embodiments of this disclosure is subject to a smart contract that defines the accepted use of the data container. As part of the process 2900, the third party may only be given a license or other conditional use of the data container and its media as governed by the smart contract. If, for example, the third party attempts to share the data container with another unauthorized party, such an action is detected and remedial actions can be taken, such as revoking access to the data container, as described in the various embodiments of this disclosure. The process 2900 ends at block 2918.

Figure 30:
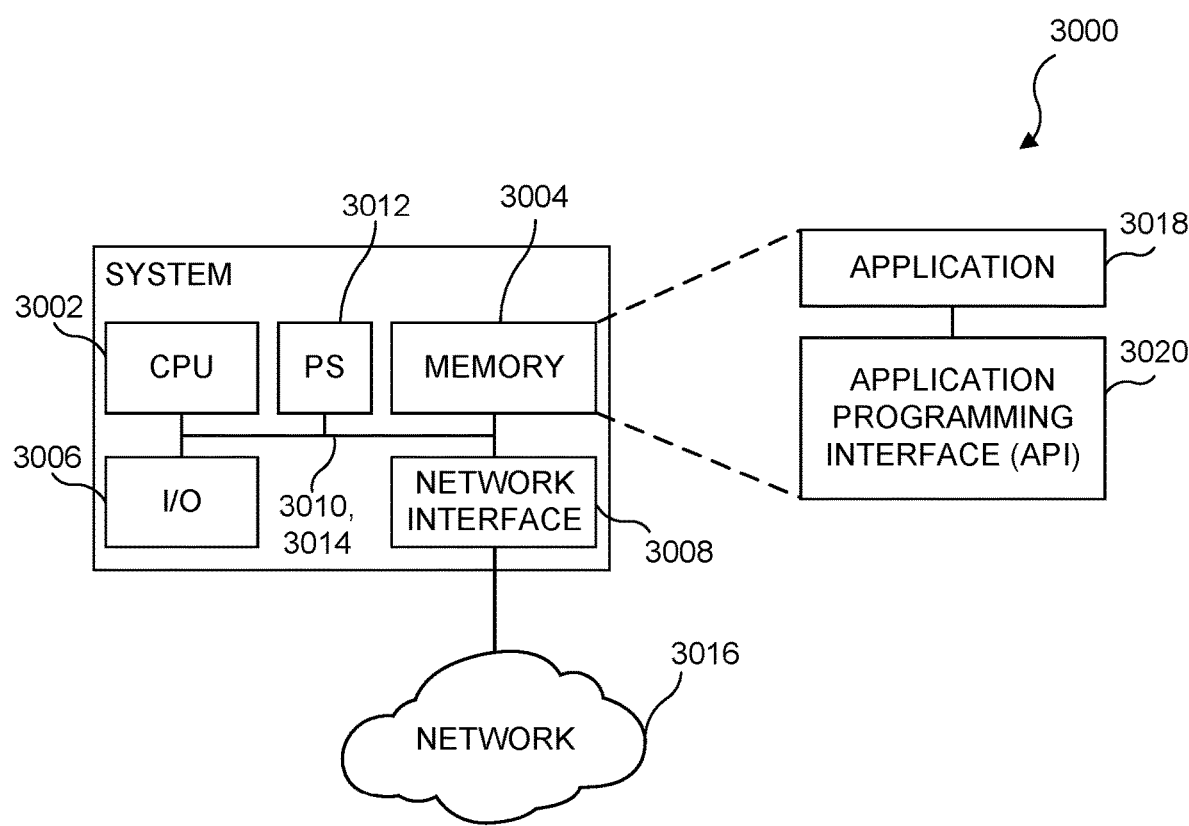
FIG. 30 illustrates an example electronic device or a system device in accordance with various embodiments of this disclosure.

FIG. 30 illustrates an example electronic device or a system device 3000 in accordance with various embodiments of this disclosure. The system device 3000 is one possible example of a device such as the client device in FIG. 6A, or a device in the SaaS environment of FIG. 6A such a server or servers, a server or servers executing the master data controller 710, an edge node executing the edge data controller 718, or electronic devices 715 as shown in FIG. 7, any one of the cloud servers 902, edge nodes 910, or client devices 908 such as shown in FIG. 9, or as shown in other figures of this disclosure and that can be used for performing the processes described herein. Embodiments include cellular telephones (including smart phones), personal digital assistants (PDAs), netbooks, tablets, laptops, desktops, workstations, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the device may be implemented in many different ways and by many different types of systems, and may be customized as needed to operate within a particular environment.

The system 3000 may include a processor or controller (e.g., a central processing unit ("CPU")) 3002, a memory unit 3004, an input/output ("I/O") device 3006, and a network interface 3008. The components 3002, 3004, 3006, and 3008 are interconnected by a transport system (e.g., a bus) 3010. A power supply (PS) 3012 may provide power to components of the computer system 3000, such as the CPU 3002 and memory unit 3004, via a power system 3014 (which is illustrated with the transport system 3010 but may be different). It is understood that the system 3000 may be differently configured and that each of the listed components may actually represent several different components. For example, the CPU 3002 may actually represent a multi-processor or a distributed processing system; the memory unit 3004 may include different levels of cache memory, main memory, hard disks, and remote storage locations; the I/O device 3006 may include monitors, keyboards, and the like; and the network interface 3008 may include one or more network cards providing one or more wired and/or wireless connections to a network 3016. Therefore, a wide range of flexibility is anticipated in the configuration of the computer system 3000.

The system 3000 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 3000. The operating system, as well as other instructions, may be stored in the memory unit 3004 and executed by the processor 3002. For example, the memory unit 3004 may include instructions for performing some or all of the methods or processes described herein. These instructions may reside within an application 3018. The application 3018 may also include an application programming interface (API) 3020, which can include the application or APIs disclosed with respect to FIG. 6A, or other applications such as applications to implement the master data controller, edge data controller, and other components disclosed in the various embodiments of this disclosure.

The processes discussed above are intended to be illustrative and not limiting. Persons skilled in the art will appreciate that steps of the process discussed herein can be omitted, modified, combined, or rearranged, and any additional steps can be performed without departing from the scope of this disclosure.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An electronic device for managing secured data containers,
the electronic device comprising:
at least one network interface;
at least one memory storing executable instructions; and
at least one processor coupled to the at least one network interface and the at least one memory, wherein execution of the executable instructions by the at least one processor causes the electronic device to:
receive, via the network interface from another electronic device, an access request related to data in a data container;
determine to grant the access request based on one or more parameters constraining use of the data;
perform privacy enhancement using the data in the data container, wherein the privacy enhancement is performed using zero-knowledge proofs to:
retrieve the data container and extract one or more data values from the data container;
determine information needed from the data container for the access request;
using the extracted one or more data values, transmit an answer to the other electronic device;
receive a request for a proof; and
in response to the request for the proof:
manipulate the extracted one or more data values and transfer a result of the manipulation of the extracted one or more data values to the other electronic device;
select a random value, manipulate the random value, and transmit a result of the manipulation of the random value to the other electronic device;
receive a request for one of a plurality of calculation results and transmit a result of the one of the plurality of calculation results to the other electronic device; and
receive confirmation of proof from the other electronic device.

2. The electronic device of claim 1, wherein execution of the executable instructions by the at least one processor further causes the electronic device to:
perform the privacy enhancement further using one or more of:
homomorphic encryption;
secure enclaves;
differential privacy;
federated analysis; or
secure multiparty computation.

3. The electronic device of claim 2, wherein execution of the executable instructions by the at least one processor further causes the electronic device to:
perform the privacy enhancement further using the differential privacy, wherein execution of the executable instructions by the at least one processor further causes the electronic device to:
retrieve the data container and extract the data from the data container;
introduce noise into the data to create noisy data;
output a result using the noisy data; and
transmit the result to the other electronic device.

4. The electronic device of claim 3, wherein execution of the executable instructions by the at least one processor further causes the electronic device to:
perform the privacy enhancement further using the federated analysis, wherein execution of the executable instructions by the at least one processor further causes the electronic device to:
retrieve the data container and extract the data from the data container;
analyze the extracted data and determine an output using the extracted data;
discard the extracted data;
obtain one or more other outputs from one or more other data sources without commingling the data from the container and data from the one or more other data sources;
generate, using the determined output and the one or more other outputs, a final result; and
transmit the final result to the other electronic device.

5. The electronic device of claim 2, wherein execution of the executable instructions by the at least one processor further causes the electronic device to:
perform the privacy enhancement further using the homomorphic encryption, wherein execution of the executable instructions by the at least one processor further causes the electronic device to:
retrieve the data container, wherein the data container is encrypted using an encryption key;
perform an operation on the encrypted data container to generate a second encrypted data container; and
transmit the second encrypted data container to the other electronic device, wherein the other electronic device either requests decryption of the second encrypted data container using a decryption key or decrypts the second encrypted data container using a decryption key available to the other electronic device.

6. The electronic device of claim 2, wherein execution of the executable instructions by the at least one processor further causes the electronic device to:
determine to grant the access request based on the one or more parameters constraining use of the data and based on at least one of a requester identity, temporal parameters, location parameters, functional parameters, proxy parameters, tracking parameters, aggregation parameters, and duration parameters; and
log a result of the access request in an audit log.

7. The electronic device of claim 6, wherein execution of the executable instructions by the at least one processor further causes the electronic device to:
perform the privacy enhancement further using the secure multiparty computation, wherein execution of the executable instructions by the at least one processor further causes the electronic device to:
retrieve the data container and extract the data from the data container;
randomly manipulate the extracted data one or more times;
containerize the randomly manipulated data and share the containerized randomly manipulated data with one or more third party devices;
receive one or more other containers of other randomly manipulated data from the one or more third party devices;
perform a calculation on the extracted data, the randomly manipulated data, and the other randomly manipulated data to generate an intermediate result;
transmit the intermediate result to the one or more third party devices;
receive one or more other intermediate results from the one or more third party devices;
determine an answer to the access request based on the intermediate result and the other intermediate results; and
transmit the answer to the other electronic device.

8. The electronic device of claim 6, wherein execution of the executable instructions by the at least one processor further causes the electronic device to provide, in response to the grant of the access request, one or more obfuscated results without providing any of the data from the data container.

9. The electronic device of claim 1, wherein execution of the executable instructions by the at least one processor further causes the electronic device to create a record associated with the data container in a graph database accessible by the electronic device, wherein the graph database defines relationships between the data container and one or more other data containers and defines access permissions to the data container in accordance with the one or more parameters constraining use of the data.

10. A method of an electronic device for managing secured data containers, the method comprising:
receiving an access request, from another electronic device, related to data in a data container;
determining to grant the access request based on one or more parameters constraining use of the data;
performing privacy enhancement using the data in the data container, wherein the privacy enhancement is performed using zero-knowledge proofs, including:
retrieving the data container and extract one or more data values from the data container;
determining information needed from the data container for the access request;
using the extracted one or more data values, transmitting an answer to the other electronic device;
receiving a request for a proof; and
in response to the request for the proof:
manipulating the extracted one or more data values and transferring a result of the manipulation of the extracted one or more data values to the other electronic device;

selecting a random value, manipulate the random value, and transmit a result of the manipulation of the random value to the other electronic device;

receiving a request for one of a plurality of calculation results and transmit a result of the one of the plurality of calculation results to the other electronic device; and receiving confirmation of proof from the other electronic device.

11. The method of claim 10, further comprising:
performing the privacy enhancement further using one or more of:
homomorphic encryption;
secure enclaves;
differential privacy;
federated analysis; or
secure multiparty computation.

12. The method of claim 11, further comprising:
performing the privacy enhancement further using the differential privacy, including:
retrieving the data container and extract the data from the data container;
introducing noise into the data to create noisy data;
outputting a result using the noisy data; and
transmitting the result to the other electronic device.

13. The method of claim 12, further comprising:
performing the privacy enhancement further using the federated analysis, including:
retrieving the data container and extracting the data from the data container;
analyzing the extracted data and determining an output using the extracted data;
discarding the extracted data;
obtaining one or more other outputs from one or more other data sources without commingling the data from the container and data from the one or more other data sources;
generating, using the determined output and the one or more other outputs, a final result; and
transmitting the final result to the other electronic device.

14. The method of claim 11, further comprising:
performing the privacy enhancement further using the homomorphic encryption, including:
retrieving the data container, wherein the data container is encrypted using an encryption key;
performing an operation on the encrypted data container to generate a second encrypted data container; and
transmitting the second encrypted data container to the other electronic device, wherein the other electronic device either requests decryption of the second encrypted data container using a decryption key or decrypts the second encrypted data container using a decryption key available to the other electronic device.

15. The method of claim 11, further comprising:
determining to grant the access request based on the one or more parameters constraining use of the data and based on at least one of a requester identity, temporal parameters, location parameters, functional parameters, proxy parameters, tracking parameters, aggregation parameters, and duration parameters; and
logging a result of the access request in an audit log.

16. The method of claim 15, further comprising:
performing the privacy enhancement further using the secure multiparty computation, including:
retrieving the data container and extract the data from the data container;
randomly manipulating the extracted data one or more times;
containerizing the randomly manipulated data and sharing the containerized randomly manipulated data with one or more third party devices;
receiving one or more other containers of other randomly manipulated data from the one or more third party devices;
performing a calculation on the extracted data, the randomly manipulated data, and the other randomly manipulated data to generate an intermediate result;
transmitting the intermediate result to the one or more third party devices;
receiving one or more other intermediate results from the one or more third party devices;
determining an answer to the access request based on the intermediate result and the other intermediate results; and
transmitting the answer to the other electronic device.

17. The method of claim 15, further comprising providing, in response to granting the access request, one or more obfuscated results without providing any of the data from the data container.

18. The method of claim 10, further comprising creating a record associated with the data container in a graph database accessible by the electronic device, wherein the graph database defines relationships between the data container and one or more other data containers and defines access permissions to the data container in accordance with the one or more parameters constraining use of the data.

19. A method of an electronic device for managing secured data containers, the method comprising:
receiving an access request, from another electronic device, related to data in a data container;
determining to grant the access request based on one or more parameters constraining use of the data and based on at least one of a requester identity, temporal parameters, location parameters, functional parameters, proxy parameters, tracking parameters, aggregation parameters, and duration parameters;
logging a result of the access request in an audit log; and
performing privacy enhancement using the data in the data container and using secure multiparty computation, including:
retrieving the data container and extract the data from the data container;
randomly manipulating the extracted data one or more times;
containerizing the randomly manipulated data and sharing the containerized randomly manipulated data with one or more third party devices;
receiving one or more other containers of other randomly manipulated data from the one or more third party devices;
performing a calculation on the extracted data, the randomly manipulated data, and the other randomly manipulated data to generate an intermediate result;
transmitting the intermediate result to the one or more third party devices;
receiving one or more other intermediate results from the one or more third party devices;
determining an answer to the access request based on the intermediate result and the other intermediate results; and
transmitting the answer to the other electronic device.

20. The method of claim 19, further comprising providing, in response to granting the access request, one or more obfuscated results without providing any of the data from the data container.

* * * * *